United States Patent
McKnight et al.

(10) Patent No.: US 12,139,443 B2
(45) Date of Patent: *Nov. 12, 2024

(54) CONCENTRATED LIQUID COMPOSITIONS OF UREASE INHIBITORS FOR NITROGEN SOURCES

(71) Applicant: SOILGENIC TECHNOLOGIES, LLC, High Point, NC (US)

(72) Inventors: Gary David McKnight, High Point, NC (US); Randall Linwood Rayborn, Burlington, NC (US)

(73) Assignee: SOILGENIC TECHNOLOGIES, LLC, High Point, NC (US)

(*) Notice: Subject to any disclaimer, the term of this patent is extended or adjusted under 35 U.S.C. 154(b) by 38 days.

This patent is subject to a terminal disclaimer.

(21) Appl. No.: 16/398,147

(22) Filed: Apr. 29, 2019

(65) Prior Publication Data

US 2019/0256437 A1 Aug. 22, 2019

Related U.S. Application Data

(63) Continuation-in-part of application No. 16/161,012, filed on Oct. 15, 2018, which is a continuation-in-part of application No. 15/898,126, filed on Feb. 15, 2018.

(60) Provisional application No. 62/459,364, filed on Feb. 15, 2017.

(51) Int. Cl.
| | |
|---|---|
| C05G 3/90 | (2020.01) |
| A01N 47/44 | (2006.01) |
| C05C 9/00 | (2006.01) |
| C05D 9/02 | (2006.01) |
| C09K 15/28 | (2006.01) |

(52) U.S. Cl.
CPC ............ *C05G 3/90* (2020.02); *A01N 47/44* (2013.01); *C05C 9/00* (2013.01); *C05D 9/02* (2013.01); *C09K 15/28* (2013.01)

(58) Field of Classification Search
CPC . A01N 47/44; C05C 9/00; C05D 9/02; C05G 3/90; C09K 15/28
USPC ........................................................ 504/113
See application file for complete search history.

(56) References Cited

U.S. PATENT DOCUMENTS

| | | | |
|---|---|---|---|
| 4,234,332 A | 11/1980 | Michaud et al. | |
| 4,530,714 A | 7/1985 | Kolc et al. | |
| 5,024,689 A | 6/1991 | Sutton et al. | |
| 5,352,265 A | 10/1994 | Weston et al. | |
| 5,698,003 A | 12/1997 | Omilinsky et al. | |
| 8,562,711 B2 | 10/2013 | Sutton et al. | |
| 9,266,789 B2 | 2/2016 | Ortiz-Suarez et al. | |
| 2006/0185411 A1 | 8/2006 | Hojatie et al. | |
| 2007/0157689 A1 | 7/2007 | Sutton et al. | |
| 2013/0283873 A1 | 10/2013 | Sutton et al. | |
| 2014/0090432 A1* | 4/2014 | McKnight | C05C 9/02 252/382 |
| 2015/0143860 A1* | 5/2015 | McKnight | C05C 9/00 71/28 |
| 2015/0299062 A1 | 10/2015 | McKnight et al. | |
| 2015/0315092 A1 | 11/2015 | McKnight et al. | |
| 2018/0044254 A1 | 2/2018 | Gabrielson et al. | |

FOREIGN PATENT DOCUMENTS

| | | | | |
|---|---|---|---|---|
| WO | WO-2016070184 A1 * | 5/2016 | ............... | C05G 5/00 |
| WO | WO-2016137815 A1 * | 9/2016 | ............. | C05C 9/005 |

OTHER PUBLICATIONS

Replace NMP [online]. Gaylord Chemical Company, LLC., 2021 [retrieved on Dec. 16, 2021]. Retrieved from the Internet: <URL:https://www.gaylordchemical.com/replace-nmp/>, pp. 1-7. (Year: 2021).

Macegonluk, K et al., Bis(aminomethyl)phosphinic Acid, a Highly Promising Scaffold for the Development of Bacterial Urease Inhibitors, 2015, ACE Medicinal Chemistry Letters, vol. 6, pp. 146-150 (Year: 2015).

Zhu, J. CN105801320A, Slow-release fertilizer useful for cultivation of rice, comprises core composition containing urea and sodium silicate, and coating layer composition containing chitosan and diatomite, coated on surface of core composition, 2016, Derwent Abstract, 8 pages (Year: 2016).

Fu, L. CN103396239A, Slow-release fertilizer synergistic agent used for crops, comprises urease inhibitor, nitrification inhibitor, amine stabilizer, fertilizer synergist, and EDTA chelated mineral element, 2013, Derwent Abstract, 4 pages. (Year: 2013).

* cited by examiner

*Primary Examiner* — Ali Soroush
(74) *Attorney, Agent, or Firm* — Shumaker, Loop & Kendrick, LLP

(57) ABSTRACT

The present invention relates to increasing and/or maintaining nitrogen content in soil by administration of nitrogen sources particles coated with urease inhibitors. In one embodiment, urease inhibitors are dispersed in an improved organo liquid delivery system at concentration levels of 60-95%. In another embodiment, urease inhibitors were applied in a non-aqueous, organo liquid delivery system coating nitrogen sources particles utilizing simple blending equipment at temperatures of 20°-70° C. Another embodiment discloses dry, flowable nitrogen sources coated with a urease inhibitor which can be administered directly to the soil, to a dry natural and/or a manmade fertilizer or to a liquid fertilizer which provides for the reduction of nitrogen loss from the soil. In another embodiment, a composition of urea and <0.2% dimethyl sulfoxide improves the crush resistance of the urea particles.

16 Claims, 3 Drawing Sheets

CONCENTRATED LIQUID COMPOSITIONS OF UREASE INHIBITORS FOR NITROGEN SOURCES

The present application claims priority under 35 § USC 120 and is a continuation in part of U.S. application Ser. No. 16/161,012 filed Oct. 15, 2018. which in turn is a continuation in part of and claims priority to U.S. application Ser. No. 15/898,126 filed Feb. 15, 2018, which in turn claims priority under 35 § USC 119(e) to U.S. Provisional Application 62/459,364 filed Feb. 15, 2017, the entire contents of all of which are hereby incorporated by reference in their entireties.

FIELD OF THE INVENTION

The present invention relates to increasing and/or maintaining nitrogen content in soil by administration of granular or powdered nitrification inhibitors coated with urease inhibitors. In one embodiment, urease inhibitors are dispersed in an improved organo liquid delivery system at concentration levels of 50-90%. In another embodiment, urease inhibitors were applied in a non-aqueous, organo liquid delivery system coating solid nitrification inhibitors utilizing simple blending equipment at temperatures of 20°-70° C. Another embodiment discloses a dry, flowable additive containing a nitrification inhibitor coated with a urease inhibitor which can be administered directly to the soil, to a dry natural and/or a manmade fertilizer or to a liquid fertilizer which provides for the reduction of nitrogen loss from the soil due to microbial activity.

The present invention further relates to increasing and/or maintaining nitrogen content in soil by administration of improved stable liquid solutions. In one embodiment, the stable liquid solutions comprise (aminomethylene) phosphinic acids and their salts as a urease inhibitor dissolved in a Non-aqueous Organo Solvent Delivery System (NOSDS). In another embodiment, the stable liquid solutions comprises nitrification inhibitors and (aminomethylene) phosphinic acids and their salts that are co-dissolved in a NOSDS or blending solutions of each that has been dissolved in a NOSDS. In another embodiment, the stable liquid solutions comprises urease inhibitors and (aminomethylene) phosphinic acids and their salts that are co-dissolved in a NOSDS or blending solutions of each that has been dissolved in a NOSDS. In another embodiment, the stable liquid solutions comprises Organo Polycarboxylate Functionalities, (OPCF), and their salts and (aminomethylene) phosphinic acids and their salts that are co-dissolved in a NOSDS or blending solutions of each that has been dissolved in a NOSDS. In another embodiment, the stable liquid solutions comprises nitrification inhibitors, urease inhibitors, Organo Polycarboxylate Functionalities, (OPCF), and their salts and (aminomethylene) phosphinic acids and their salts that are co-dissolved in a non-aqueous organo liquid delivery system (NOSDS) or blending solutions of each that has been dissolved in a NOSDS. In an embodiment, the stable liquid solutions are designed to be used in conjunction with a nitrogen source or for direct application to the soil to slow or retard the loss of nitrogen in the soil.

In one embodiment, compositions are comprised of a) one or more urease inhibitors and b) a non-aqueous organo liquid delivery system (NOSDS), wherein the one or more urease inhibitors comprise between about 60-95%, by weight, of said compositions. In another embodiment, the one or more urease inhibitors are dissolved in a non-aqueous organo solvent and then delivered as a coating to the surfaces of nitrogen sources particles utilizing simple equipment. In a variation, the compositions can be applied to the surfaces of nitrogen sources through simple equipment such as spray, meter and controlled flow applicators, wherein the nitrogen sources are at temperatures of between about 25° to 100° C., 30° to 100° C., 40° to 100° C., 50° to 100° C., 60° to 100° C., 70° to 100° C., 80° to 100° C., 90° to 100° C., 25° to 90° C., 25° to 80° C., 25° to 70° C., 25° to 60° C., 25° to 50° C., 25° to 40° C., 25° to 35° C., 40° to 70° C., 50° to 80° C., and 0° to 100° C.

In another embodiment, discloses dry, flowable nitrogen sources particles coated with urease inhibitors which can be administered directly to plant growth mediums, blended with dry natural and/or manmade fertilizers or added to a liquid fertilizer, wherein the application results in imparting urease inhibition properties for the reduction of nitrogen loss in plant growth mediums due to urease activities. In an embodiment, compositional levels as high as about 10% of urease inhibitors can be delivered to the surfaces of nitrogen sources allowing for blending with other untreated nitrogen sources imparting urease inhibition to plant growth mediums. In a variation, application of a composition onto the surfaces of nitrogen sources particles can be accomplished with lower levels of organo liquids. In another variation, high levels of urease inhibitors can be applied to the surface of nitrogen sources' surfaces without adding high levels of organo-solvents.

In another embodiment, high levels of non-aqueous organo liquid solvent systems with good solubilizing properties for nitrogen sources can negatively impact the physical properties of the nitrogen sources particles.

In an embodiment, the present invention relates to increasing and maintaining nitrogen content in plant growth mediums by administration of nitrogen sources coated with a composition comprised of i) one or more urease inhibitors selected from the group consisting of (1) phosphoramides, (2) phosphinic acid organo amines and their salts, and (3) a non-aqueous organo solvent delivery system (NOSDS). In another embodiment, the urease inhibitor coated nitrogen sources can further comprise nitrification inhibitors, organo polycarboxylate functionalities and their salts, bio-actives and biologics. In an embodiment, compositions are designed to be used in conjunction with a nitrogen source or for direct application to the plant growth mediums to retard the loss of nitrogen in the plant growth mediums through inhibiting the urease enzymes' conversion of urea to ammonia.

BACKGROUND OF THE INVENTION

Nitrogen is an essential plant nutrient and is thought to be important for adequate and strong foliage. Urea provides large nitrogen content and is the dominant nitrogen fertilizer. In the presence of soil moisture, natural or synthetic ureas are converted to ammonium ion, which is then available for plant uptake. Ammonium can be further converted by bacteria in soil to nitrate through a nitrification process. Nitrate is also available for plant uptake. However, the urea usage efficiency is low. In one study used data from over 800 experiments, it is estimated that only 51% of the N applied was recovered by cereals plant (Dobermann and Cassman 2005). In another literature reference, it was reported that average urea efficiency in cereals in China was 30-35% (Fan 2004).

There are two routes for urea loss. One is ammonia ventilation. In practice, nitrogen fertilizer is often just applied once at the beginning of the growing season. The excessive ammonia from urea degradation by urease in the soil bacteria may be leached to environment, especially water or converted to ammonia gas, which is called ammonia ventilation. Soil property, including titratable acidity, pH-H2O, urease activity and cation-exchange capacity, contributes about 90% of ammonia ventilation (Watson C J 1994). The other route is nitrification wherein ammonia is converted to nitrate by bacteria in the soil, which is called nitrification. Excessive nitrate can be converted into nitric oxide or nitrous oxide by certain types of bacteria in the soil, which is called denitrification.

Low efficiency of nitrogen fertilizer not only increases the cost of fertilization, but also contributes significantly to environment pollution. Ammonia has an obnoxious smell even at very low level and ammonium in the water is toxic to water creatures (US EPA822-R-13-001). Nitrous oxide is a potent greenhouse gas, whose potency on global warming is 300 times stronger than carbon dioxide (http://epa.gov/climatechange/ghgemissions/gases/n2o.html). So, increasing the efficiency of urea fertilizer will both save the money and protect the environment, which is very desirable. To improve the longevity of nitrogen nutrients in the soil, fertilizers have been treated with nitrification inhibitors and urease inhibitors. These inhibitors can be deposited onto the surface of fertilizer granules as a coating or added to liquid fertilizers which are aqueous solution of such nitrogen rich components as urea and ammonium nitrate (UAN).

UAN products are of particular interest since the nitrate portion is mobile in the soil and can move to roots for rapid nutrient uptake and the ammonium portion can complex with clay particles and be released as a nitrogen nutrient over time while the urea portion is dependent upon biological processes to degrade it into nitrogen compounds that are in a form that is absorbable by plants. The major advantage of such a compounded fertilizer is that it can provide quickly plant absorbable nitrogen nutrients and is also designed to provide nitrogen nutrients over time. They are marketed as UAN followed by a number indicating the % nitrogen contained in the formulation such as UAN 28 or UAN 32 with the number 28 and 32 denoting the nitrogen content.

However, UAN solutions also present challenges to economically maintain suitable levels of nitrogen nutrients over time during warmth of the growing season due to the high microbial populations in the soil fueling the decomposition of urea to ammonia and the oxidation of ammonia to nitrates and $NO_x$ at a rapid rate. Thus, finding economical delivery formulations that are safe for the environment and for animals and that contain the proper balance of nitrification inhibitors and urease inhibitors that may be applied directly to liquid fertilizers such as UAN would be advantageous to the agricultural industry. Such a treated liquid fertilizer would also assist in slowing two major biological processes that cause substantial loss of nitrogen in soil while simultaneously assisting in controlling pollution of our water and atmosphere. Some products on the market can achieve the goal, such as Neon series from EcoAgro Resources, in which NBPT and DCD are dissolved in organic solvents. However, such formulations are not the most economical way to achieve the delivery of urease and nitrification inhibitors to liquid fertilizers due to the high cost of the organic solvent, which is not necessary for UAN products, and the lower composition percentages of the inhibitors in the liquid formulations which necessitate a larger percentage application of these liquid dispersed systems.

Herein, is described an innovation in which the nitrification inhibitor crystals or powder is coated with a high concentration of urease inhibitor dissolved in an organic solvent. These urease inhibitor coated nitrification solids are ready to quickly dissolve in the UAN resulting in a clear and stable solution making it easy to insure a homogeneous solution for an even application of urease and nitrification inhibitors to the soil. Compared to its liquid equivalents, the current technology is inexpensive to make, transport and store, while delivering a higher concentration of inhibitors per weight unit of product.

Agriculture currently utilizes fertilizers to deliver the needed nutrients of nitrogen, phosphorus, potassium, sulfur, calcium, and magnesium to plants through the application of fertilizers to the soil. Nitrogen generally is the most yield-limiting and costly nutrient element in crop production. Fertilizers are based on nitrogen content, mainly urea and additional plant nutrients and additives. Fertilizers can either be formulated as man-made products or natural organic based animal manure. Nitrogen is the primary nutrient in fertilizers and urea is the primary nitrogen source in fertilizers. Thus, fertilizers have become one vehicle for increasing the nitrogen content in the soil to assist in maintaining the health, overall quality, growth and yields of many of the plants important to agriculture and to civilization. Nitrogen is usually formulated into fertilizer by one or more of urea and/or ammonium nitrate and/or ammonium sulfate and/or manure and/or ammonium phosphate, anhydrous ammonia and/or the like.

Generally, the fertilizer is applied to the soil as either a liquid, a solid or sub-soil as a gas. Maintaining a sufficient level of nitrogen concentration in the soil proves difficult over time due to nitrogen and nitrogen containing compounds (such as urea) solubilities in water.

When rain or water run-off contacts the soil, the nitrogen or nitrogen containing compounds may be carried with the water to surrounding water-ways.

Alternatively, the degradation of nitrogen content may be attributed to volatilization (such as for ammonia and NOx where x is 1, 2 or 3) and water runoff due to the better water solubility of nitrites/nitrates. Loss due to volatilization is sometimes driven by a urease enzyme that catalyzes hydrolysis of urea to ammonia and carbon dioxide and to the biological oxidation by soil microbes, such as Nitrosomonas bacteria, of $NH_3$ or $NH_4$ to NOx's such as nitric oxide, an atmospheric greenhouse gas which, on a molecular basis, has 310 times the global warming potential of carbon dioxide. This results in a substantial loss of nitrogen content in the fertilizer impacting costs to the farmer. Moreover, the loss of nitrogen from the soil results not only in water pollution but also atmospheric pollution.

Nitrogen in the soil is also lost by the attack of nitrogen and nitrogen containing compounds (such as urea) by enzymes like the urease enzyme. Attack by the urease enzyme causes urea to degrade to carbon dioxide and ammonia. Biological oxidations by soil microbes, such as Nitrosomonas bacteria, of ammoniacal nitrogen to nitrate nitrogen are also a cause of the diminishing nitrogen content in soil over time. While the conversion of urea to ammonia and oxidation of ammonia to nitrates within the soil is beneficial to plants, conversions occurring on top of the soil, where fertilizers are applied, also results in a loss of nitrogen. To improve the longevity of nitrogen in the soil, fertilizers have been treated with nitrification inhibitors and urease inhibitors. These inhibitors are usually coated onto the surface of fertilizer granules, added to aqueous liquid fertilizers, added to molten nitrogen sources previous to the formation of a solid particle or introduced to a liquefied gas for sub-surface injection into soil.

Thus, it is desired that one increase the life expectancy of nitrogen in the soil to insure more consistent levels of nitrogen during the growing season while also decreasing the number of times the fertilizer is applied to the soil. Increasing the life expectancy of nitrogen in soil while simultaneously decreasing the number of applications of fertilizer will lower the overall cost to the agriculture industry while at the same time limiting the amount of nitrogen carried into the waterways. Untreated nitrogen sources that are used create polluting conditions that are believed to have fueled the formation of the Gulf Dead Zone, the formation of toxic algal blooms as well as damage to drinking water supplies. Thus, finding delivery formulations that are safe for the environment and for animals and that contain the proper levels of nitrification inhibitors and/or urease inhibitors that may be applied directly to the soil in a liquid form or imparted onto fertilizer granules as a one-step application would be advantageous to the agricultural industry. Such a treated fertilizer would also assist in slowing two major biological processes that cause substantial loss of nitrogen in soil while simultaneously assisting in controlling pollution of our water and atmosphere.

It is also desired to utilize stable liquid solutions that have improved pH, hydrolytic and thermal stability and create lower odor resulting in improvements flexibility in application to a nitrogen source.

While many techniques and inventions have a positive impact of maintaining the level of nitrogen in the soil, they also have significant problems. For example, problems that have adversely affect the agricultural industry include costs of improvement, loss of viability upon storage, the inability to deliver consistent levels of fertilizer due to poor coating of the inhibitors or clumping of granules and the aqueous, low pH and thermal instability of alkyl thiophosphoric triamide such as NBPT resulting in a foul odor and loss of efficacy. Thus, there is a need for a composition, which addresses these shortcomings.

Agriculture currently utilizes fertilizers to deliver the needed nutrients of nitrogen, phosphorus, potassium, sulfur, calcium, and magnesium to plants through the application of fertilizers to the plant growth mediums. Nitrogen generally is the most yield-limiting and costly nutrient element in crop production. Fertilizers are based on nitrogen content, mainly urea and additional plant nutrients and additives. Fertilizers can either be formulated as man-made products or natural organic based animal manure. Nitrogen is the primary nutrient in fertilizers and urea is the primary nitrogen source in fertilizers. Thus, fertilizers have become one vehicle for increasing the nitrogen content in the plant growth mediums to assist in maintaining the health, overall quality, growth and yields of many of the plants important to agriculture and to civilization. Nitrogen is usually formulated into fertilizer by one or more nitrogen sources selected from the group consisting of urea, ammonium nitrate, ammonium sulfate, manure, diammonium phosphate, monoammonium phosphate, dicyandiamide, and compost.

Urea provides a large nitrogen content and is one of the best of all nitrogenous fertilizer materials, which consequently makes it an efficient fertilizer compound. In the presence of plant growth mediums' moisture, natural and/or synthetic ureas are converted to ammonium ion, which is then available for plant uptake. When applied as a fertilizer, native bacteria enzymatically convert urea to two molar equivalents of ammonium ion for each mole of urea as demonstrated by the following two reactions:

$$CO(NH_2)_2 + 2H_2O \rightarrow (NH_4)_2CO_3$$

$$(NH_4)_2CO_3 + 2H^+ \rightarrow 2NH_4^+ + CO_2 + H_2O$$

In the presence of water, the ammonium thus produced is in equilibrium with ammonia. The equilibrium between $NH_4^+$ and $NH_3$ is pH dependent, in accordance with the following equilibrium:

$$NH_4^+OH^- \leftrightarrow NH_{3(solution)} + H_2O$$

As such, gaseous ammonia losses are higher at higher pH values. The flux of NH3 from soil is primarily dependent on the $NH_3$ concentration, pH, and temperature. In the presence of oxygen, ammonium can also be converted to nitrate ($NO_3^-$). Nitrogen in both its ammonium and nitrate forms may then be taken up as nutrient substances by growing plants.

The ammonium ion can also ultimately be converted to ammonia gas, which escapes to the air. The concentrations of NH3 in the air and in solution are governed by Henry's law constant (H), which is a function of temperature:

$$[NH_{3(air)}] = H[NH_{3(solution)}]$$

Urea fertilizer is often just applied once at the beginning of the growing season. A weakness in this nitrogen delivery system involves the different rates at which ammonium ions are produced in the soil, and the rate at which ammonium ions are required by the plant during its growing season. The generation of ammonium ions from the breakdown of urea is fast relative to its uptake by plants, allowing a considerable amount of the fertilizer nitrogen to go unutilized or to be lost to the atmosphere as ammonia gas, where it is no longer available to the plant. In one study used data from over 800 experiments, it is estimated that only 51% of the N applied was recovered by cereals plant (Dobermann and Cassman 2005). In another literature reference, it was reported that average urea efficiency in cereals in China was 30-35% (Fan 2004). Thus, there is a desire to control the hydrolysis of urea to ammonium and ammonia gas, thereby making the urea fertilizer more effective for plant growth.

Nitrogen sources particles' coating technologies utilizes solutions containing urease inhibitors to coat nitrogen sources in order to impart longevity of plant available nitrogen in plant growth mediums. However, these technologies have limitations when the application level of the solutions containing urease inhibitors approaches 0.75% of the weight of the nitrogen sources. Higher % coating levels causes the nitrogen sources to become wet negatively impacting the coated nitrogen sources processability in mixing and application equipment with the formation of clogs and high level of deposition on equipment parts. These issues increases the cost of fertilizing by requiring more frequent cleaning of equipment and the formation of clumps of fertilizer impacting evenness of fertilizer application to the plant source mediums. In an embodiment, solutions containing urease inhibitors that are formulated around solvent systems with strong nitrogen sources solubilizing properties can negatively impact the physical properties of the nitrogen sources particles. In a variation, the crush strength of the nitrogen sources particles is negatively impacted, wherein said solutions' compositions contain large percentages of strong nitrogen source solubilizing solvents. Thus, compositions that
  1. are safe for the environment,
  2. safe for animals,
  3. contain high levels urease inhibitors,
  4. contain low levels of organo solvents, 5. have minimum impact of nitrogen sources particles' physical properties
6. can be applied directly to the plant growth mediums in a liquid form or coated onto fertilizer granules surfaces would be advantageous to the agricultural industry.

DESCRIPTION OF THE PRIOR ART

Of particular interest is increasing the length of time that nitrogen nutrients are available to plants from an aqueous urea/ammonium nitrate based liquid fertilizer (referred to herein as UAN). When applied to soil, the urea component of the UAN hydrolyzes to ammonia through the action of urease enzymes generated by numerous fungi and bacteria present in the soil while the ammonia generated by the urease action on urea and present in the ammonium nitrate can be oxidized to nitrates. While these conversion processes are necessary to create nitrogen nutrients in a plant available form, they occur at a rate too rapid to be absorbed by plants leading to the quick depletion of these nutrients either through volatilization or water runoff. The utilization of urease and nitrification inhibitors is required to slow both biological processes to extend the availability of nitrogen nutrients to plants.

Various methods as disclosed in the patents below, which are incorporated by reference in their entireties, have been proposed and developed for controlling nitrogen nutrients loses from soil treated with an aqueous solution of urea and ammonium nitrate.

Michaud (U.S. Pat. No. 4,234,332) describes aqueous solutions of commonly used fertilizers which also contain dicyandiamide, in an amount to provide at least 10% by weight of dicyandiamide nitrogen which is an effective nitrification inhibitor.

Sutton et al. (U.S. Pat. No. 5,024,689) teach the use of liquid fertilizer that includes urease inhibitors such as NBPT and nitrification inhibitor such as dicyandiamide (referred to herein as DCD) in aqueous mixtures of urea, ammonium polyphosphate, ammonium thiosulfate and potentially other plant growth improving compounds. This approach has drawbacks in that NBPT and DCD are not particular soluble in water especially water containing high salt contents.

Weston, et al (U.S. Pat. No. 5,352,265) discloses a granular urea based fertilizer in which NBPT in 25-50% of solvent selected from the group consisting of liquid amides, 2-pyrrolidone, and N-alkyl 2-pyrrolidones is blended directly into molten urea prior to its granulation. DCD may be added to the urea melt as a solid or in dissolved form along with the NBPT. This approach is equipment specific and is generally high in cost.

Omilinsky, et al (U.S. Pat. No. 5,698,003) Improved solvent systems for the formulation of N-alkyl thiophosphoric triamide urease inhibitors comprised of a solvent selected from the group consisting of glycols and glycol derivatives and optionally, the formulations can contain a co-solvent selected from the group consisting of liquid amides, 2-pyrrolidone and N-alkyl 2-pyrrolidones, and/or a nonionic surfactant. These solutions are to be applied onto solid urea containing fertilizers or added to liquid urea containing fertilizer formulations.

McKnight (U.S. Pat Application Publication No 20140090432) discloses a solvent delivery system for the urease inhibitor that can be utilized as a coating or an additive to a liquid fertilizer. McKnight (U.S. Pat Application Publication No 20150143860, 20150299062 and 20150315092) illustrate solvent delivery systems for urease and nitrification inhibitors for coating granular fertilizers or for adding to liquid fertilizers.

Ortiz-Suarez (U.S. Pat. No. 9,266,789) teaches of solvent delivery systems for Dicyandiamide, a nitrification inhibitor, to be utilized with UAN solutions or coated onto the surface of urea for increasing the life of plant available nitrogen nutrients.

While Omilinsky, McKnight and Ortiz-Suarez utilize organo solvents to dissolve the inhibitors, the utility of these types of technologies are not cost effective because the organo solvents are an added cost as they not necessary for aqueous fertilizers and the % inhibitors are too low for aqueous fertilizers thus requiring higher percent usage to meet inhibition requirements.

Sutton (U.S. Pat. No. 8,562,711, U.S. Pat Application Publication No 2007157689 and 20130283873) provides a method for developing a dry, flowable additive for aqueous urea-based fertilizers based on solid urea formaldehyde polymer (referred to herein as UFP) coated with N-(n-butyl) thiophosphoric triamides either molten or in a solvent system as a dispersion or suspension for inhibition of urease enzyme and, optionally, dicyandiamide that imparts nitrification inhibition to reduce nitrogen loss from the soil. Also, Sutton provides that the dry additive may be blended with molten or solid urea to form a solid urea-based fertilizer with reduced nitrogen loss from the soil. This approach requires the pre coating of UFP granules with a solvent based NBPT and then blended with dry DCD which adds more cost to the final product. UFP's have poor solubility in water and especially in water containing high levels of salt. This lack of solubility requires that the UFP undergoes special process to insure that it's particle size be small enough to be suspended in an aqueous solution making the homogeneity of the application of the inhibitor package more difficult as the NBPT resides on the insoluble UFP particle. The resulting aqueous fertilizer containing a product of this technology is milky in appearance making it difficult to determine when a product of this technology has completely dissolved and the coated UFP settles out upon standing impacting the homogeneity of the resulting aqueous fertilizer resulting in uneven application of the inhibitors to the soil.

While many of these techniques have a positive impact of maintaining the level of nitrogen in the soil, they also have significant problems. Thus, there is a need for a composition, that is easy to dissolve resulting in a clear, stable solution in order to insure homogeneity of the inhibitors throughout the aqueous fertilizer and which can deliver the required levels of urease and nitrification inhibitors in an economically and homogeneous manner to plants and to the soil.

Various methods as disclosed in the patents below, which are incorporated by reference in their entireties, have been proposed and developed for controlling volatile nitrogen loses from urea.

Weston et al. (U.S. Pat. No. 5,352,265) discloses a granular urea based fertilizer in which N(n-butyl) thiophosphoric triamide (NBPT) in 25-50% of solvent selected from the group consisting of liquid amides, 2-pyrrolidone, and N-alkyl 2-pyrrolidones is blended directly into molten urea prior to its granulation. DCD may be added to the urea melt as a solid or in dissolved form along with the NBPT. This approach is equipment specific and is generally high in cost and exposes the thermally unstable NBPT to temperatures ≥120° C.

Urease inhibiting materials other than NBPT have been disclosed. Some examples include the use of polysulfide and thiosulfate salts as taught by Hojjatie et al (US Patent Application Publication No. 2006/0185411 A1).

Kolc at al. (U.S. Pat. No. 4,530,714) teach the use of aliphatic phosphoric triamide urease inhibitors, including the use of NBPT for this purpose. Kolc reveals the use of aqueous and organic carrier mediums, but specifies volatile (and flammable) solvents from the group including acetone, diisobutylketone, methanol, ethanol, diethyl ether, toluene, methyl chloride, chlorobenzene, and petroleum distillates. The principle reason for the use of these solvents was to assure that negligible amounts of solvent residue be retained on the crop. Kolc also teaches effective levels of urease inhibition in a plant growth medium with at least 0.02 parts by weight of a phosphoric triamide applied to 1,000,000 parts by weight of plant growth medium or stated differently a plant growth medium with 0.02 ppm of a phosphoric triamide should have effective urease inhibition. Kolc states effective levels of phosphoric triamide in plant growth mediums would be 0.02-5000 ppm, 1-1000 ppm and 5-100 ppm would provide effective urease inhibition.

Gabrielson (U.S. patent application Ser. No. 15/552, 675—U.S. Patent Application Publication No. 20180044254) teaches the utilization of the addition of a liquid concentrate of up to 95% N-(n-butyl) thiophosphoric triamide (NBPT) in N-Methyl-2-pyrrolidone (NMP) to molten urea at temperatures of 115-120° C. before prilling or granulation of the urea to ensure homogeneous distribution of NBPT throughout the urea particle. He also demonstrates that higher purity NBPT has better storage stability versus lower purity NBPT due to the slower degradation of high purity NBPT. He also demonstrates how temperatures of 22° C. versus 45° C. impact the stability of NBPT. Gabrielson states that it is the presence of impurities in the lower purity NBPT that promotes the further decomposition of the NBPT into non-effective substances during a longer storage and is the main cause of urease inhibitor degradation during a long term storage. However, he does not show how temperatures of 75-120° C. impacts the purity of the NBPT as this is the range of temperatures that the NBPT is exposed to in the processes, wherein the concentrated solutions containing NBPT are added to molten urea and the subsequent formation of a urea particle. Gabrielson states that the concentration of the urea is 94-99% with the removal of water and that the temperature of the urea must be maintained at 120° C. to keep it liquid (pure urea has a melt point of 132.7° C.). Exposing NBPT to moisture and high temperatures results in the formation NBPT degradative species and, as shown by Gabrielson, the presence of these species negatively impact the remaining NBPT which leads to poorer storage stability and further reduces the effectiveness of concentrated solution's urease inhibition capabilities.

The industry needs a technology that are compositions of highly concentrated solution of urease inhibitors, wherein i) the urease inhibitors' weight percent is between about 60-95% of the composition of the solution, ii) are liquid at a temperature range of between about −20-70° C., iii) can be applied at medium temperatures as coating of nitrogen sources particles at temperatures of 40-70° C. to ensure lower thermal degradation of urease inhibitors such as NBPT, and iv) the compositions comprise a non-aqueous organo liquid delivery system that is safe for human contact and for the environment.

BRIEF SUMMARY OF THE INVENTION

Urea and ammonium nitrates are desirable starting materials for fertilizers and fertilizer additives, which can provide high nitrogen content and can be used in fertilizer products that provide phosphorus or potassium as primary nutrients, and calcium, magnesium, or sulfur as secondary nutrients or micronutrients such as boron, copper, iron, manganese, molybdenum and zinc. These fertilizer products deliver the nutrients to the soil and through numerous biological processes can be converted to forms that are capable of being absorbed by plants. The use of a nitrification inhibitor such as cyanoamides, typically, dicyandiamide (DCD) by itself or combined with a urease inhibitor such as phosphoramides are one embodiment of the invention. In an embodiment, the present invention relates to an additive that imparts to liquid or solid manmade fertilizer, manure, waste or compost an increased longevity of plant available nitrogen in the soil wherein the additive is a dry, flowable composition produced by coating nitrification inhibitor with a urease inhibitor dissolved in a Non-aqueous Organic Solvent Delivery System (NOSDS) at concentrations of urease inhibitors in the NOSDS of 50-90%. The resulting coated nitrification inhibitor becomes an additive that can be mixed with granular, natural or synthetic, fertilizer or added to aqueous fertilizer in particular combination of urea and ammonium nitrate that have been dissolved in water (commercial name of UAN). The inclusion of the combination of nitrification and urease inhibitors which will inhibit biological oxidation of ammonia by soil microbes, such as Nitrosomonas bacteria and inhibit the enzymatic action of urease slowing the conversion urea nitrogen to ammoniacal nitrogen.

The present invention provides for a composition that is easy to dissolve resulting in a clear, stable solution in order to insure homogeneity of the inhibitors throughout the aqueous fertilizer and which can deliver the required levels of urease and nitrification inhibitors in an economically and homogeneous manner to plants and to the soil.

In an embodiment, the present invention relates to stable liquid solutions comprising (aminomethylene) phosphinic acids and their salts utilization as urease inhibitors dissolved in a Non-aqueous Organo Solvent Delivery System (NOSDS). In a variation, the present invention relates to stable liquid solutions comprising (aminomethylene) phosphinic acids and their salts utilization as urease inhibitors in combination with nitrification inhibitors by either blending liquid solutions containing each material or combining the two inhibitors by co-dissolving them together in a non-aqueous organo liquid delivery system (NOSDS).

In a variation, the present invention relates to stable liquid solutions comprising (aminomethylene) phosphinic acids and their salts utilization as urease inhibitors in combination with other urease inhibitors by either blending liquid solutions containing each material or combining the two inhibitors by co-dissolving them together in a non-aqueous organo liquid delivery system (NOSDS). In another variation, the present invention relates to stable liquid solutions comprising (aminomethylene) phosphinic acids and their salts utilization as urease inhibitors in combination with Organo Polycarboxylate Functionalities, (OPCF), and their salts by either blending two separate liquid solutions containing each material or combining the by dissolving them together in an non-aqueous organo liquid delivery system (NOSDS) formulation. In another variation, the present invention relates to stable liquid solutions comprising (aminomethylene) phosphinic acids and their salts utilization as urease inhibitors in combination with nitrification inhibitors, urease inhibitors and OPCFs and their salts by either blending liquid solutions containing each material or combining by co-dissolving them together in a NOSDS. The resulting stable liquid solutions can then be applied to fertilizer or to just nitrogen sources to impart inhibiting the conversion of a nitrogen source to ammonia and/or nitrate and free up soil bound phosphates and micronutrients.

In one embodiment, improved delivery formulations have been developed that deliver expected and effective levels of (aminomethylene) phosphinic (AMP) acids and their salts that inhibits microbial conversion of nitrogen sources to ammonia increasing the nitrogen longevity in the soil. In an embodiment, it has been found that the delivery formulations of the present invention provide a liquid vehicle to deliver an even, non-clumping application of the desired inhibitors to the fertilizer granule. In another embodiment, these AMP acids and their salts deliver urease inhibition in water containing nitrogen sources such as urea ammonium nitrate solutions (UAN) and fresh animal manure. Not to be bound by theory, the AMP inhibitors have better hydrolytic thermal and low pH stability versus standard urease inhibitors such as alkyl thiophosphoramides such as N-(n-butyl) thiophosphoric triamide (NBPT) due to the methylene linkage between the phosphorous and the nitrogen. In another embodiment, AMP acids and their salts deliver urease inhibition to nitrogen sources produced by high temperature processes by injecting the stable liquid solution comprising AMP acids and their salts directly into the nitrogen source's molten pool due to the AMP acids and their salts superior thermal stability when compared to N-(n-butyl) thiophosphoric triamide (NBPT). In a variation, the AMP acids and their salts do not generate a sulfur odor during storage as a liquid formulation or as incorporated with a nitrogen source.

In an embodiment, to improve the longevity of nitrogen in the soil, it has been found that one can incorporate both a nitrification inhibitor and AMP acids and their salts with a fertilizer. In an embodiment, the improved delivery systems of the present invention can be utilized as a vehicle to impart one or more nitrification inhibitors such as, but not limited to 2-chloro-6-(trichloromethyl)pyridine, 4-Amino-1,2,4-6-triazole-HCl, 2,4-Diamino-6-trichloromethyltriazine CL-1580, Dicyandiamide (DCD), thiourea, 1-Mercapto-1,2,4-triazole, DCD/formaldehyde reaction products, methylene bis dicyandiamide and 2-Amino-4-chloro-6-methylpyrimidine. The combined impact of using a nitrification inhibitor together with AMP acids and their salts in solution in the NOSDS lowers the cost of fertilizer by utilizing a one-step application to granules and delivering optimized levels of both inhibitors improving the longevity of nitrogen in the soil.

Thus, in one embodiment, the present invention relates to compositions comprising NOSDS and AMP acids and their salts wherein the NOSDS:

Are environmentally safe;
Have flashpoints above 145° F.;
Are inherently rated safe for contact with humans and animals;
Maintain AMP acids and their salts at levels of 1-80% in solution to storage temperatures down to at least 10° C.;
Provides improved even application to fertilizer granules of urease inhibitors while not causing clumping of the granules.

Thus, in an embodiment, not to be bound by theory, the present invention relates to improved hydrolytic, low pH and thermal stabilities of the AMP acids and their salts, over alkyl thiophosphoramides in which N-(n-butyl) thiophosphoric triamide (NBPT) is one particularly effective urease inhibitor. In one embodiment, because the NOSDS is effectively non-water containing, a combination of AMP acids and their salts and NBPT can be formulated utilizing two different urease inhibitors in one solvent delivery system In one embodiment, it has also been discovered that while various organo-liquids might meet some of the above criteria, the delivery system of the present invention can be optimized to provide a formulation with a high concentration of inhibitors while maintaining a low chill point by combining two or more organo-liquids in a solvating system. In one embodiment, the NOSDS can also serve as the reaction medium for the synthesis of the AMP acids and their salts.

In one embodiment, the present invention relates to an effective solvent combination that comprises dimethyl sulfoxide (DMSO), which can be used in combination with another organo-liquid delivery system that has a low chill point and good solvating properties. One advantage of using DMSO is that DMSO can be a source of the important nutrient of sulfur.

In an embodiment, the present invention relates to compositions that imparts to one or more nitrogen sources selected from the group consisting of i) urea, ii) urea, formaldehyde reaction products, iii) urea, formaldehyde, and ammonia reaction products, iv) manure, v) dicyandiamide and vi) compost an increased longevity of plant available nitrogen in the plant growth mediums. In an embodiment, the one or more treated nitrogen sources are a dry, flowable composition produced by coating one or more nitrogen sources with compositions comprised of a) one or more urease inhibitors and b) a non-aqueous organic solvent delivery system (NOSDS), wherein the one or more urease inhibitors comprise between about 60-95%, 65-95%, 70-95%, 75-95%, 80-95%, 85-95%, 60-80%, 65-80%, 70-80%, 75-80%, 60-70%, and 65-70% by weight of the compositions. In a variation, the resulting coated nitrogen sources become a delivery system for imparting effective levels urease inhibitions at about at least 0.02 ppm to plant growth mediums. In an embodiment, the resulting coated nitrogen sources becomes a delivery system for imparting effective levels urease inhibitions at 0.02-5,000 ppm, 1-1000 ppm, and 5-100 ppm to the plant growth mediums. The urease inhibitor coated nitrogen sources can be mixed with other granular, natural or synthetic fertilizers. In a variation, the urease inhibitor coated nitrogen sources can be added to water to produce a liquid urea fertilizer, wherein the aqueous liquid fertilizer becomes a delivery system for imparting effective levels of urease inhibitions to the plant growth medium. The inclusion of urease inhibitors inhibits the enzymatic action of urease on urea and UFP slowing the conversion of urea nitrogen to ammoniacal nitrogen.

In an embodiment, the compositions comprise concentrations of urease inhibitors, wherein the concentration of urease inhibitors is within the percent weight range of between about 60-95%, 65-95%, 70-95%, 75-95%, 80-95%, 85-95%, 60-80%, 65-80%, 70-80%, 75-80%, 60-70%, and 65-70% of the compositions, and wherein these compositions are liquid and fluid at temperatures in the range of between about −20-70° C.

In a variation, the compositions are topically applied to nitrogen sources, wherein the nitrogen sources are at temperatures of between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., and 30-40° C., wherein the treated nitrogen sources composition comprise between about 0.01-10%, 0.01-8%, 0.01-6%, 0.01-4%, 0.01-3%, 0.01-2%, 0.1-10%, 0.1-8%, 0.1-6%, 0.1-4%, 0.1-2%, 0.1-1%, 0.1-0.75%, 0.1-0.5%, 0.1-0.25%, 0.25-10%, 0.25-5%, 0.25-1%, 0.25-0.75%, 0.5-10%, 0.5-5%, 0.5-2%, 0.5-1%, 0.5-0.75%, 1-10%, 2-10%, 3-10%, 4-10%, 5-10%, 6-10%, 1-5%, and 1-6% of one or more urease inhibitors.

In an embodiment, the present invention comprises compositions that imparts to one or more nitrogen sources selected from the group consisting of i) urea, ii) urea, formaldehyde reaction products, iii) urea, formaldehyde, and ammonia reaction products, iv) manure, v) dicyandiamide and vi) compost an increased longevity of plant available nitrogen in the plant growth medium, wherein the composition is liquid and fluid at temperatures in the range of between about −20 to 70° C., −20 to 50° C., −20 to 40° C., −20 to 30° C., −10 to 70° C., 0 to 70° C., 10 to 70° C., 20 to 70° C., 30 to 70° C., 40 to 70° C., 50 to 70° C., 60 to 70° C., 20 to 60° C., 30 to 60° C., 40 to 60° C., 50 to 60° C., 20 to 50° C., 30 to 50° C., 40 to 50° C., 20 to 40° C., and 30 to 40° C., wherein the composition comprises a) one or more urease inhibitors and b) NOSDS, and wherein the urease inhibitors are in the percent weight ranges of between about 60-95%, 65-95%, 70-95%, 75-95%, 80-95%, 85-95%, 60-80%, 65-80%, 70-80%, 75-80%, 60-70%, and 65-70% of the compositions.

In an embodiment, the compositions comprise a NOSDS, wherein the NOSDS comprises one or more polar aprotic solvents. In a variation, the NOSDS comprises one or more solvent selected from the group consisting of polar aprotic, aprotic and protic solvents.

In one embodiment, the delivery formulations have been developed that deliver effective levels of urease inhibitors as a coating on nitrogen sources particles that increase the plant available nitrogen longevity of particulate fertilizers when applied to plant growth mediums. In an embodiment, it has been found that the delivery formulations of the present invention provide a liquid vehicle at temperature ranges of between about −20 to 70° C., −20 to 50° C., −20 to 40° C., −20 to 30° C., −10 to 70° C., 0 to 70° C., 10 to 70° C., 20 to 70° C., 30 to 70° C., 40 to 70° C., 50 to 70° C., 60 to 70° C., 20 to 60° C., 30 to 60° C., 40 to 60° C., 50 to 60° C., 20 to 50° C., 30 to 50° C., 40 to 50° C., 20 to 40° C., and 30 to 40° C. for delivering an even, non-clumping application of effective urease inhibitors levels to nitrogen sources surfaces. In a variation, the high concentrations of urease inhibitors are delivered to the surfaces of nitrogen sources particles with minimal NOSDS, wherein the impact on the physical properties of the nitrogen sources particles is minimized by low levels of the NOSDS.

In an embodiment, these new liquid delivery compositions for coating nitrogen sources are based on a non-aqueous organic solvent delivery system (NOSDS), which improves storage life of urease inhibitors such as alkyl thiophosphoric triamides over those formulations containing greater than 1% water.

In an embodiment, the compositions can further comprise a colorant, wherein the colorant composition does not comprise water or alcohol. In a variation, colorants are dissolved into the composition or into a NOSDS which is then added to the composition to enhance visual conformation of the evenness of the coating of nitrogen sources' surfaces.

In an embodiment, the compositions can further comprise one or more members selected from the group consisting of surfactants, buffers, fragrance/odor masking agents, micronutrients, and flow modifiers such as silicas.

DETAILED DESCRIPTION

Figure 1:
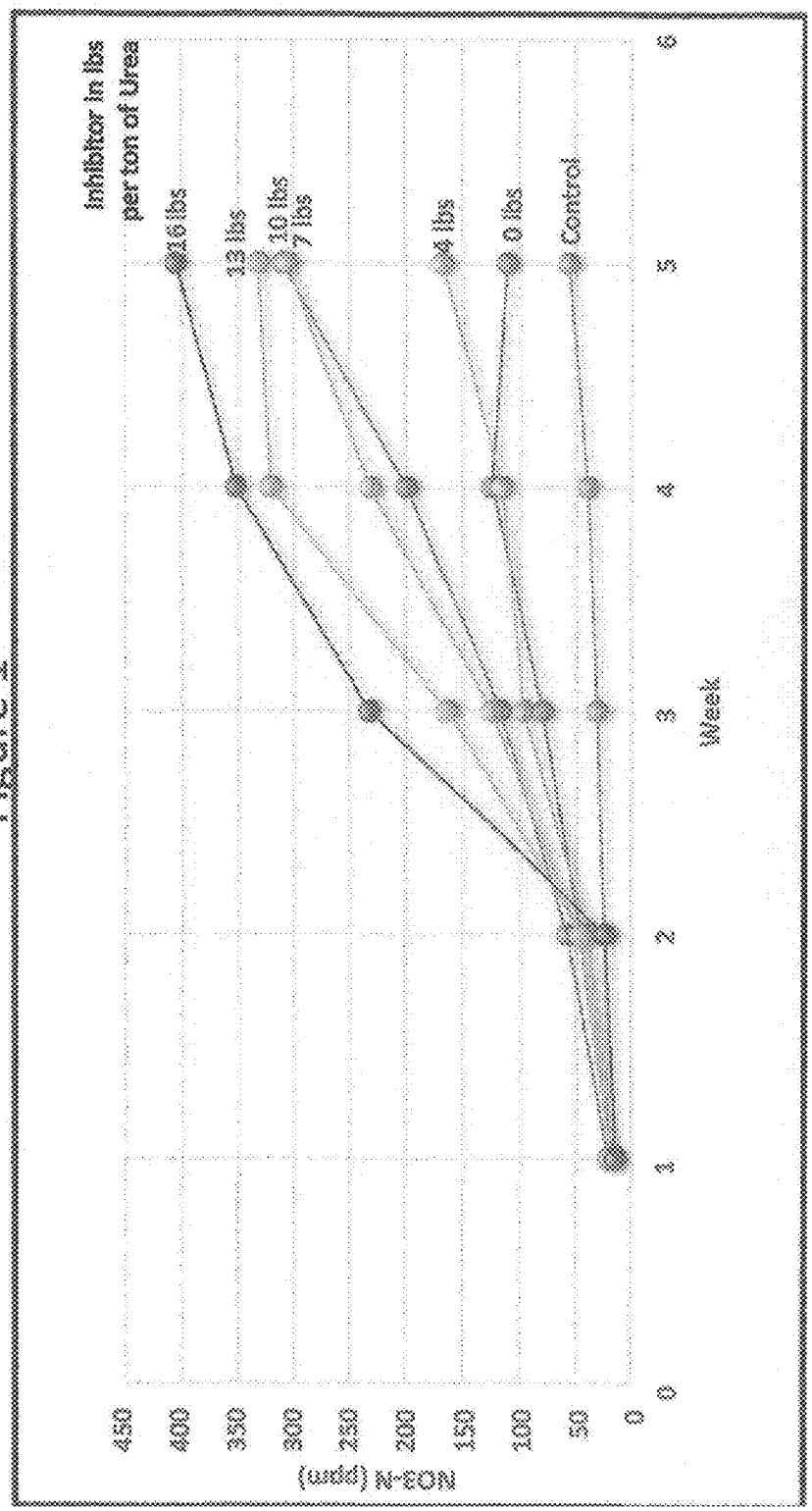
FIG. 1: Nitrate nitrogen concentration for soil samples with varying levels of liquid containing nitrification inhibitor (lbs. per ton of urea) for one to five weeks post urea application, with soil moisture adjusted weekly to 80% field capacity.

The following words are given the meanings ascribed below.

Fertilizer, in this invention, is defined as any material of natural or synthetic origin that is applied to soils or to plant tissues (usually leaves) to supply one or more plant nutrients essential to the growth of plants in order to increase growth and productivity.

Aqueous Fertilizer, in this invention, is defined as any material of natural or synthetic origin that is dissolved in water to form a solution and then applied to soils or to plant tissues (usually leaves) to supply one or more plant nutrients essential to the growth of plants in order to increase plant growth and productivity. Of particular interest are aqueous solutions marketed as UAN.

UAN, in this invention, is an aqueous solution comprised of the fertilizer components of urea and ammonium nitrate commonly marketed as UAN followed by a number quantifying the % nitrogen present in the product. Example: UAN-30 indicates a composition containing 30% plant available nitrogen.

Protic solvent, in this invention, is a solvent containing a hydrogen atom bonded to an electronegative atom such as oxygen and nitrogen or any molecule which contains a dissociable $H^+$ (proton).

Polar protic solvent, in this invention, is a subset of polar solvent that have high dielectric constants and high polarity. In this invention polar protic solvents are included through the use of the term protic solvent(s).

Aprotic solvent, in this invention, is a solvent that neither accepts nor donates H+(protons) and does not containing dissociable hydrogen.

(aminomethylene)phosphinic acids and bis-(aminomethylene)phosphinic acids, are general names given to a family of compounds containing a phosphinic acid and/or their salts and connected to an amine through a methylene linkage.

Polar aprotic solvent, in this invention, is a subset of aprotic solvents that have high dielectric constants and high polarity. In this invention polar aprotic solvents are included through the use of the term aprotic solvent(s).

AMP acids and their salts are (aminomethylene), di(aminomethylene) and bis-(aminomethylene) phosphinic acids and their salts which are the reaction product of a) hypophosphoric acid, b) one or more aldehydes selected from the group consisting of i) formaldehyde, ii) paraformaldehyde and iii) 1,3-trioxane and c) one or more members selected from the group consisting of i) ammonia ii) ammonium hydroxide iii) one or more organo amines containing an aldehyde reactive nitrogen.

Nitrogen source is a general term used to identify compounds that are utilized to provide nitrogen for plants including but not limited to urea, manure, compost, urea formaldehyde reaction products, urea/ammonia/formaldehyde reaction products, ammonium sulfate, ammonium nitrate, diammonium phosphate, anhydrous ammonia, urea/ammonium nitrate aqueous solutions (UAN) and other urea aqueous solutions.

Mobile liquid form of nitrogen sources is a general description of a liquid form of a nitrogen source that is mobile including but not limited to aqueous dispersions, pressurized ammonia and molten urea and molten modified urea.

OPCF is an abbreviation for Organo Polycarboxylate functionalities.

Organo Polycarboxylate Functionalities: is a general term used to describe an organic compound with a minimum of three carboxylate groups wherein the polycarboxylate compounds are comprised of one or more members selected from the group consisting of a) organic polymers/oligomers containing polycarboxylate functionalities and b) amino carboxylate functionalities wherein the carboxylate functionalities are comprised of one or more members selected from the group consisting of a) carboxylic acids, b) carboxylic anhydrides c) carboxylic imides, d) one or more carboxylic esters and e) carboxylic acid salt wherein said salt is derived from the reaction of a neutralizing agent.

Neutralizing agents are comprised of alkaline compounds that contain one or more members selected from the group consisting of a) one or more metal cations selected from the group consisting of Na, K, Mg, Ca, Fe, Zn, Mn, Cu, Co, Mo and Ni and b) one or more of nitrogen containing compounds selected from the group consisting of ammonia, ammonium hydroxide and organoamines NOSDS is an abbreviation for a non-aqueous organo solvent delivery system.

NAPAOL (non-aqueous polar, aprotic organo liquid): an aprotic NOSDS (non-aqueous organo solvent delivery system) that is used specifically as the reaction medium.

Nitrogen source aqueous solution is a generic term to describe a nitrogen source that has been dissolved in water including but not limited to urea, urea and/or ammonium nitrate (UAN) and other mixed nitrogen sources.

Modified urea is a generic term used to describe urea that has been chemically modified with one or more reactive agents selected from the group consisting of a) formaldehyde, modified formaldehydes including but not limited to paraformaldehyde, trioxane, methoxy capped formaldehyde reaction products including but not limited to 1,3,4,6-Tetrakis(methoxymethyl)glycoluril and N,N,N',N',N'',N''-Hexakis(methoxymethyl)-1,3,5-triazine-2,4,6-triamine and/or may contain one or more bio-active agents.

Bio-active agent is a generic term used to describe compounds manmade and products of natural processes that imparts one or more properties to soil selected from the group consisting of urease inhibition, nitrification inhibition, de-nitrification inhibition, pesticides, herbicides, fungicides and insecticides.

Biologics are bio-active agents that are specified as a different category due to their definition as naturally occurring substances, substances produced by natural processes such as fermentation and/or extracts of naturally occurring substances.

AMP: (aminomethyl) phosphinic acids and their salts

NAPAOL: (non-aqueous polar, aprotic organo liquid): an aprotic NOSDS (non-aqueous organo solvent delivery system) that is used specifically as the reaction medium.

Treated nitrogen source: a composition comprising a nitrogen source and biologically active agents and/or biologics added either through a coating application or added to the nitrogen source during the nitrogen source's production process either in the melt portion or applied to the nitrogen source during the formation of the nitrogen source's granule.

Stable liquid Solutions: flowable compositions wherein the actives are completely dissolved within a NOSDS and do not separate or show more than 5% sedimentation over a period of 30 days.

Substantially free of Water: a composition comprised of less than 5% water.

Ranges are used to describe a range of values and are defined as when a range is discussed, it is contemplated and therefore within the scope of the invention that any number that falls within that range is contemplated as an end point generating a plurality of sub-ranges within that range. For example if a range of 1-10 is given, 2, 3.1, 4.8, 5, 6, 7, 8, and 9 are contemplated as end points to generate a sub-range that fit within the scope of the enumerated range.

Percentage (%) is based on weight in a composition.

Particle(s) is a generic term which describes the physical condition of any solid nitrogen sources such as granules, prills, and powder.

Phosphinic acid organo amines is a generic terms which describes bis(aminomethyl)phosphinic acids, aminomethyl (alkylaminomethyl)phosphinic acids, and di(alkylaminomethy)phosphinic acids. The salts of each of the individual phosphinic acids organo amines are optional.

In an embodiment, the present invention relates to an additive that imparts to liquid or solid manmade fertilizer, manure, waste or compost an increased longevity of plant available nitrogen in the soil wherein the additive is a dry, flowable composition created by coating nitrification inhibitors with urease inhibitors dissolved in NOSDS at concentrations of urease inhibitors of 50-90%. In a variation, nitrification inhibitors can be coated with urease inhibitors dissolved in a blend of polar aprotic and protic solvents. The resulting coated nitrification inhibitor can then be mixed with granular, natural or synthetic, fertilizer or added to fertilizer combination of urea and ammonium nitrate that has been dissolved in water (commercial name of UAN).

The combination of nitrification and urease inhibitors will inhibit biological oxidation of ammonia by soil microbes, such as Nitrosomonas bacteria and inhibit the enzymatic action of urease slowing the conversion urea nitrogen to ammoniacal nitrogen. In one embodiment, improved delivery formulations have been developed that deliver effective levels of urease inhibitors as a coating on nitrifications inhibitors that increase the plant available nitrogen longevity of UAN solutions and granular fertilizers when applied to soil. It has been found that the delivery formulations of the present invention provide a liquid vehicle to deliver an even, non-clumping application of the desired urease inhibitors to the nitrification inhibitor surfaces. These new delivery formulations for coating nitrification inhibitors are based on a Non-aqueous Organic Solvent Delivery System (NOSDS), which improve storage life of urease inhibitors such as alkyl thiophosphoric triamides over those formulations containing greater than 1% water. In fact, because of the present invention, one can now deliver the inhibition of the oxidation of ammonia to nitrates and the conversion of urea to ammonia in an additive that easily dissolves into a liquid fertilizer such as UAN, and as a dry additive for granular fertilize.

In one embodiment, the improved delivery systems of the present invention can be utilized as a vehicle to impart a coating of a urease inhibitor to the surface of nitrification inhibitors comprised of one or more selected from the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, ammonium thiosulfate, 1-mercapto-1,2,4-triazole, dimethylpyrazole organic and inorganic salts and 2-amino-4-chloro-6-methylpyrimidine. The combined impact of using a nitrification inhibitor coated with a urease inhibitor that is dissolved in a Non-aqueous Organic Solvent Delivery System (NOSDS) with enhanced storage stability lowers the cost of fertilizer by delivering optimized and homogeneous levels of both inhibitors improving the longevity of nitrogen in the soil.

In an embodiment, the present invention relates to an additive that imparts to liquid or solid manmade fertilizer, manure, waste or compost an increased longevity of plant available nitrogen in the soil wherein the additive is a dry, flowable composition created by coating dicyandiamide with a N-alkyl thiophosphoric triamide dissolved in a non-aqueous organo liquid system at concentrations of the N-alkyl thiophosphoric triamide in the solvent of 50-90%. The resulting coated DCD can then be mixed with natural or synthetic granular fertilizer or added to fertilizer combination of urea and ammonium nitrate that has been dissolved in water (commercial name of UAN), which will inhibit biological oxidation of ammonia by soil microbes, such as Nitrosomonas bacteria and inhibit the enzymatic action of urease slowing the conversion urea nitrogen to ammoniacal nitrogen.

In one embodiment, the present invention relates to liquid formulations comprised of urease inhibitors and a Non-aqueous Organic Solvent Delivery System (NOSDS) and is designed to coat nitrification inhibitor granules with an effective level of urease inhibitor(s) utilizing simple application equipment such as mixers, blenders and tumblers In an embodiment, an additive that imparts to liquid or solid manmade fertilizer, manure, waste or compost an increased longevity of plant available nitrogen in the soil wherein the additive is a dry, flowable composition comprising one or more solid nitrification inhibitor(s) coated with a liquid formulation comprised of one or more urease inhibitor(s) that have been solubilized within a non-aqueous organo solvent delivery system (NOSDS) wherein the NOSDS is further comprised of one or more aprotic and protic solvent(s)

wherein said aprotic solvent(s) is one or more members selected from the group consisting of:
a. dimethyl sulfoxide
b. and one or more sulfoxide(s) selected from the group consisting of dialkyl, diaryl, or alkylaryl sulfoxide(s) selected from the formula structure:

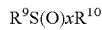

wherein
 i. $R^9$ and $R^{10}$ are each independently a $C_1$-$C_6$ alkylene group, an aryl group or $C_1$-$C_3$ alkylenearyl group
 ii. or $R^9$ and $R^{10}$ with the sulfur to which they are attached form a 4 to 8 membered ring wherein $R^9$ and $R^{10}$ together are a $C_1$-$C_6$ alkylene group which optionally contains one or more atoms selected from the group consisting of O, S, Se, Te, N, and P in the ring
 iii. and x is 1 or 2
c. one or more alkylene carbonates selected from the group consisting of ethylene carbonate, propylene carbonate and butylene carbonate
d. one or more polyols capped with acetate or formate wherein the polyol portion selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin
e. one or more alkylene glycol alkyl ethers acetates selected from the group consisting of dipropylene glycol methyl ether acetate, tripropylene glycol methyl ether acetate, and tripropylene glycol butyl ether acetate
f. one or more diesters selected from the group consisting of dimethylsuccinate, dimethyl adipate, diethyl glutarate, and dimethyl glutarate,
g. one or more alkyl pyrrrolidone selected from the group consisting of 1-Methyl-2-pyrrolidone and cyclohexylpyrrolidone,
h. one or more selected from the group consisting of dimethylacetamide, dimethylformamide, dimethyl-2-imidazolidinone, isophorone, hexamethylphosphoramide, 1,2-dimethyloxyethane, 2-methoxyethyl ether and limonene
i. One or more trialkyl phosphates selected from the group consisting of triethyl phosphate and tributyl phosphate and wherein said protic solvent is one or more members selected from the group consisting of:
a. one or more alcohols selected from the group consisting of the family of $C_1$-$C_{10}$ alkanols
b. one or more polyols selected from the group consisting of trimethylol propane, trimethylol ethane, pentaerythritol, sorbitol and sorbitan, glucose, fructose, galactose, and glycerin
c. one or more polyalkylene glycols selected from the group consisting of poly($C_1$-$C_{10}$ alkylene) glycols,
d. isopropylidene glycerol
e. one or more alkylene glycol alkyl ethers selected from the formula structure:

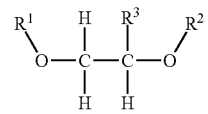

wherein
 i. $R^1$ is one or more members selected from the group consisting of $CH_3$, $C_2H_5$, $C_3H_7$ and $C_4H_9$
 ii. $R^2$ is one or more members selected from the group consisting of H and

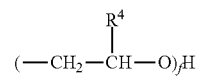

wherein
  (1) $R^4$ is one or more members selected from the group consisting of H and $CH_3$,
  (2) and f is an integer between 1 and 15,
 iii. wherein $R^3$ is one or more members selected from the group consisting of H and $CH_3$
f. one or more alkyl lactates selected from the group consisting of ethyl, propyl and butyl lactate g. one or more alkanolamines selected from the group consisting of alkanolamines selected from the formula structure:

wherein
  i. $R^5$ is one or more members selected from the group consisting of $C_2H_4OR^8$ and $C_3H_6OH$
  ii. $R^6$ is: H, $C_2H_4OR^8$ and $C_3H_6OH$
  iii. $R^7$ is one or more members selected from the group consisting of H, $C_2H_4OR^8$ and $C_3H_6OH$
    wherein
      (1) $R^8$ is $(C_2H_4O)_gH$
        wherein
          (a) g is an integer between 1-10
h. and glycerol carbonate such that said dry, flowable additive's composition weight percent comprises 80-99% nitrification inhibitor, 18-0.5% urease inhibitor and 10-0.2% NOSDS wherein said NOSDS's composition consist of a weight percent range for protic to aprotic solvents of 0%:100% to 100%:0%.

Thus in one embodiment, the present invention relates to improved compositions of a solution of urease inhibitor(s) in a non-aqueous organo solvent delivery system for coating the surface of nitrification inhibitor(s) that:

Are environmentally safe;
Have flashpoints above 145° F.;
Are inherently rated safe for contact with humans and animals;
Forms a liquid solution at 20-70° C. of urease inhibitors comprising a composition consisting of a % weight ratio of NOSDS at 50-10% to urease inhibitors at 50-90 for coating the surfaces of nitrification inhibitors with urease inhibitors
Provides an even and effective coating of urease inhibitor to the surfaces of nitrification inhibitors granules and powders while not causing clumping of the granules or powder.
Assisting the coated nitrification inhibitor granules and powders to easily dissolve in water or aqueous fertilizers resulting in a clear and stable solution ready for application to plants and to soil.

In one embodiment, the present invention relates to compositions having at least 0.5-20% of active urease inhibitor on the surface of nitrification inhibitors.

In one embodiment, it has also been discovered that while various organo-liquids might meet some of the above criteria, the delivery system of the present invention can be optimized to provide a formulation with a high concentration of inhibitors while maintaining a chill point of 20° C. to 60° C. by combining two or more organo-liquids in a solvating system.

In an embodiment, a method of preparing the additive comprises: a. Suspending or making a solution of urease inhibitor(s) in a NOSDS at temperatures 20-70° C. wherein the urease inhibitor is in the % weight range of about 50 to 90%; b. In a separated vessel, placing powder or granular nitrification inhibitor(s) under agitation at 20-70° C.; c. Slowly adding the slurry or solution of the urease inhibitor(s) from "a" to powder or granules of nitrification inhibitor(s) and mixing until the urease inhibitor(s) in NOSDS has uniformly coated the nitrification inhibitor(s) wherein the composition's weight percent comprises 80-99% nitrification inhibitor(s), 18-0.5% urease inhibitor(s) and 10-0.2% NOSDS. In a variation the additive's composition comprises adding a flow modifier to improve handling properties and wherein the additive is a dry, flowable solid.

In an embodiment, the improved delivery formulations have been developed that can impart effective levels of urease inhibitors to the surface of nitrification inhibitors that increase the nitrogen longevity in the soil. These formulations not only provide a liquid vehicle to deliver an even, non-clumping application of the desired inhibitors to the nitrification granules, but it has been discovered that formulations based on non-aqueous solvating systems improve the storage life of the important urease inhibitors, such as alkyl thiophosphoric triamides. Alkyl thiophosphoric triamides have been shown to be extremely effective urease inhibitors but suffer from degradation upon storage if exposed to moisture. Thus, in one embodiment the present invention relates to compositions that are substantially free of water.

In an embodiment, the composition of the liquid urease inhibitor concentrate further comprises of one or more of the group consisting of:
  Nitrification inhibitor(s);
  NOSDS
  Additives such as but not limited to surfactants, buffers, fragrance/odor masking agents, colorants, micro-nutrients, and/or flow modifiers such as silica.

In one embodiment, during the process of coating of the nitrification inhibitors with the liquid urease inhibitor concentrate, one may optionally include one or more of the group consisting of surfactants, buffers, fragrance/odor masking agents, colorants, micro-nutrients, and/or flow modifiers.

In one embodiment, the solvating system of the present invention is a NOSDS, which comprises one or more of the group consisting of: dimethyl sulfoxide, sulfolane, tetramethylene sulfoxide dimethylacetamide, dimethylformamide hexamethylphosphoramide, triethylphosphate, tributyl phosphate, propylene carbonate, ethylene carbonate, butylene carbonate, N-alkyl-2-pyrrolidone, 1,2-dimethyloxyethane, 2-methoxyethyl ether, cyclohexylpyrrolidone, ethyl lactate, and 1,3 dimethyl-2-imidazolidinone, limonene, ethylene glycol, propylene glycol, butylene glycol, trimethylol propane, pentaerythritol, glycerin, trimethylol ethane, polyethylene glycol, polypropylene glycol, polyethylene/polypropylene glycol co-polymer, Tripropylene glycol methyl ether, Tripropylene glycol butyl ether, acetate and/or fumarate capping of glycols which include but are not limited to the following glycols:
  ethylene glycol, propylene glycol, butylene glycol, trimethylol propane, pentaerythritol, glycerin, trimethylol ethane, polyethylene glycol, polypropylene glycol, polyethylene/polypropylene glycol co-polymer, Tripropylene glycol methyl ether, Tripropylene glycol butyl ether.

Additionally, the NOSDS of the present invention may be comprised of one or more of the group consisting of:
  a food coloring or dye that may be used to improve the visual evidence of complete coverage and serve as a visual marker;
  scents or masking agents to improve the odor of the formulations;

Nonionic, anionic, cationic, zwitterionic, and/or amphoteric surfactants to improve formula application performance of nitrification inhibitor granules; and Buffering agents.

In an embodiment, the liquid urease inhibitor concentrate may be utilized to coat nitrification inhibitors comprised of one or more of the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, ammonium thiosulfate, 1-mercapto-1,2,4-triazole, dimethylpyrazole organic and inorganic salts and 2-amino-4-chloro-6-methylpyrimidine.

In one embodiment, the formulations of the present invention may use dicyandiamide as the nitrification inhibitor that is coated with a formulation comprised of dimethyl sulfoxide and n-butyl thiophosphoric triamide (NBPT). Both actives also provide the secondary benefit of being slow release fertilizers. In one embodiment, the fertilizer additive provides for compositions that are substantially free of water. The present invention is also advantageous relative to other systems that have used cost prohibitive coating/adhesion technologies.

In one embodiment of the present invention, the utilization of low temperature application allows for non-clumping of the coated nitrification inhibitor granules. Moreover, the use of low temperature application of a coating comprised of NOSDS and a urease inhibitor limits the thermal degradation of the components. In one embodiment, the present invention allows for the additional benefit of coating utilizing simple equipment such as blenders, tumbler and mixers and does not require molten urea, high temperature, addition of adhesives or coating of a urea formaldehyde polymer with a urease inhibitor. The innovative additive results in urease coated nitrification inhibitor granules that are easily soluble in water and aqueous fertilizers resulting in more even distribution of the urease and nitrification inhibitor when applied to soil or plants.

In an embodiment, the formulation(s) of the present invention may contain one or more nitrification inhibitors coated with one or more urease inhibitors dispersed within the NOSDS.

In an embodiment, the innovative additive's composition comprises one or more urease inhibitors selected from the group consisting of a. One or more alkyl phosphoric amide selected from the formula structure:

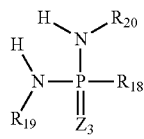

wherein:
i. $R_{18}$ is one or more members selected from the group consisting of $CH_3$, $C_2H_5$, $C_3H_7$, $C_4H_9$, $C_5H_{11}$, $C_6H_{13}$, $C_6H_5$, $C_7H_7$, $OX_4$, $OCH3$, $OC_2H_5$, $OC_3H_7$, $OC_4H_9$, $OC5H11$, $OC_6H_{13}$, and $HNR_{21}$
wherein
(1) $R_{21}$ is one or more members selected from the group consisting of H, $CH_3$, $C_2H_5$, $C_3H_7$, $C_4H_9$, $C_5H_{11}$ and $C_6H_{13}$ (2) $X_4$ is one or more members selected from the group consisting of
(a) H, Na, Li and K,
(b) $NH_4$
(c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.
ii. $R_{19}$ is one or more members selected from the group consisting of H, $CH_3$, $C_2H_5$, $C_3H_7$, $C_4H_9$, $C_5H_{11}$ and $C_6H_{13}$,
iii. $R_{20}$ is one or more members selected from the group consisting of H, $CH_3$, $C_2H_5$, $C_3H_7$, $C_4H_9$, $C_5H_{11}$ and $C_6H_{13}$
iv. $Z_3$ is one or more members selected from the group consisting of Oxygen and Sulfur.

b. One or more (aminomethylene)phosphinic acids and their salts selected by the formula structure:

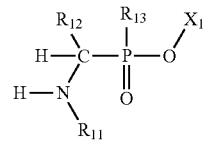

wherein:
i. $R_{11}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$,
ii. $R_{12}$ is one or more members selected from the group consisting of H, $CH_3$, $C_2H_5$, $C_3H_7$, $C_4H_9$, $C_5H_{11}$ and $C_6H_{13}$,
iii. $R_{13}$ is one or more members selected from the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, $OC5H11$, $OC_6H_{13}$, $OC_7H_{15}$ and $OC_8H_{17}$
wherein
(1) $X_3$ is one or more members selected from the group consisting of selected from the group consisting of:
(a) H, Na, Li, Mg, Ca, Fe, Zn, Mn, Cu, Co, Mo, Ni and K,
(b) $NH_4$
(c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.
iv. $X_1$ is one or more members selected from the group consisting of
(a) H, Na, Mg, Ca, Fe, Zn, Mn, Cu, Co, Mo, Ni, Li and K,
(b) $NH_4$
(c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.
  v. $Z_1$ is one or more members selected from the group consisting of Oxygen and Sulfur.
c. and one or more bis-(aminomethylene)phosphinic acids and their salts selected from the formula structure:

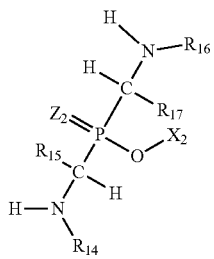

wherein:
  i. $R_{14}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$
  ii. $R_{15}$ is one or more members selected from the group consisting of H, $CH_3$, $C_2H_5$, $C_3H_7$, $C_4H_9$, $C_5H_{11}$ and $C_6H_{13}$
  iii. $R_{16}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$
  iv. $R_{17}$ is one or more members selected from the group consisting of H, $CH_3$, $C_2H_5$, $C_3H_7$, $C_4H_9$, $C_5H_{11}$ and $C_6H_{13}$
  v. $X_2$ is one or more members selected from the group consisting of
    (a) H, Na, Li, Mg, Ca, Fe, Zn, Mn, Cu, Co, Mo, Ni and K,
    (b) $NH_4$
    (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.
  vi. $Z_2$ is one or more members selected from the group consisting of Oxygen and Sulfur.

In a variation, the additive's composition comprises the urease inhibitor N-(n-butyl) thiophosphoric triamide.

In one embodiment, the present invention relates to using a low temperature dispersion procedure (20° C.-70° C.) with one or more phosphoric triamides in a formulation. In one variation, this low temperature procedure and the application of the formulation to the surface of pre-formed nitrification inhibitor granules prevents thermal degradation of these phosphoric triamides.

In an embodiment, nitrification inhibitor granules can be charge to a ribbon blender and warmed to 30-70° C. A solution comprised of a urease inhibitor, a colorant and a NOSDS can be sprayed on the surface of the nitrification inhibitor while under agitation and mixed until a homogeneous coating can be observed. A flow aid comprised of one or more from the group consisting of silicas, nonionic surfactants, soaps, inorganic powders, or nonionic surfactants may be added to improve the flow and/or the dispersability of the powder. In a variation, the temperature of the NOSDS and urease inhibitor based product can be heated to 70° C. max In an embodiment, the innovative additive can be applied to soil in either a liquid or granular form to provide improved nitrogen retention in the soil for uptake for plant life.

In an embodiment, the innovative additive's composition further comprises an aqueous solution of the 0.1-10 weight % of said additive added to manure, waste or compost. In a variation, the addition of the aqueous solution of the additive can be applied to manure, waste or compost by automated spray or metering system or by manual sprayer to improve the longevity of the nitrogen content of these organic fertilizers.

In an embodiment, the present invention is based on urease inhibitor coating on the surface of nitrification inhibitors comprising of one or more of the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts and 2-amino-4-chloro-6-methylpyrimidine. In an embodiment, the urease inhibitor coating on nitrification inhibitors is achieved through the liquid urease inhibitor concentrate composition comprised of urease inhibitors from the group consisting of one or more of a) phosphoric triamides, thiophosphoric triamides and alkylated thiophosphoric triamides, wherein the alkylated thiophosphoric triamides has one or more alkyl groups that independently contain between 1 and 6 carbon atoms, b) (aminomethylene) phosphinic acids and their salts and c) bis-(aminomethylene) phosphinic acids and their salts.

In an embodiment, the composition may comprise one or more of surfactants, buffers, fragrance/odor masking agents, colorants, micro-nutrients, and/or flow modifiers.

In an embodiment, the composition is substantially free of water.

In one embodiment, the additive relates to liquid formulations comprised of NBPT and a Non-aqueous Organic Solvent Delivery System (NOSDS) and is designed to coat nitrification inhibitor granules with an effective level of NBPT utilizing simple application equipment such as mixers, blenders and tumblers.

In an embodiment the NOSDS is comprised of aprotic and protic solvents wherein
  said protic solvent(s) is selected from of one or more of the group consisting of: 1) an alcohol from the family of C1-10 alkanols, 2) one or more polyols from the group consisting of trimethylol propane, trimethylol ethane, pentaerythritol, sorbitol and sorbitan, glucose, fructose, galactose, and glycerin, 3) poly(C1-10 alkylene) glycols, 4) one or more alkylene glycols from the group consisting of ethylene glycol, 1,3 propylene glycol, 1,2 propylene glycol, and butylene glycol, 5) isopropylidene glycerol 6) one or more alkylene glycol alkyl ethers represented by the structure:

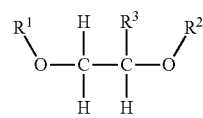

Wherein
$R^1$ is: $CH_3$, $C_2H_5$, $C_3H_7$ or $C_4H_9$
$R^2$ is: H or

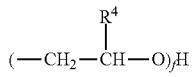

$R^3$ is: H or $CH_3$
$R^4$ is H and/or $CH_3$
And f is an integer between 1 and 15,
7) one or more alkyl lactates from the group consisting of ethyl, propyl and butyl lactate, 8) one or more alkanolamines represented by the structure:

Wherein
$R^5$ is: $C_2H_4OR^8$ or $C_3H_6OH$
$R^6$ is: H, $C_2H_4OR^8$ or $C3H_6OH$
$R^7$ is: H, $C_2H_4OR^8$ or $C_3H_6OH$
R is: $(C_2H_4O)_gH$
And g is an integer between 1 and 10
and 9) glycerol carbonate.
b) and/said aprotic solvent(s) is selected from the group consisting of 1) dimethyl sulfoxide and/or 2) dialkyl, diaryl, or alkylaryl sulfoxide(s) having the formula:

wherein $R^9$ and $R^{10}$ are each independently a $C_{1-6}$ alkylene group, an aryl group, or $C_{1-3}$ alkylenearyl group or $R^9$ and $R^{10}$ with the sulfur to which they are attached form a 4 to 8 membered ring wherein $R^9$ and $R^{10}$ together are a $C_{1-6}$ alkylene group which optionally contains one or more atoms selected from the group consisting of O, S, Se, Te, N, and P in the ring and x is 1 or 2,
3) one or more alkylene carbonates selected from the group consisting of ethylene carbonate, propylene carbonate and butylene carbonate, 4) one or more polyols capped with acetate or formate wherein the polyol portion selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin, 5) one or more alkylene glycol alkyl ethers acetates selected from the group consisting of dipropylene glycol methyl ether acetate, tripropylene glycol methyl ether acetate, and/or tripropylene glycol butyl ether acetate and, 6) isophorone, 7) one or more diesters consisting of dimethylsuccinate, dimethyl adipate, diethyl glutarate, and dimethyl glutarate, 8) dimethylacetamide, 9) dimethylformamide, 10) dimethyl-2-imidazolidinone, 11) 1-methyl-2-pyrrolidone, 12) hexamethylphosphoramide, 13) 1,2-dimethyloxyethane, 14) 2-methoxyethyl ether, 15)cyclohexylpyrrolidone and 16) limonene.
In a variation, the additive that imparts to liquid or solid manmade fertilizer, manure, waste or compost an increased longevity of plant available nitrogen wherein the additive is a dry, flowable composition comprising one or more solid nitrification inhibitor(s) coated with a liquid formulation comprised of one or more urease inhibitor(s) that have been solubilized within a non-aqueous organo solvent delivery system (NOSDS) wherein the NOSDS is comprised of one or more aprotic solvents selected from the group consisting of 1) dimethyl sulfoxide and/or 2) dialkyl, diaryl, or alkylaryl sulfoxide(s) having the formula:

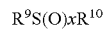

wherein $R^9$ and $R^{10}$ are each independently a $C_{1-6}$ alkylene group, an aryl group, or $C^{1-3}$ alkylenearyl group or $R^9$ and $R^{10}$ with the sulfur to which they are attached form a 4 to 8 membered ring wherein $R^9$ and $R^{10}$ together are a C alkylene group which optionally contains one or more atoms selected from the group consisting of O, S, Se, Te, N, and P in the ring and x is 1 or 2 wherein the composition's weight percent is 80-99% nitrification inhibitor, 18-0.5% urease inhibitor and 10-0.2% polar aprotic solvent(s).
In one embodiment, the liquid urease inhibitor concentrate of the present invention relates to liquid formulations comprised of NBPT and a Non-aqueous Organic Solvent Delivery System (NOSDS) and is designed to coat nitrification inhibitor granules with an effective level of NBPT utilizing simple application equipment such as mixers, blenders and tumblers. In an embodiment the NOSDS is comprised of one or more selected from the group consisting of:
dimethyl sulfoxide, sulfolane, tetramethylene sulfoxide dimethylacetamide, dimethylformamide hexamethylphosphoramide, triethylphosphate, tributylphophate, propylene carbonate, ethylene carbonate, butylene carbonate, N-alkyl-2-pyrrolidone, 1,2-dimethyloxyethane, 2-methoxyethyl ether, cyclohexylpyrrolidone, ethyl lactate, and 1,3 dimethyl-2-imidazolidinone, limonene, ethylene glycol, propylene glycol, butylene glycol, trimethylol propane, pentaerythritol, glycerin, trimethylol ethane, polyethylene glycol, polypropylene glycol, polyethylene/polypropylene glycol co-polymer, tripropylene glycol methyl ether, tripropylene glycol butyl ether, acetate and/or fumarate capping of glycols which include but are not limited to the following glycols:
ethylene glycol, propylene glycol, butylene glycol, trimethylol propane, pentaerythritol, glycerin, trimethylol ethane, polyethylene glycol, polypropylene glycol, polyethylene/polypropylene glycol co-polymer, tripropylene glycol methyl ether, and tripropylene glycol butyl ether.
In an embodiment, the present invention relates to nitrification inhibitor additives. In one embodiment, the nitrification inhibitor additive comprises one or more one or more urease inhibitors dispersed in a NOSDS.
In an embodiment, the additive comprises one or more urease inhibitors that are selected from the group consisting of a) phosphoric triamides, b) thiophosphoric triamides, c) alkylated thiophosphoric triamides, wherein the alkylated thiophosphoric triamides has one or more alkyl groups that independently contain between 1 and 6 carbon atoms, d) (aminomethylene)phosphinic acids and their salts and e) bis-(aminomethylene)phosphinic acids and their salts.
In an embodiment, the present invention relates to making compositions and coating nitrification inhibitors. In one embodiment, the present invention relates to a method of making a composition to be coated on a nitrification inhibitor, wherein the method comprises:
1) heating a mixture comprising of a NOSDS and one or more urease inhibitors that are selected from the group consisting of a) phosphoric triamides, b) thiophosphoric triamides, c) alkylated thiophosphoric triamides, wherein the alkylated thiophosphoric triamides has one or more alkyl groups that independently contain between 1 and 6 carbon atoms, d) (aminomethylene) phosphinic acids and their salts and e) bis-(aminomethylene)phosphinic acids and their salts.

2) to effectuate mixing of the mixture;
3) holding the mixture to a temperature that is fluid and that optionally allows addition of one or more of surfactants, buffers, fragrance/odor masking agents, colorants, micro-nutrients, and/or flow modifiers.

In an embodiment, the method comprises further adding the composition to coat a nitrification inhibitor utilizing simple blending equipment. The coated nitrification inhibitor can then be added to a UAN aqueous solution at levels of 0.5-5% resulting in a clear, stable solution that can then be applied to the soil and as a foliar application.

In one variation, the additive's composition comprises one or more coated nitrification inhibitors selected from the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts and 2-amino-4-chloro-6-methylpyrimidine. In one embodiment, the additive has a composition that is substantially free of water.

In another embodiment, the nitrification inhibitor coated with a urease inhibitor that has been dissolved in a NOSDS is added to an aqueous fertilizer such as a UAN at levels of 0.025-5%.

In an embodiment, a composition consisting of nitrification inhibitor(s) coated with an urease inhibitor that has been solubilized with a NOSDS such that the composition's weight percent is 80-99% nitrification inhibitor, 18-0.5% urease inhibitor and 10-0.1% NOSDS. In one variation the NOSDS is dimethyl sulfoxide. In another variation the nitrification inhibitors comprise one or more from the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, 1-mercapto-1,2, 4-triazole, ammonium thiosulfate, dimethylpyrazole organic and inorganic salts and 2-amino-4-chloro-6-methylpyrimidine. In another variation, the urease inhibitor comprises an alkylthiophosphoric triamide.

In an embodiment, the dry, flowable additive can be added to molten urea at a rate of additive to urea 4 to 20 lbs additive/ton of urea. In a variation, the additive/urea combination can be further processed into granules or prills containing urea with the required amount of nitrification and urease inhibitors to effective extend the longevity of plant available nitrogen in the soil.

Fertilizer coating technology utilizes liquid solutions of inhibitors to impart to the coated urea longevity of plant available nitrogen in the soil. However, this technology has limitations as the application level approaches 0.75% of the liquid coating on urea. Higher % coating levels causes the urea to become wet negatively impacting the coated urea processability in mixing and application equipment with the formation of clogs and high level of deposition of the fertilizer requiring more frequent cleaning and the formation of clumps of fertilizer impacting evenness of fertilizer application to the soil. In an embodiment, % NBPT can be dissolved in % DMSO and then coated on % DCD particle size 0.05-100 microns. In a variation, this innovative additive can be mixed with urea at levels of 5-20 lbs of additive/ton of urea to meet the minimum effective levels of DCD and NBPT required to extend the longevity of plant available nitrogen in the soil. In another variation, the small particle size of the additive allows better adhesion to the urea granule or prill. In another variation, the additive is a dry, flowable powder and will not negatively impact the processibility of urea during the addition process or the application of the urea to the soil.

In an embodiment, the innovative additive can be dissolved in water at weight % of 0.1-5% of the mixture and then easily sprayed onto natural fertilizers such as manure to reduce loss of "N" due to microbial activity. Using a aqueous delivery system for natural fertilizers results in lower cost versus solvent based liquid inhibitors and can be safely applied by automated spraying systems.

In an embodiment, the innovative additive can be easily dissolved into liquid fertilizer systems such as UAN utilizing simple mixing equipment. at application levels of 0.05-5.0%. In a variation, the innovative additive level in a liquid fertilizer can be 0.5-3%.

In an embodiment, the present invention provides for a composition that is easy to dissolve resulting in a clear, stable solution in order to insure homogeneity of the inhibitors throughout the aqueous fertilizer and which can deliver the required levels of urease and nitrification inhibitors in an economically and homogeneous manner to plants and to the soil while technologies utilizing a urea formaldehyde polymer that is coated with NBPT and then mix with DCD powder will have poor solubility in a UAN solution and results in an uneven application level of inhibitors.

In an embodiment, an additive that imparts to liquid or solid manmade fertilizer, manure, waste or compost an increased longevity of plant available nitrogen in the soil wherein the additive is a dry, flowable composition comprising one or more solid nitrification inhibitor(s) coated with a liquid formulation comprised of one or more urease inhibitor(s) that have been solubilized within a non-aqueous organo solvent delivery system (NOSDS) wherein the NOSDS is comprised of one or more aprotic organo solvents selected from the group consisting of:
  a. dimethyl sulfoxide
  b. and one or more sulfoxide(s) selected from the group consisting of dialkyl, diaryl, or alkylaryl sulfoxide(s) selected from the formula structure:

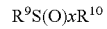

wherein
    i. $R^9$ and $R^{10}$ are each independently a $C_1$-$C_6$ alkylene group, an aryl group or $C_1$-$C_3$ alkylenearyl group
    ii. or $R^9$ and $R^{10}$ with the sulfur to which they are attached form a 4 to 8 membered ring wherein $R^9$ and $R^{10}$ together are a $C_1$-$C_6$ alkylene group which optionally contains one or more atoms selected from the group consisting of O, S, Se, Te, N, and P in the ring
    iii. and x is 1 or 2
  and wherein the NOSDS optional further comprised of one or more aprotic and protic solvents wherein the aprotic solvent(s) is one or more members selected from the group consisting of:
  a. one or more alkylene carbonates selected from the group consisting of ethylene carbonate, propylene carbonate and butylene carbonate
  b. one or more polyols capped with acetate or formate wherein the polyol portion selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin c. one or more alkylene glycol alkyl ethers acetates selected from the group consisting of dipropylene glycol methyl ether acetate, tripropylene glycol methyl ether acetate, and tripropylene glycol butyl ether acetate d. one or more diesters selected from the group consisting of dimethylsuccinate, dimethyl adipate, diethyl glutarate, and dimethyl glutarate, e. one or more alkyl pryrrolidone selected from the group consisting of 1-Methyl-2-pyrrolidone and cyclohexylpyrrolidone, f. one or more selected from the group consisting of dimethylacetamide, dimethylformamide, dimethyl-2-imidazolidinone, isophorone, hexamethylphosphoramide, 1,2-dimethyloxyethane, 2-methoxyethyl ether and limonene g. One or more trialkyl phosphates selected from the group consisting of triethyl phosphate and tributyl phosphate and wherein said protic solvent is one or more members selected from the group consisting of:

a. one or more alcohols selected from the group consisting of the family of $C_1$-C10 alkanols b. one or more polyols selected from the group consisting of trimethylol propane, trimethylol ethane, pentaerythritol, sorbitol and sorbitan, glucose, fructose, galactose, and glycerin c. one or more polyalkylene glycols one or more members selected from the group consisting of poly($C_1$-$C_{10}$ alkylene) glycols, d. isopropylidene glycerol e. one or more alkylene glycol alkyl ethers selected from the formula structure:

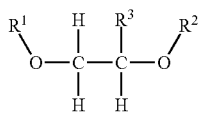

wherein
i. $R^1$ is one or more members selected from the group consisting of $CH_3$, $C_2H_5$, $C_3H_7$ and $C_4H_9$
ii. $R^2$ is one or more members selected from the group consisting of H and

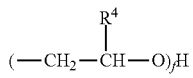

wherein
(1) Where $R^4$ is one or more members selected from the group consisting of H and $CH_3$
(2) and f is an integer between 1 and 15,
iii. wherein $R^3$ is one or more members selected from the group consisting of H and $CH_3$ f. one or more alkyl lactates selected from the group consisting of ethyl, propyl and butyl lactate g. one or more alkanolamines selected from the group consisting of alkanolamines selected from the formula structure:

wherein
i. $R^5$ is one or more members selected from the group consisting of $C_2H_4OR^8$ and $C_3H_6OH$
ii. $R^6$ is: H, $C_2H_4OR^8$ and $C_3H_6OH$
iii. $R^7$ is one or more members selected from the group consisting of H, $C_2H_4OR^8$ and $C_3H_6OH$
wherein
(1) $R^8$ is $(C_2H_4O)_gH$
wherein
(a) g is an integer between 1-10
h. and glycerol carbonate such that said dry, flowable additive's composition weight percent comprises 80-99% nitrification inhibitor, 18-0.5% urease inhibitor and 10-0.2% NOSDS wherein said NOSDS's composition consist of a weight percent range for protic to aprotic solvents of 0%:100% to 100%:0%.

In a variation, an additive that imparts to liquid or solid manmade fertilizer, manure, waste or compost an increased longevity of plant available nitrogen in the soil wherein the additive is a dry, flowable composition comprising one or more solid nitrification inhibitor(s) coated with a liquid formulation comprised of one or more urease inhibitor(s) that have been solubilized within a non-aqueous organo solvent delivery system (NOSDS) wherein the NOSDS is comprised of one or more aprotic solvent(s) wherein said aprotic solvent(s) comprise one or more selected from of the group consisting of:

a. dimethyl sulfoxide
b. one or more sulfoxide(s) selected from of the groups consisting of dialkyl, diaryl, and alkylaryl sulfoxide(s) selected from the formula structure:

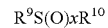

wherein
i. $R^9$ and $R^{10}$ are each independently a $C_1$-$C_6$ alkylene group, an aryl group, and $C_1$-$C_3$ alkylenearyl group
ii. or $R^9$ and $R^{10}$ with the sulfur to which they are attached form a 4 to 8 membered ring wherein $R^9$ and $R^{10}$ together are a $C_1$-$C_6$ alkylene group which optionally contains one or more atoms selected from the group consisting of O, S, Se, Te, N, and P in the ring
iii. and x is 1 or 2 such that said dry, flowable additive's composition weight percent comprises 80-99% nitrification inhibitor, 18-0.5% urease inhibitor and 10-0.2% aprotic solvent (s).

In an embodiment, the innovative additive's composition comprises one or more nitrification inhibitor(s) selected from the group consisting of 2-chloro-6-trichloromethyl) pyridine, 4-amino-1,2,4-6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts and 2-amino-4-chloro-6-methylpyrimidine.

In a variation, the additive's composition comprises one or more nitrification inhibitor(s) selected from the group consisting of 2-chloro-6-trichloromethyl)pyridine, dicyandiamide (DCD), thiourea, ammonium thiosulfate and dimethylpyrazole organic and inorganic salts. In another variation, the additive's composition comprises the nitrification inhibitor dicyandiamide.

In an embodiment, the innovative additive's composition comprises one or more urease inhibitors selected from the group consisting of a. One or more alkyl phosphoric amide selected from the formula structure:

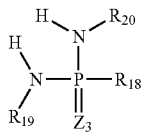

wherein:
  i. $R_{18}$ is one or more members selected from the group consisting of $CH_3$, $C_2H_5$, $C_3H_7$, $C_4H_9$, $C_5H_{11}$, $C_6H_{13}$, $C_6H_5$, $C_7H_7$, $OX_4$, $OCH_3$, $OC_2H_5$, $OC_3H_7$, $OC_4H_9$, $OC_5H_{11}$, $OC_6H_{13}$, and $HNR_{21}$
  wherein
    (1) $R_{21}$ is one or more members selected from the group consisting of H, $CH_3$, $C_2H_5$, $C_3H_7$, $C_4H_9$, $C_5H_{11}$ and $C_6H_{13}$
    (2) $X_4$ is one or more members selected from the group consisting of
      (a) H, Na, Li and K,
      (b) $NH_4$
      (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.
  ii. $R_{19}$ is one or more members selected from the group consisting of H, $CH_3$, $C_2H_5$, $C_3H_7$, $C_4H_9$, $C_5H_{11}$ and $C_6H_{13}$,
  iii. $R_{20}$ is one or more members selected from the group consisting of H, $CH_3$, $C_2H_5$, $C_3H_7$, $C_4H_9$, $C_5H_{11}$ and $C_6H_{13}$
  iv. $Z_3$ is one or more members selected from the group consisting of Oxygen and Sulfur.

b. One or more (aminomethylene)phosphinic acids and their salts selected by the formula structure:

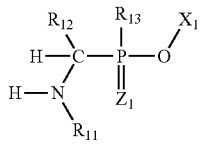

wherein:
  i. $R_{11}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$,
  ii. $R_{12}$ is one or more members selected from the group consisting of H, $CH_3$, $C_2H_5$, $C_3H_7$, $C_4H_9$, $C_5H_{11}$ and $C_6H_{13}$,
  iii. $R_{13}$ is one or more members selected from the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, $OC5H11$, $OC_6H_{13}$, $OC_7H_{15}$ and $OC_8H_{17}$
  wherein
    (1) $X_3$ is one or more members selected from the group consisting of selected from the group consisting of:
      (a) H, Na, Li, Mg, Ca, Fe, Zn, Mn, Cu, Co, Mo, Ni and K,
      (b) $NH_4$
      (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.
    (2) $X_1$ is one or more members selected from the group consisting of
      (a) H, Na, Li, Mg, Ca, Fe, Zn, Mn, Cu, Co, Mo, Ni and K,
      (b) $NH_4$
      (c) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.
  iv. $Z_1$ is one or more members selected from the group consisting of Oxygen and Sulfur.

c. and one or more bis-(aminomethylene)phosphinic acids and their salts selected from the formula structure:

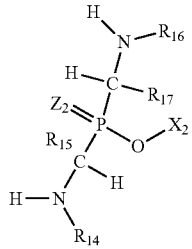

wherein:
  i. $R_{14}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$
  ii. $R_{15}$ is one or more members selected from the group consisting of H, $CH_3$, $C_2H_5$, $C_3H_7$, $C_4H_9$, $C_5H_{11}$ and $C_6H_{13}$
  iii. $R_{16}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$
  iv. $R_{17}$ is one or more members selected from the group consisting of H, $CH_3$, $C_2H_5$, $C_3H_7$, $C_4H_9$, $C_5H_{11}$ and $C_6H_{13}$
    (1) $X_2$ is one or more members selected from the group consisting of
      (a) H, Na, Li, Mg, Ca, Fe, Zn, Mn, Cu, Co, Mo, Ni and K, (b) NH$_4$ (c) one or more organoamines selected from the group consisting of mono C$_{1-6}$ amine, di C$_{1-6}$ amine, tri C$_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine.

v. Z$_2$ is one or more members selected from the group consisting of Oxygen and Sulfur.

In a variation, the additive's composition comprises one or more urease inhibitors selected from the group consisting of N-(n-butyl) thiophosphoric triamide and (hexylaminomethylene, aminomethylene) phosphinic acid (C$_8$H$_{20}$N$_2$O$_2$P) and/or its salts wherein said salt is derived from the reaction of a neutralizing agents with the phosphinic acid and wherein said neutralizing agents are comprised of a) one or more metal cations wherein metal cations are derived from one or more members selected from the group consisting of i) elemental metals ii) metal oxides iii) metal hydroxides, iv) metal alkylates and v) metal carbonates wherein the one or more metal cations' portion of the neutralizing agent is selected from the group consisting of Na, K, Mg, Ca, Fe, Zn, Mn, Cu, Co, Mo and Ni.

In a variation, the additive's composition comprises the urease inhibitor N-(n-butyl) thiophosphoric triamide.

In an embodiment, the additive's composition is comprised of urease inhibitors that are in a solution within the NOSDS at a weight ratio of 50-90% urease inhibitors to 50-10% NOSDS.

In an embodiment, the additive's composition further comprises one or more biologics selected from the group consisting of:

i. *Bacillus* biologics, ii) *Azospirillum* biologics, iii) *Azobacter* biologics iv) *Gluconacetobacter* biologics, v) *Phosphobacteria*, vi) *Cyanobacteria*, vii) *Herbaspirillum*, viii) *Burkholderia*, ix) *Pseudomonas*, x) *Gluconacetobacter*, xi) *Enterobacter*, xii) *Klebsiella*, xiii) *Burkholderia*, xiv) *Bradyrhiwbium* species, xv) *Bradyrhiwbium japonicum*, xvi) *Rhizobium meliloti*, xvii) *Laccaria bicolor*, xviii) *Glomus imraradices timanita*, xix) *Actinomyces*, xx) *Penicillium*, xxi) *Mesorhizobiwn cicero*, xxii) one or more insecticidal or insect repellent microbial species and strains selected from the group consisting of:

*Telenomus podisi, Baculovirus anticarsia; Trichogramma pretiosum, Trichogramma gallai, Chromobacterium subtsugae, Trichoderma fertile, Beauveria bassiana, Beauveria bassiana, Beauveria bassiana, Paecilomyces jknwsoroseu!.•, Trichoderma harzianum, Verticillium lecanii, Lsarfofumosarosea lecanicillium muscarium, Streptomyces microflavus, Muscodor albus,* xxiii) one or more nematodal microbial species and strains selected from the group consisting of:

*Myrothecium verrucaria, Pasteuria* species, *Pasteuria metarhizium* species, *Flavobacteriwn* species xxiv) *Reynoutria sachalinensis* xxv) one or more antifungal, antimicrobial and/or plant growth promoting microbial species and strains selected from a group consisting of:

*Gliocladium* species, *Pseudomonas* species (e.g. *Pseudomonas fluorescens, Pseudomonas fluorescens. putida* and *P. chlororaphis*), *Pseudomonas fluorescens* VP5, *Pseudomonas diazotrophicus, Enterobacter cloacae, Trichodema* species, *Trichoderma virens, Trichoderma atroviride* strains, *Coniothyrium minitans, Gliocladium* species, *Gliacladium virens, Gliacladium roseum, Trichodemw harzianum* species, xxvi) Spore forming species of bacteria;

xxvii) Spore forming species of fungi;

xxviii) Mycorrhizal organisms including: *Laccaria bicolor, Glomus intraradices,* and *Amanita* species;

xxix) *Actinomyces* species and strains thereof, including: *Streptomyces lydicus, Streptomyces griseoviridis, Streptomyces griseoviridis, Streptomyces microflavus* xxx) *Bacillus* species and strains thereof, including: *Bacillus itchenifomis, Bacillus megaterium, Bacillus pumilus, Bacillus amyloliquefaciens,*

*Bacillus licheniformis, Bacillus oleronius, Bacillus megaterium, Bacillus mojavensis, Bacillus pumilus, Bacillus subtilis, Bacillus circulans, Bacillus globisporus, Bacillus firmus, Bacillus thuringiensis,*

*Bacillus cereus, Bacillus amyloliquefaciens, Bacillus fimms* strain I-1582 (Votivo and Nortica; Bayer), *Bacillus licheniformis. Bacillus lichenformis, Bacillus pumilus, Bacillus subtilis* strains, *Bacillus subtilis,*

*Bacillus amyloliquefaciens Bacillus pumilus, Bacillus thuringiensis galleriae, Bacillus thuringiensis* susp *kurstaki, Bacillus cereus,*

*Bacillus*

*subtilis, Bacillus thuringiensis, Bacillus sphaericus, Bacillus megaterium, B. vallismortis,* xxxi) Species of Plant Growth Promoting Rhizobacteda (PGPRs} and strains thereof, including:

(1) one or more *Gluconacetabacter* species selected from the group consisting of: *Gluconacetobacter diazotrophicus* a,k.a, *Acetobacter diazatrophicus,*

(2) one or more *Spirillum* species selected from the group consisting of:

*Spirillum lipoferum,*

(3) one or more *Azospirillum* species selected from the group consisting of: *Herbaspirillwn seropedicae,*

(4) one or more *Azoarcus* species (5) one or more *Azotobacter* species selected from the group consisting of:

*Burkholderia, Burkholderia* sp., *Paenibacillusp olymyxa,* xxxii) N-fixing bacterial species and strains thereof, including (1) one or more *Rhizobium* species (2) one or more *Bradyrhizobium* species selected from the group consisting of: *Bradyrhizobium japonicum, Rhizobium meliloti* xxxiii) Microbial species and strains thereof that are known to improve nutrient use efficiency, including (1) one or more *Penicillium* species selected from the group consisting of:

*Penicillium bilaii, Penicillium bilaji, Mesorhizobium cicero,* xxxiv) Bacterial species and strains thereof from the group termed Pink-Pigmented Facultative Methylotrophs including *Methylobacterium* species.

In an embodiment, the additive's composition further comprises surfactants, buffers, fragrance/odor masking agents, colorants, micro-nutrients, dispersed nitrification inhibitors and/or flow modifiers.

In an embodiment, the NOSDS further comprises the following criteria
  a. Is environmentally safe;
  b. Have flashpoints above 145° F.;
  c. Is inherently rated safe for contact with humans and animals;
  d. Forms a liquid solution at 20-70° C. of urease inhibitors comprising a composition consisting of a % weight ratio of NOSDS at 50-10% to urease inhibitors at 50-90 for coating the surfaces of nitrification inhibitors with urease inhibitors
  e. Provides an even and effective coating of urease inhibitor to the surfaces of nitrification inhibitors granules and powders while not causing clumping of the granules or powder.
  f. Assisting the coated nitrification inhibitor granules and powders to easily dissolve in water or aqueous fertilizers resulting in a clear and stable solution ready for application to plants and to soil.

In an embodiment, the additive's composition further comprises 0.1-10 weight % of said dry, flowable additive added to an aqueous fertilizer solution to form a homogeneous and stable composition of urease inhibitors, nitrification inhibitors, fertilizer components and water In an embodiment, the additive's composition further comprises blends with liquid or solid manmade fertilizer, manure, waste or compost.

In an embodiment, the additive's composition further comprises an aqueous solution of the 0.1-10 weight % of said additive added to manure, waste or compost.

In an embodiment, the additive's composition consists of <5.0% water.

In an embodiment, a method of preparing the additive comprises: a. Suspending or making a solution of urease inhibitor(s) in a NOSDS at temperatures 20-70° C. wherein the urease inhibitor is in the % weight range of about 50 to 90%; b. In a separated vessel, placing powder or granular nitrification inhibitor(s) under agitation at 20-70° C.; c. Slowly adding the slurry or solution of the urease inhibitor(s) from "a" to powder or granules of nitrification inhibitor(s) and mixing until the urease inhibitor(s) in NOSDS has uniformly coated the nitrification inhibitor(s) wherein the composition's weight percent comprises 80-99% nitrification inhibitor(s), 18-0.5% urease inhibitor(s) and 10-0.2% NOSDS. In a variation the additive's composition comprises adding a flow modifier to improve handling properties and wherein the additive is a dry, flowable solid.

In an embodiment, the stable liquid solutions are designed to be used in conjunction with a nitrogen source or for direct application to the soil to slow or retard the loss of nitrogen in the soil. In an embodiment, these delivery formulations not only provide a liquid vehicle to deliver an even, non-clumping application of [aminomethylene] phosphinic (AMP) acids and their salts along with other desired bioactives to nitrogen sources, but formulations based on NOSDS improve the storage life of the important bioactives, such as alkyl thiophosphoric triamides. Thus, in one embodiment the present invention relates to compositions that are substantially free of water.

In an embodiment, the stable liquid solutions comprise a) NOSDS and b) one or more AMP acids and their salts wherein NOSDS is comprised one or more polar, aprotic solvents selected from the group consisting of:

a) dimethyl sulfoxide,
b) an dialkyl, diaryl, or alkylaryl sulfoxide(s) having the formula:

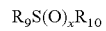

wherein $R_9$ and $R_{10}$ are each independently a $C_{1-6}$ alkylene group, an aryl group, or $C_{1-3}$alkylenearyl group or $R_9$ and $R_{10}$ together with the sulfur to which they are attached form a 4 to 8 membered ring wherein $R_9$ and $R_{10}$ together are a $C_{1-6}$ alkylene group which optionally contains one or more atoms selected from the group consisting of O, S, Se, Te, N, and P in the ring and x is 1 or 2, c) one or more alkylene carbonates selected from the group consisting of ethylene carbonate, propylene carbonate and butylene carbonate d) 1-Methyl-2-pyrrolidone, e) one or more organo phosphorous liquids selected from the group consisting of hexamethylphosphoramide and one or more trialkylphosphates selected from the group represented by the formula:

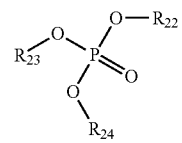

wherein:
  $R_{22}$ is alkyl radical —$C_1H_3$ to —$C_6H_{13}$,
  $R_{23}$ is alkyl radical —$C_1H_3$ to —$C_6H_{13}$,
  $R_{24}$ is alkyl radical —$C_1H_3$ to —$C_6H_{13}$,
f) 1,2-dimethyloxyethane, g) 2-methoxyethyl ether and h) cyclohexylpyrrolidone, and wherein AMP acids and their salts comprise one or more reaction products of:
a) one or more phosphorous acids and/or their salts represented by the following structure:

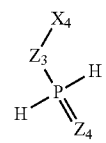

wherein
  $Z_3$ is one or more members selected from the group consisting of oxygen and sulfur and
  $Z_4$ is one or more members selected from the group consisting of oxygen and sulfur,
  $X_1$ is selected from one or more of the group consisting of selected from the group consisting of:
    (1) H, Na, Li and K,
    (2) $NH_4$,
    (3) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine,
b) one or more aldehydes selected from the group consisting of i) formaldehyde, ii) paraformaldehyde and iii) 1,3,5-trioxane and c) one or more members selected from the group consisting of i) ammonia ii) ammonium hydroxide iii) one or more organo amines containing an aldehyde reactive nitrogen selected from the structure:

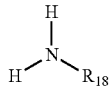

wherein $R_{18}$ is one or more members selected from the group consisting of: H, $CH_3$, $C_2H_5$, $C_3H_7$, $C_4H_9$, $C_5H_{11}$, $C_6H_{13}$, $C_7H_{15}$, $C_5H_{12}N$, $C_6H_{13}N_2$, $C_6H_9N_3$, $C_6H_7N$, $C_5H_{14}N_2$ and $C_8H_{17}$, wherein the resulting composition of the reaction product contains the following AMPs acid and their salts structures:

a.

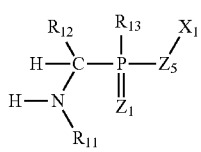

wherein:
i. $R_{11}$ is selected from one or more of the group consisting of H, $CH_3$, $C_2H_5$, $C_3H_7$, $C_4H_9$, $C_5H_{11}$, $C_6H_{13}$, $C_7H_{15}$, $C_5H_{12}N$, $C_6H_{13}N_2$, $C_5H_{14}N_2$, $C_6H_9N_3$, $C_6H_7N$ and $C_8H_{17}$,
ii. $R_{12}$ is selected from one or more of the group consisting of H, $CH_3$, $C_2H_5$, $C_3H_7$, $C_4H_9$, $C_5H_{11}$ and $C_6H_{13}$,
iii. $R_{13}$ is selected from one or more of the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, $OC5H11$, $OC_6H_{13}$, $OC_7H_{15}$ and $OC_8H_{17}$,
iv. $X_3$ is selected from one or more of the group consisting of selected from the group consisting of:
(1) H, Na, Li and K,
(2) $NH_4$,
(3) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine,
v. $X_1$ is selected from one or more of the group consisting of
(1) H, Na, Li and K,
(2) $NH_4$,
(3) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine, vi. $Z_1$ is selected from one or more of the group consisting of Oxygen and Sulfur, b. and one or more di(aminomethylene)phosphinic acids and their salts selected from the formula structure:

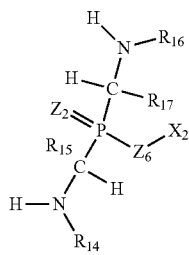

wherein:
i. $R_{14}$ is selected from one or more of the group consisting of H, $CH_3$, $C_2H_5$, $C_3H_7$, $C_4H_9$, $C_5H_{11}$, $C_6H_{13}$, $C_7H_{15}$, $C_6H_{13}N_2$, $C_5H_{14}N_2$, $C_6H_9N_3$, $C_6H_7N$ and $C_8H_{17}$,
ii. $R_{15}$ is selected from one or more of the group consisting of H, $CH_3$, $C_2H_5$, $C_3H_7$, $C_4H_9$, $C_5H_{11}$ and $C_6H_{13}$,
iii. $R_{16}$ is selected from one or more of the group consisting of H, $CH_3$, $C_2H_5$, $C_3H_7$, $C_4H_9$, $C_5H_{11}$, $C_6H_{13}$, $C_7H_{15}$ and $C_8H_{17}$,
iv. $R_{17}$ is selected from one or more of the group consisting of H, $CH_3$, $C_2H_5$, $C_3H_7$, $C_4H_9$, $C_5H_{11}$ and $C_6H_{13}$,
v. $X_2$ is selected from one or more of the group consisting of
(1) H, Na, Li and K,
(2) $NH_4$,
(3) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine,
vi. $Z_2$ is selected from one or more of the group consisting of Oxygen and Sulfur,
vii. $Z_6$ is selected from one or more of the group consisting of Oxygen and Sulfur, wherein the weight composition of the stable liquid solution comprises 20-99% NOSDS and 1-80% AMPs acids and their salts.

In an embodiment, the stable liquid solutions comprise a) NOSDS and b) one or more AMP acids and their salts. In a variation, the stable liquid solutions can further comprise:
a) one or more bio-actives selected from the group consisting of:
(1) One or more biologics selected from the group consisting of:
(a) one or more biologics selected from the group consisting of:
i) *Bacillus* biologics, ii) *Azospirillum* biologics, iii) *Azobacter* biologics iv) *Gluconacetobacter* biologics, v) *Phosphobacteria*, vi) *Cyanobacteria*, vii) *Herbaspirillum*, viii) *Burkholderia*, ix) *Pseudomonas*, x) *Gluconacetobacter*, xi) *Enterobacter*, xii) *Klebsiella*, xiii) *Burkholderia*, xiv) *Bradyrhiwbium* species, xv) *Bra-

*dyrhiwbium japonicum*, xvi) *Rhizobium meliloti*, xvii) *Laccaria bicolor*, xviii) *Glomus imraradices timanita*, xix) *Actinomyces*, xx) *Penicillium*, xxi) *Mesorhizobiwn cicero*, xxii) one or more insecticidal or insect repellent microbial species and strains are selected from the group consisting of:

*Telenomus podisi, Baculovirus anticarsia; Trichogramma pretiosum, Trichogramma gallai, Chromobacterium subtsugae, Trichoderma fertile, Beauveria bassiana, Beauveria bassiana, Beauveria bassiana, Paecilomyces jknwsoroseu, Trichoderma harzianum, Verticillium lecanii, Lsarfofumosarosea lecanicillium muscarium, Streptomyces microflavus*, and *Muscodor albus,* xxiii) one or more nematodal microbial species and strains are selected from the group consisting of:

*Myrothecium verrucaria, Pasteuria* species, *Pasteuria metarhizium* species, and *Flavobacteriwn* species xxiv) *Reynoutria sachalinensis* and xxv) one or more antifungal, antimicrobial and/or plant growth promoting microbial species and strains are selected from the group consisting of *Gliocladium* species, *Pseudomonas* species selected from the group consisting of:

*Pseudomonas fluorescens, Pseudomonas fluorescens. putida* and *P. chlororaphis, Pseudomonas fluorescens* VP5, *Pseudomonas diazotrophicus, Enterobacter cloacae, Trichodema species, Trichoderma virens, Trichoderma atroviride* strains, *Coniothyrium minitans, Gliocladium* species, *Gliacladium virens, Gliacladium roseum*, and *Trichodemw harzianum* species, (b) one or more nitrification inhibitors selected from the group consisting of:

2-chloro-6-trichloromethyl)pyridine, 4-amino-1,2,4,6-triazole-HCl, 2,4-diamino-6-trichloromethyltriazine CL-1580, dicyandiamide (DCD), DCD/formaldehyde reaction products, methylene bis dicyandiamide, thiourea, 1-mercapto-1,2,4-triazole, ammonium thiosulfate, dimethylpyrazole organic and inorganic salts, and 2-amino-4-chloro-6-methylpyrimidine, (c) one or more urease inhibitors selected from the group consisting of:

aliphatic phosphoric triamide, phosphoramides, N-alkyl thiophosphoric triamides (d) and one or more members selected from the group consisting of pesticide(s), herbicides fungicides(s), and insecticide(s)

b) OPCFs c) one or more members selected from the group consisting of:

surfactants, buffers, fragrance/odor masking agents, colorants, micro-nutrients, and flow modifiers such as silica.

In one embodiment, the composition of the stable liquid solutions comprise a) one or more AMP acids and their salts b) one or more nitrification inhibitors and one or more non-AMP acids and their salts urease inhibitors solubilized within a NOSDS wherein the weight percent composition of the NOSDS is 20-99%, the weight percent composition of the AMP acids and their salts is 1-80%, the weight percent of nitrification inhibitors is 0-50% and %, the weight percent of non-AMP acids urease inhibitors is 0-50%. In a variation, These stable liquid solutions can further comprise one or more members selected from the group consisting of: a) surfactants, b) buffers, c) fragrance/odor masking agents, d) colorants, e) micro-nutrients, and f) flow modifiers.

In one embodiment, the NOSDS of the present invention meet one or more of the following criteria:

environmentally safe;

thermally safe because they have flashpoints above 145° F.;

inherently rated safe for contact with humans and animals;

able to maintain AMP acids and their salts at levels of 1-80% in solution to temperatures down to at least 10° C. This ability means that these compositions have relatively long storage lives.

able to provide improved and even application to fertilizer granules of inhibitors while not causing clumping of the granules.

They also provide improved stability of urease inhibitors, primarily alkyl thiophosphoramides such as N-(n-butyl) thiophosphoric triamide (NBPT) which can be used in combination with AMP acids and their salts.

In one embodiment, the present invention relates to stable liquid solutions comprised of a) AMP acids and their salts and b) a Non-aqueous Organic Solvent Delivery System (NOSDS) wherein AMP acids and their salts comprise one or more structures as shown herein.

In an embodiment, the stable liquid solution composition can be further modified by addition of additional NOSDS to modify one or more properties of the stable liquid solution selected from the group consisting of a) viscosity, penetration of a solid surface, adjust inhibitor levels, chill point, dispersibility into a nitrogen source and storage stability wherein the NOSDS is comprised of one or more members selected from the group consisting of a) protic and b) aprotic solvents wherein one or more protic solvents are selected from the group consisting: i) an alcohol from the family of C1-10 alkanols, ii) one or more polyols selected from the group consisting of trimethylol propane, trimethylol ethane, pentaerythritol, sorbitol and sorbitan, glucose, fructose, galactose, and glycerin, iii) poly(C1-10 alkylene) glycols, iv) one or more alkylene glycols selected from the group consisting of ethylene glycol, 1,3 propylene glycol, 1,2 propylene glycol, and butylene glycol, v) isopropylidene glycerol vi) one or more alkylene glycol alkyl ethers represented by the structure:

where $R_1$ is: $CH_3$, $C_2H_5$, $C_3H_7$ or $C_4H_9$ where $R_2$ is: H or
where $R_3$ is: H or $CH_3$
where $R_4$ is H and/or $CH_3$
and f is an integer between 1 and 15,
vii) one or more alkyl lactates selected from the group consisting of ethyl, propyl and butyl lactate, viii) one or more alkanolamines represented by the structure:

where $R_5$ is: $C_2H_4OR_8$ or $C_3H_6OH$
where $R_6$ is: H, $C_2H_4OR_8$ or $C_3H_6OH$
where $R_7$ is: H, $C_2H_4OR_8$ or $C_3H_6OH$
where $R_8$ is: $(C_2H_4O)_gH$
and g is an integer between 1-10,
and ix) glycerol carbonate,
and wherein one or more aprotic solvents are selected from the group consisting of I) dimethyl sulfoxide and/or ii) dialkyl, diaryl, or alkylaryl sulfoxide(s) having the formula:

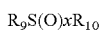

$R_9S(O)xR_{10}$ wherein $R_9$ and $R_{10}$ are each independently a $C_{1-6}$ alkylene group, an aryl group, or $C_{1-3}$ alkylenearyl group or $R_9$ and $R_{10}$ together with the sulfur to which they are attached form a 4 to 8 membered ring wherein $R_9$ and $R_{10}$ together are a $C_{1-6}$ alkylene group which optionally contains one or more atoms selected from the group consisting of O, S, Se, Te, N, and P in the ring and x is 1 or 2, iii) one or more alkylene carbonates selected from the group consisting of ethylene carbonate, propylene carbonate and butylene carbonate, iv) one or more polyols capped with acetate or formate wherein the polyol portion selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin, v) one or more alkylene glycol alkyl ethers acetates selected from the group consisting of dipropylene glycol methyl ether acetate, tripropylene glycol methyl ether acetate, and tripropylene glycol butyl ether acetate and, vi) isophorone, vii) one or more diesters selected from the group consisting of dimethylsuccinate, dimethyl adipate, diethyl glutarate, and dimethyl glutarate, viii) dimethylacetamide, ix) dimethylformamide, x) dimethyl-2-imidazolidinone, xi) 1-Methyl-2-pyrrolidone, xii) hexamethylphosphoramide, viii) 1,2-dimethyloxyethane, xiv) 2-methoxyethyl ether, xv)cyclohexylpyrrolidone and xvi) limonene.

In an embodiment, the liquid composition further comprises one or more nitrification inhibitors selected from the group consisting of 2-chloro-6-trichloromethyl)pyridine, 4-amino-1,2,4,6-triazole-HCl, 2,4-diamino-6-trichloromethyltriazine CL-1580, dicyandiamide (DCD), DCD/formaldehyde reaction products, methylene bis dicyandiamide, thiourea, 1-mercapto-1,2,4-triazole, ammonium thiosulfate, dimethylpyrazole organic and inorganic salts, and 2-amino-4-chloro-6-methylpyrimidine.

In an embodiment the stable liquid solutions further comprises OPCFs and/or their salts wherein the one or more OPCFs is selected from the group consisting of a) organic polymers/oligomers containing polycarboxylate functionalities and b) amino compounds containing polycarboxylate functionalities wherein the carboxylic functionalities are comprised of one or more members selected from the group consisting of a) carboxylic acids, b) carboxylic anhydrides c) carboxylic imides, d) one or more carboxylic esters and e) carboxylic acid salt wherein said salt is derived from the reaction of a neutralizing agent with the carboxylate function and wherein said carboxylic esters is derived from the reaction of said carboxylic function with a protic solvent. In a variation, the neutralizing agents are comprised of one or more metal cations and one or more nitrogen containing compounds wherein the weight percent of OPFCs is 1-50% of the stable liquid solutions' composition.

In an embodiment, the OPCFs comprise organic polymers/oligomers containing polycarboxylate functionalities wherein the composition of the polymers/oligomers are one or more members selected from the group consisting of a) homopolymers, b) copolymers and c) terpolymers which are the reaction products of one or more monomer selected from the group consisting of aspartic acid, glutamic acid, maleic acid, itaconic acid, citraconic acid, citric acid, acrylic acid and methacrylic acid.

In an embodiment, the OPCFs comprise amino compounds containing polycarboxylate functionalities wherein the compounds are derived from one or more amino polycarboxylic acids that are selected from the group consisting of ethylenediaminetetraacetic acid, N-hydroxyethylethlyenediaminetriacetic acid, diethylenetriaminepentaacetic acid, cyclohexanediaminetetraacetic acid, propylenediaminetetraacetic acid, ethylenediamine-N,N'-disuccinic acid, Methylglycinediacetic acid, L-glutamic acid N,N-diacetic acid, nitrilotriacetic acid, N,N bis(carboxymethyl)glutamic acid, Ethylenediamine-N,N'-bis(2-hydroxyphenylacetic acid, N,N'-Bis(2-hydroxybenzyl)ethylenediamine-N,N'-diacetic acid, Glycine, N,N'-ethylenebis(N-salicyl) and Iminodisuccinic acid.

In an embodiment, said neutralizing agents are comprised of one or more metal cations and one or more nitrogen containing compounds. In a variation neutralizing agents are comprised of metal cations derived from one or more members selected from the group consisting of a) elemental metals b) metal oxides c) metal hydroxides, d) metal alkylates and e) metal carbonates and wherein the one or more nitrogen containing compounds is selected from the group consisting of ammonia, ammonium hydroxide and organoamines.

In an embodiment, the one or more metal cations' portion of the neutralizing agent is selected from the group consisting of: Na, K, Mg, Ca, Fe, Zn, Mn, Cu, Co, Mo and Ni.

In an embodiment, one or more organoamine neutralizing agents are selected from the group consisting of: a) mono C1-6 amine, b) di C1-6 amine, c) tri C1-6 amine, d) monoethanolamine, e) diethanolamine, f) triethanolamine, g) monoisopropylamine, h) diisopropylamine, i) triisopropylamine, j) diethylamine, k) diethylene triamine, l) triethyl tetraamine, m) tetraethylpentamine.

In an embodiment, the stable liquid solution can further comprises alkyl phosphoramide and alkyl thiophosphoramide. In a variation the alkyl thiophosphoramide comprises N-(n-butyl) thiophosphoric triamide.

In an embodiment, the stable liquid solutions and the methods to make the instant invention are comprised of:
1) preparation of the AMP acids and/or their salts comprises one or more steps selected from the group consisting of:

a) charge 1 mole of hypophosphorous acid (usually 50% hypophosphorous acid in water). In a variation, the water is displaced with a NAPAOL, (non-aqueous polar, aprotic organo liquid), at 10-40% of the weight of the vessel contents minus its water content through the use of temperatures of 70-90° C. In another variation, the water is removed through the use of temperatures of 70-90° C. and by reducing the pressure of the reaction vessel. In another variation, the hypophosphorous acid is neutralized to a pH 6.5-10 with one or more neutralizing agents that are comprised of one or more members selected from the group consisting of (1) metal cations derived from one or more members selected from the group consisting of a) elemental metals b) metal oxides c) metal hydroxides, d) metal alkylates and e) metal carbonates wherein the metal cations' portion of the neutralizing agent is selected from the group consisting of: Na, K, Mg, Ca, Fe, Zn, Mn, Cu, Co, Mo and Ni, (2) ammonia and (3) ammonium hydroxide, b) agitate the contents of the reaction vessel and charge 1.8-2.5 moles one or more members selected from the group consisting of i) paraformaldehyde, ii) formaldehyde and iii) 1,3,5-trioxane maintaining the vessel contents at 25-70 C. In a variation, vessel content temperature can be controlled by charge rate. In another variation, the vessel content can be controlled by using a vessel with a jacket or coils through which cooling medium can be circulated. In a variation, the temperature of the vessel content can be controlled by charge rate and using a using a vessel with a jacket or coils through which cooling medium can be circulated After completing step b, maintain temperature of vessel content at 40-80° C. or at 50-70° C. or at 55-65° C. for 1 to 8 hours, c) ensure that vessel contents are 25-50° C. and the vessel contents are clears. In a variation, if vessel composition contains water, charge a NAPAOL at 10-35% of the weight of the vessel contents minus its water content and remove the water by reducing the pressure of the reaction vessel. Slowly charge to the vessel 0.8-1.2 moles of one or more reactants selected from the group consisting of i) ammonia ii) ammonium hydroxide iii) organo amines containing an aldehyde reactive nitrogen while maintaining temperature 50-80° C. and hold for 1-6 hours until vessel contents become clear, d) ensure vessel contents are 25-70° C. In a variation a NAPAOL can be added to the vessel contents at 10-40% of the weight of the vessel contents minus its water content to improve fluidity during the water removal step. Slowly charge to the vessel 0.8-1.2 moles of one or more reactants selected from the group consisting of i) ammonia ii) ammonium hydroxide iii) organo amines containing an aldehyde reactive nitrogen while maintaining temperature 50-80° C. and hold for 1-6 hours until vessel contents become clear. In a variation, water is removed from the vessel content by reducing the pressure in the reaction vessel to assist in driving the reaction to completion. In another variation, the pressure reduction to remove water occurs before charging of 0.8-1.2 of the reactants. In another variation, the pressure reduction is staged by charging only a portion of the reactant and allowing the reaction to occur to prevent loss of the reactant. In another variation, an acidic catalyst such as methane sulfonic, hypophosphoric or paratoluene sulfonic acids can be charged to drop pH to 5.0-7.0 to assist in driving the reaction to completion. In another variation, contents of vessel are heated to 90-110° C. and held 30 minutes, e) reduce the pressure the reaction vessel until distillation ceases. In a variation, the reaction vessel pressure is reduced to a pressure reading of <200 mm Hg. In a variation, the reaction vessel pressure is reduced to a pressure reading of <100 mm Hg. In a variation, the reaction vessel pressure is reduced to a pressure reading of 60-100 mm Hg. In a variation, the reaction vessel pressure is reduced to a pressure reading of 40-60 mm Hg. In a variation, the reaction vessel pressure is reduced to a pressure reading of 20-40 mm Hg. In another variation, the reaction vessel pressure is reduced to a pressure reading of <20 mmHg, f) vacuum is discontinued when the % moisture is less than 30%. In a variation, vacuum is discontinued when the % moisture is less than 20%. In a variation, vacuum is discontinued when the % moisture is less than 10%. In a variation, vacuum is discontinued when the % moisture is less than 5%. In another variation, vacuum is discontinued when the moisture is less than 1%, g) after completion of the reaction, the pH is adjusted to 6-10 with one or more neutralizing agents that are comprised of one or more members selected from the group consisting of (1) metal cations derived from one or more members selected from the group consisting of a) elemental metals b) metal oxides c) metal hydroxides, d) metal alkylates and e) metal carbonates wherein the metal cations' portion of the neutralizing agent is selected from the group consisting of: Na, K, Mg, Ca, Fe, Zn, Mn, Cu, Co, Mo and Ni, (2) ammonia and (3) ammonium hydroxide. In a variation, the pH is adjusted to 7.5-9.5. In another variation, the pH is adjusted to 7.5-8.5, and h) the batch is cooled to <40° C., wherein a NAPAOL comprises one or more polar, aprotic solvents selected from the group consisting of: are selected from the group consisting of i) dimethyl sulfoxide ii) dialkyl, diaryl, or alkylaryl sulfoxide(s) having the formula:

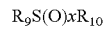

$R_9S(O)xR_{10}$ wherein $R_9$ and $R_{10}$ are each independently a $C_{1-6}$ alkylene group, an aryl group, or $C_{1-3}$ alkylenearyl group or $R_9$ and $R_{10}$ together with the sulfur to which they are attached form a 4 to 8 membered ring wherein $R_9$ and $R_{10}$ together are a $C_{1-6}$ alkylene group which optionally contains one or more atoms selected from the group consisting of O, S, Se, Te, N, and P in the ring and x is 1 or 2, iii) one or more alkylene carbonates selected from the group consisting of ethylene carbonate, propylene carbonate and butylene carbonate, iv) one or more polyols capped with acetate or formate wherein the polyol portion selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin, v) one or more alkylene glycol alkyl ethers acetates selected from the group consisting of dipropylene glycol methyl ether acetate, tripropylene glycol methyl ether acetate, and tripropylene glycol butyl ether acetate and, vi) isophorone, vii) one or more diesters selected from the group consisting of dimethylsuccinate, dimethyl adipate, diethyl glutarate, and dimethyl glutarate, viii) dimethylacetamide, ix) dimethylformamide, x) dimethyl-2-imidazolidinone, xi) 1-Methyl-2-pyrrolidone, xii) hexamethylphosphoramide, viii) 1,2-dimethyloxyethane, xiv) 2-methoxyethyl ether, xv)cyclohexylpyrrolidone and xvi) limonene.

In an embodiment, AMPs and their salts improve urease inhibition of the treated urea over untreated urea. In a variation and not to be bound by theory, AMPs acids and their salts are more hydrolytically and thermally stable versus the traditional phosphoric triamides.

In an embodiment, fertilizer compositions are comprised of a) AMP acids and their salts and b) nitrogen sources wherein one or more nitrogen sources are selected from the group consisting of: urea (molten/solid), manure, compost, urea formaldehyde reaction products (molten/solid), urea/ammonia/formaldehyde reaction products (molten/solid), ammonium sulfate, anhydrous ammonia, urea/ammonium nitrate aqueous solutions (UAN) and other urea aqueous solutions and wherein AMP acids and their salts comprise one or more reaction products of:

b) one or more phosphorous acids and/or their salts represented by the following structure:

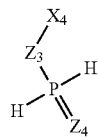

wherein
$Z_3$ is one or more members selected from the group consisting of oxygen and sulfur and
$Z_4$ is one or more members selected from the group consisting of oxygen and sulfur,
$X_1$ is selected from one or more of the group consisting of selected from the group consisting of:
(4) H, Na, Li and K,
(5) $NH_4$,
(6) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine, b) one or more aldehydes selected from the group consisting of i) formaldehyde, ii) paraformaldehyde and iii) 1,3,5-trioxane and c) one or more members selected from the group consisting of i) ammonia ii) ammonium hydroxide iii) one or more organo amines containing an aldehyde reactive nitrogen selected from the structure:

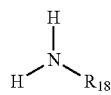

wherein $R_{18}$ is one or more members selected from the group consisting of: H, $CH_3$, $C_2H_5$, $C_3H_7$, $C_4H_9$, $C_5H_{11}$, $C_6H_{13}$, $C_7H_{15}$, $C_5H_{12}N$, $C_6H_{13}N_2$, $C_6H_9N_3$, $C_6H_7N$, $C_5H_{14}N_2$ and $C_8H_{17}$, wherein the resulting composition of the reaction product contains the following AMPs acid and their salts structures:

c.

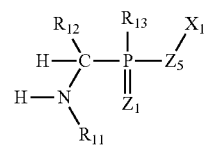

wherein:
i. $R_{11}$ is selected from one or more of the group consisting of H, $CH_3$, $C_2H_5$, $C_3H_7$, $C_4H_9$, $C_5H_{11}$, $C_6H_{13}$, $C_7H_{15}$, $C_5H_{12}N$, $C_6H_{13}N_2$, $C_5H_{14}N_2$, $C_6H_9N_3$, $C_6H_7N$ and $C_8H_{17}$,
ii. $R_{12}$ is selected from one or more of the group consisting of H, $CH_3$, $C_2H_5$, $C_3H_7$, $C_4H_9$, $C_5H_{11}$ and $C_6H_{13}$,
iii. $R_{13}$ is selected from one or more of the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, $OC5H11$, $OC_6H_{13}$, $OC_7H_{15}$ and $OC_8H_{17}$,
iv. $X_3$ is selected from one or more of the group consisting of selected from the group consisting of:
(1) H, Na, Li and K,
(2) $NH_4$,
(3) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine,
v. $X_1$ is selected from one or more of the group consisting of
(1) H, Na, Li and K,
(2) $NH_4$,
(3) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine,
vi. $Z_1$ is selected from one or more of the group consisting of Oxygen and Sulfur,
d. and one or more di(aminomethylene)phosphinic acids and their salts selected from the formula structure:

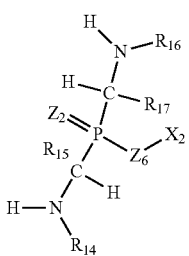

wherein:
i. $R_{14}$ is selected from one or more of the group consisting of H, $CH_3$, $C_2H_5$, $C_3H_7$, $C_4H_9$, $C_5H_{11}$, $C_6H_{13}$, $C_7H_{15}$, $C_6H_{13}N_2$, $C_5H_{14}N_2$, $C_6H_9N_3$, $C_6H_7N$ and $C_8H_{17}$,
ii. $R_{15}$ is selected from one or more of the group consisting of H, $CH_3$, $C_2H_5$, $C_3H_7$, $C_4H_9$, $C_5H_{11}$ and $C_6H_{13}$,
iii. $R_{16}$ is selected from one or more of the group consisting of H, $CH_3$, $C_2H_5$, $C_3H_7$, $C_4H_9$, $C_5H_{11}$, $C_6H_{13}$, $C_7H_{15}$ and $C_8H_{17}$,
iv. $R_{17}$ is selected from one or more of the group consisting of H, $CH_3$, $C_2H_5$, $C_3H_7$, $C_4H_9$, $C_5H_{11}$ and $C_6H_{13}$,
v. $X_2$ is selected from one or more of the group consisting of
(1) H, Na, Li and K,
(2) $NH_4$,
(3) one or more organoamines selected from the group consisting of mono $C_{1-6}$ amine, di $C_{1-6}$ amine, tri $C_{1-6}$ amine, mono ethanol amine, diethanol amine, triethanol amine, monoisopropanol amine, diisopropanol amine, triisopropanol amine, ethylene diamine diethylene triamine, triethylene tetraamine, and tetraethylene pentamine,
vi. $Z_2$ is selected from one or more of the group consisting of Oxygen and Sulfur,
vii. $Z_6$ is selected from one or more of the group consisting of Oxygen and Sulfur,
wherein the weight composition of the fertilizer comprises one or more AMP acids and their salts at 0.1-8% and the one or more nitrogen sources at 99.9-92%.

In a variation, the composition of the fertilizer can further comprise NOSDS wherein the composition of the NOSDS is comprised of one or more members selected from the group consisting of a) protic and b) aprotic solvents
wherein one or more protic solvents are selected from the group consisting: i) an alcohol from the family of C1-10 alkanols, ii) one or more polyols selected from the group consisting of trimethylol propane, trimethylol ethane, pentaerythritol, sorbitol and sorbitan, glucose, fructose, galactose, and glycerin, iii) poly(C1-10 alkylene) glycols, iv) one or more alkylene glycols selected from the group consisting of ethylene glycol, 1,3 propylene glycol, 1,2 propylene glycol, and butylene glycol, v) isopropylidene glycerol vi) one or more alkylene glycol alkyl ethers represented by the structure:

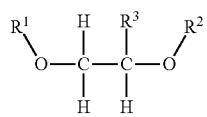

where $R_1$ is: $CH_3$, $C_2H_5$, $C_3H_7$ or $C_4H_9$
where $R_2$ is: H or

where $R_3$ is: H or $CH_3$
where $R_4$ is H and/or $CH_3$
and f is an integer between 1 and 15,
vii) one or more alkyl lactates selected from the group consisting of ethyl, propyl and butyl lactate, viii) one or more alkanolamines represented by the structure:

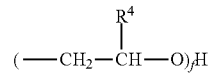

where $R_5$ is: $C_2H_4OR_8$ or $C_3H_6OH$
where $R_6$ is: H, $C_2H_4OR_8$ or $C_3H_6OH$
where $R_7$ is: H, $C_2H_4OR_8$ or $C_3H_6OH$
where $R_8$ is: $(C_2H_4O)_gH$
and g is an integer between 1-10,
and ix) glycerol carbonate,
and wherein one or more aprotic solvents are selected from the group consisting of I) dimethyl sulfoxide and/or ii) dialkyl, diaryl, or alkylaryl sulfoxide(s) having the formula:

$R_9S(O)xR_{10}$ wherein $R_9$ and $R_{10}$ are each independently a $C_{1-6}$ alkylene group, an aryl group, or $C_{1-3}$ alkylenearyl group or $R_9$ and $R_{10}$ together with the sulfur to which they are attached form a 4 to 8 membered ring wherein $R_9$ and $R_{10}$ together are a $C_{1-6}$ alkylene group which optionally contains one or more atoms selected from the group consisting of O, S, Se, Te, N, and P in the ring and x is 1 or 2,
iii) one or more alkylene carbonates selected from the group consisting of ethylene carbonate, propylene carbonate and butylene carbonate, iv) one or more polyols capped with acetate or formate wherein the polyol portion selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin, v) one or more alkylene glycol alkyl ethers acetates selected from the group consisting of dipropylene glycol methyl ether acetate, tripropylene glycol methyl ether acetate, and tripropylene glycol butyl ether acetate and, vi) isophorone, vii) one or more diesters selected from the group consisting of dimethylsuccinate, dimethyl adipate, diethyl glutarate, and dimethyl glutarate, viii) dimethylacetamide, ix) dimethylformamide, x) dimethyl-2-imidazolidinone, xi) 1-Methyl-2-pyrrolidone, xii) hexamethylphosphoramide, viii) 1,2-dimethyloxyethane, xiv) 2-methoxyethyl ether, xv) cyclohexylpyrrolidone and xvi) limonene,
wherein the weight composition of the fertilizer comprises one or more AMP acids and their salts at 0.1-8%, NOSDS at 9.9-2% and the one or more nitrogen sources at 97.9-90%.

In an embodiment, a method to make a fertilizer composition comprises charging a) one or more AMPs acids and their salts that is dissolved into a NOSDS directly into molten urea. In a variation, the AMPs acid and their salts can be dissolved within water and then charged to molten urea.

In an embodiment, fertilizer compositions are comprised of a) one or more AMPs acids and their salts) NOSDS, c) nitrogen sources and d) water wherein one or more nitrogen sources are selected from the group consisting of: urea (molten/solid), manure, compost, urea formaldehyde reaction products (molten/solid), urea/ammonia/formaldehyde reaction products (molten/solid), ammonium sulfate, anhydrous ammonia, urea/ammonium nitrate aqueous solutions (UAN) and other urea aqueous solutions.

In a variation, said stable liquid solutions can be applied to a nitrogen source through a coating or spraying application, added to the urea during the urea production process either in the melt portion or deposited to the urea during the formation of the urea granule when the urea is still hot, blended into liquefied ammonia gas and added to an aqueous fertilizers such as UAN. In a variation, application levels of said AMPs acids and their salts comprise 0.1-8% of the nitrogen source composition. In another variation, the NAPAOL comprises 9.9-2% of the fertilizer composition.

In an embodiment, the present invention relates to stable liquid solutions comprising (aminomethylene) phosphinic acids and their salts utilization as urease inhibitors dissolved in a Non-aqueous Organo Solvent Delivery System (NOSDS).

In an embodiment, the present invention relates to stable liquid solutions comprising (aminomethylene) phosphinic acids and their salts utilization as urease inhibitors in combination with nitrification inhibitors by either blending liquid solutions containing each material or combining the two inhibitors by co-dissolving them together in a non-aqueous organo liquid delivery system (NOSDS).

In an embodiment, the present invention relates to stable liquid solutions comprising (aminomethylene) phosphinic acids and their salts utilization as urease inhibitors in combination with other urease inhibitors by either blending liquid solutions containing each material or combining the two inhibitors by co-dissolving them together in a non-aqueous organo liquid delivery system (NOSDS).

In an embodiment, the present invention relates to stable liquid solutions comprising (aminomethylene) phosphinic acids and their salts utilization as urease inhibitors in combination with Organo Polycarboxylate Functionalities, (OPCF), and their salts by either blending two separate liquid solutions containing each material or combining the by dissolving them together in an non-aqueous organo liquid delivery system (NOSDS) formulation.

In an embodiment, the present invention relates to stable liquid solutions comprising (aminomethylene) phosphinic acids and their salts utilization as urease inhibitors in combination with nitrification inhibitors, urease inhibitors and OPCFs and their salts by either blending liquid solutions containing each material or combining by co-dissolving them together in a NOSDS. In a variation, the resulting stable liquid solutions can then be applied to fertilizer or to just nitrogen sources to impart inhibiting the conversion of a nitrogen source to ammonia and/or nitrate and freeing soil bound phosphates and micronutrients.

In an embodiment, stable liquid solutions comprising a) (aminomethylene) phosphinic acids and their salts utilization as urease inhibitors b) Organo Polycarboxylate acid/imide/anhydride c) DCD-formaldehyde reaction products and d) NOSDS is applied to fresh manure. Not to be bound by theory, the better stability of the AMPs acid and their salts to the environment associate with fresh manure, the slower migration of the DCD-formaldehyde polymer and the presents of a polyacid results in slower conversion of urea to ammonia, slower conversion of ammonia to nitrates, absorption of ammonia released by the fresh manure by the OPCF—acid/imide/anhydride and the binding of the micronutrients available within the manure by the OPCF resulting in a natural fertilizer with superior performance in providing the soil and plants the needed nutrients for growth.

In an embodiment, the stable liquid solutions are designed to be used in conjunction with a nitrogen source or for direct application to the soil to slow or retard the loss of nitrogen in the soil in order to provide nutrients for plant growth.

The following Examples are presented to illustrate certain embodiments of the present invention.

In an embodiment, the compositions are applied to one or more nitrogen sources selected from the group consisting i) urea, ii) urea, formaldehyde reaction products, iii) urea, formaldehyde, and ammonia reaction products, iv) manure, v) dicyandiamide and vi) compost to impart an increased longevity of plant available nitrogen in the plant growth mediums, wherein the compositions comprise one or more urease inhibitors dissolved in NOSDS at concentrations of urease inhibitors in the percent weight ranges of between about 60-95%, 65-95%, 70-95%, 75-95%, 80-95%, 85-95%, 60-80%, 65-80%, 70-80%, 75-80%, 60-70%, and 65-70% of the compositions. In a variation, nitrogen sources can be coated with high levels of urease inhibitors due to the lower levels of organo solvents. In another variation, the resulting coated nitrogen sources particles can then be mixed with granular natural or synthetic fertilizer or dissolved in water resulting in a liquid fertilizer, wherein when applied to plant growth mediums inhibit the urease enzyme activities resulting in an extension of plant available nitrogen. In a variation, nitrogen sources coated with high levels of NBPT can be mixed with other nitrogen sources utilizing the high percent coated nitrogen sources as an urease inhibitor deliver vehicle for the other nitrogen sources. In one embodiment, it has been found that the compositions provides liquid vehicles to deliver even, non-clumping applications of high levels urease inhibitors to the nitrogen sources particles' surfaces with low residual levels of NOSDS. In a variation, high levels of NOSDS can cause nitrogen sources to become wet and sticky creating difficulty in application and negatively impact the physical properties of the nitrogen source particles physical properties. These compositions for coating nitrogen sources' particles are based on a NOSDS, which improve storage life of urease inhibitors such as alkyl thiophosphoric triamides over those formulations containing greater than 1% water.

In an embodiment, the compositions imparts to one or more nitrogen sources selected from the group consisting i) urea, ii) urea, formaldehyde reaction products, iii) urea, formaldehyde, and ammonia reaction products, iv) manure, v) dicyandiamide and vi) compost an increased longevity of plant available nitrogen in the plant growth mediums, wherein the compositions comprise a N-alkyl thiophosphoric triamide dissolved in a non-aqueous organo liquid system at concentrations of the N-alkyl thiophosphoric triamide in a NOSDS at percent weight ranges of between about 60-95%, 65-95%, 70-95%, 75-95%, 80-95%, 85-95%, 60-80%, 65-80%, 70-80%, 75-80%, 60-70%, and 65-70% of the compositions. The resulting coated nitrogen sources particles can be applied with high levels of alkyl thiophosphoric triamides that can then be mixed with natural or synthetic granular fertilizer or dissolved in water and applied to plant growth mediums imparting the inhibition of the enzymatic action of urease slowing the conversion urea nitrogen to ammoniacal nitrogen.

In one embodiment, the present invention relates to formulations comprised of urease inhibitors and a NOSDS and is formulated to coat nitrogen sources particles with an effective level of urease inhibitor(s) utilizing moderate temperatures and simple application equipment such as spray, meter and controlled flow applicators, mixers, blenders and tumblers In an embodiment, compositions imparts to one or more nitrogen sources selected from the group consisting of i) urea, ii) urea, formaldehyde reaction products, iii) urea, formaldehyde, and ammonia reaction products, iv) manure, v) dicyandiamide and vi) compost an increased longevity of the coated nitrogen sources in plant available nitrogen within the plant growth mediums.

In an embodiment, the treated nitrogen sources particles are comprised of a) one or more nitrogen sources and b) compositions comprised of i) one or more urease inhibitors and ii) a NOSDS, wherein the NOSDS is comprised of i) dimethyl sulfoxide and optionally ii) one or more solvents selected from the group consisting of aprotic solvents and protic solvent(s)

wherein said aprotic solvent are one or more members selected from the group consisting of (1) one or more sulfoxide(s) selected from the group consisting of dialkyl, diaryl, and alkylaryl sulfoxide(s) selected from the formula

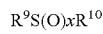

$R^9S(O)xR^{10}$ wherein
(a) $R^9$ and $R^{10}$ are each independently
(i) a $C_1$-$C_6$ alkylene group, an aryl group or $C_1$-$C_3$ alkylenearyl group
(ii) with the sulfur to which they are attached form a 4 to 8 membered ring, wherein $R^9$ and $R^{10}$ together are a $C_1$-$C_6$ alkylene group which optionally contains one or more atoms selected from the group consisting of O, S, Se, Te, N, and P in the ring,
(b) and x is 1 or 2,
(2) one or more alkylene carbonates selected from the group consisting of ethylene carbonate, propylene carbonate and butylene carbonate,
(3) one or more polyols capped with acetate or formate, wherein the polyol portion selected from the group consisting of ethylene glycol, 1,3 propylene glycol, 1,2 propylene glycol, butylene glycol, trimethylol propane, trimethylol ethane, pentaerythritol, sorbitol, sorbitan, glucose, fructose, galactose and glycerin,
(4) one or more alkylene glycol alkyl ethers acetates selected from the group consisting of dipropylene glycol methyl ether acetate, tripropylene glycol methyl ether acetate, and tripropylene glycol butyl ether acetate,
(5) one or more diesters selected from the group consisting of dimethylsuccinate, dimethyl adipate, diethyl glutarate, and dimethyl glutarate,
(6) one or more alkyl pryrrolidone selected from the group consisting of 1-Methyl-2-pyrrolidone, butyl pryrrolidone and cyclohexylpyrrolidone,
(7) one or more members selected from the group consisting of dimethylacetamide, dimethylformamide, dimethyl-2-imidazolidinone, isophorone, 1,2-dimethyloxyethane, 2-methoxyethyl ether and limonene, (8) one or more organo phosphorous liquids selected from the group consisting of hexamethylphosphoramide and one or more trialkylphosphates represented by the structure

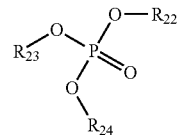

wherein
$R_{22}$ is alkyl radical —$C_1H_3$ to —$C_6H_{13}$,
$R_{23}$ is alkyl radical —$C_1H_3$ to —$C_6H_{13}$,
$R_{24}$ is alkyl radical —$C_1H_3$ to —$C_6H_{13}$, and wherein said protic solvent is one or more members selected from the group consisting of (1) one or more alcohols selected from the group consisting of the family of $C_1$-$C_{10}$ alkanols,
(2) one or more polyols selected from the group consisting of trimethylol propane, trimethylol ethane, pentaerythritol, sorbitol, sorbitan, glucose, fructose, galactose, and glycerin,
(3) one or more polyalkylene glycols selected from the group consisting of poly($C_1$-$C_{10}$ alkylene) glycols,
(4) isopropylidene glycerol,
(5) one or more alkylene glycol alkyl ethers represented by the structure

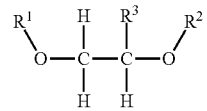

wherein
$R^1$ is one or more members selected from the group consisting of $CH_3$, $C_2H_5$, $C_3H_7$ and $C_4H_9$,
$R^2$ is one or more members selected from the group consisting of H and

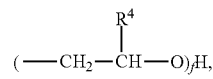

wherein
$R^4$ is one or more members selected from the group consisting of H and $CH_3$,
and f is an integer between 1 and 15,
$R^3$ is one or more members selected from the group consisting of H and $CH_3$,
(6) one or more alkyl lactates selected from the group consisting of ethyl lactate, propyl lactate and butyl lactate,
(7) one or more alkanolamines represented by the structure

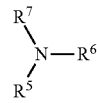

wherein
- $R^5$ is one or more members selected from the group consisting of $C_2H_4OR^8$ and $C_3H_6OH$,
- $R^6$ is H, $C_2H_4OR^8$ and $C_3H_6OH$,
- $R^7$ is one or more members selected from the group consisting of H, $C_2H_4OR^8$ and $C_3H_6OH$, wherein
- $R^8$ is $(C_2H_4O)_gH$, or H, wherein
- g is an integer between 1-10, (8) and glycerol carbonate, wherein the compositions said dry, flowable treated nitrogen sources comprise between about 0.01-10%, 0.01-8%, 0.01-6%, 0.01-4%, 0.01-3%, 0.01-2%, 0.1-10%, 0.1-8%, 0.1-6%, 0.1-4%, 0.1-2%, 0.1-1%, 0.1-0.75%, 0.1-0.5%, 0.1-0.25%, 0.25-10%, 0.25-5%, 0.25-1%, 0.25-0.75%, 0.5-10%, 0.5-5%, 0.5-2%, 0.5-1%, 0.5-0.75%, 1-10%, 2-10%, 3-10%, 4-10%, 5-10%, 6-10%, 1-5%, and 1-6% of one or more urease inhibitors and between about 0.0011-6.67%, 0.0011-5.33%, 0.0011-4.0%, 0.0011-2.67%, 0.0011-2.0%, 0.0011-1.67%, 0.0011-1.0%, 0.0011-0.5%, 0.0011-0.1%, 0.0011-0.05%, 0.0011-0.011%, 0.011-6.67%, 0.055-6.67%, 0.11-6.67%, 0.22-6.67%, 0.33-6.67%, 0.44-6.67%, 0.55-6.67%, 0.66-6.67%, 0.11-3.33%, and 0.11-4.0% of a NOSDS.

Thus in one embodiment, the present invention relates to compositions of a solution of urease inhibitor(s) in a NOSDS designed for coating the surfaces of nitrogen sources, wherein that the NOSDS
- is environmentally safe,
- has flashpoints above 145° F.,
- is inherently rated safe for contact with humans and animals,
- is a liquid solution of urease inhibitors at temperature ranges of between about −20 to 70° C. comprising a composition consisting of a percent weight ratio of NOSDS at between about 40-5% to urease inhibitors at between about 60-95%,
- provides an even and effective coating of urease inhibitors to the surfaces of nitrogen sources particles while not causing clumping of the particles.

In one embodiment, the present invention relates to treated nitrogen sources having between about 0.01-10% of active urease inhibitor on its surfaces.

In one embodiment, it has also been discovered that while various organo-liquids might meet some of the above criteria, the delivery system of the present invention can be optimized to provide a formulation with a high concentration of inhibitors while maintaining a chill point range of between about −20° C. to 70° C. by combining two or more organo-solvents in a solvating delivery system.

In an embodiment, a method of preparing the dry, flowable urease inhibitor coated nitrogen sources comprises one or more steps selected from the group consisting of
a) making compositions of one or more urease inhibitors in a NOSDS at temperatures ranges of between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., and 30-40° C., wherein the urease inhibitor is in the percent weight ranges of between about 60-95%, 65-95%, 70-95%, 75-95%, 80-95%, 85-95%, 60-80%, 65-80%, 70-80%, 75-80%, 60-70%, and 65-70%,
b) charging the nitrogen sources particles into a separated vessel,
c) effectuating agitation/mixing of the nitrogen sources particles in step "b",
d) ensuring the nitrogen sources in step "b" are either at or are heated to temperature ranges of between about 20-70° C., 30-70° C., 40-70° C., 50-70° C., 60-70° C., 0-60° C., 30-60° C., 40-60° C., 50-60° C., 20-50° C., 30-50° C., 40-50° C., 20-40° C., and 30-40° C.,
e) charging slowly the compositions of one or more urease inhibitors in a NOSDS from step "a" to the nitrogen sources particles from step "b" while agitating/mixing utilizing one or more charging method selected from the group consisting of spray, meter and controlled flow applicators. Alternatively, one can pour the compositions onto the nitrogen sources if agitation/mixing are robust enough.
f) continuing agitation of materials from step "a" and "d" until the compositions have uniformly coated the nitrogen sources.

In a variation, the resulting urease inhibitor coated nitrogen sources with high levels of the NOSDS, the urease inhibitor coated nitrogen sources particles can further comprise a flow modifier in a range of between about 0.25-3.5% of the coated nitrogen sources weight. In a variation, the flow modifiers improve handling properties and particle flow properties of the coated nitrogen sources.

In another variation, the compositions can further comprise a colorant, wherein the colorant composition does not comprise water or alcohol. In a variation, colorants are dissolved into the compositions or into a NOSDS which is then added to the compositions to enhance visual conformation of the evenness of the coating of nitrogen sources' surfaces.

In an embodiment, the improved delivery compositions have been developed that can impart effective levels of urease inhibitors to the surface of nitrogen sources that increase the nitrogen longevity in the plant growth mediums. These formulations not only provide a liquid vehicle to deliver an even, non-clumping application of the desired urease inhibitors to surfaces of the nitrogen sources particles, but it has been discovered that formulations based on NOSDS improve the storage life of the important urease inhibitors, such as alkyl thiophosphoric triamides. Alkyl thiophosphoric triamides have been shown to be extremely effective urease inhibitors but suffer from degradation if exposed to heat and moisture. Thus, in one embodiment, the present invention relates to compositions that are substantially free of water. In a variation, substantially free of water is defined as compositions that comprise between about 0.05 to 2%, 0.05 to 1%, 0.1 to 2%, 0.2 to 2%, 0.5 to 2%, 0.75 to 2%, 1.0 to 2%, 0.05 to 1%, 0.25 to 1%, 0.5 to 1%, and 0.75 to 1% water.

In an embodiment, the compositions of the liquid urease inhibitors further comprises of one or more members selected from the group consisting of
- nitrification inhibitors,
- biologics.
- additives such as but not limited to surfactants, buffers, fragrance/odor masking agents, colorants, micro-nutrients, and flow modifiers such as silica.

In another variation, the compositions can further comprise a colorant, wherein the colorant composition does not comprise water or alcohol. In a variation, colorants are dissolved into the compositions or into a NOSDS which is then added to the composition to enhance visual conformation of the evenness of the coating of a nitrogen sources' surfaces.

In one embodiment, during the process of coating of the nitrogen sources with the liquid urease inhibitors concentrates, one may optionally include one or more members selected from the group consisting of surfactants, buffers, fragrance/odor masking agents, colorants, micro-nutrients, and flow modifiers.

In one embodiment, the solvating system of the present invention is a NOSDS, wherein the NOSDS comprises one or more members selected from the group consisting of dimethyl sulfoxide, sulfolane, tetramethyl sulfoxide, dimethylacetamide, dimethylformamide hexamethylphosphoramide, triethylphosphate, tributyl phosphate, propylene carbonate, ethylene carbonate, butylene carbonate, N-alkyl-2-pyrrolidone, 1,2-dimethyloxyethane, 2-methoxyethyl ether, cyclohexylpyrrolidone, ethyl lactate, and 1,3 dimethyl-2-imidazolidinone, limonene, ethylene glycol, propylene glycol, butylene glycol, trimethylol propane, pentaerythritol, glycerin, trimethylol ethane, triethanolamine, 2-(2-aminoethoxy)ethanol, diisopropylamine, triisopropylamine, polyethylene glycol, polypropylene glycol, polyethylene/polypropylene glycol co-polymer, tripropylene glycol methyl ether, tripropylene glycol butyl ether, acetate and fumarate capping of glycols which include but are not limited to the following glycols ethylene glycol, propylene glycol, butylene glycol, trimethylol propane, pentaerythritol, glycerin, trimethylol ethane, polyethylene glycol, polypropylene glycol, polyethylene/polypropylene glycol co-polymer, Tripropylene glycol methyl ether, Tripropylene glycol butyl ether.

Additionally, the NOSDS of the compositions further comprises of one or more members selected from the group consisting of a colorant, wherein the colorant composition does not comprise water or alcohol, scents or masking agents to improve the odor of the formulations, Nonionic, anionic, cationic, zwitterionic, and/or amphoteric surfactants to improve formula application performance of nitrogen sources particles, and Buffering agents.

In one embodiment, the dry, flowable coated nitrogen source comprises urea, wherein the urea is coated with a composition that comprises a) dimethyl sulfoxide (DMSO) and b) NBPT. In a variation, DMSO and NBPT are sources of the micronutrient sulfur and NBPT is also a source of phosphorous and nitrogen. In one embodiment, the compositions are substantially free of water. The process to impart urease inhibitors onto urea also has cost advantages relative to other systems that require cost prohibitive coating/adhesion technologies or require high temperatures of molten urea associated with the manufacture of urea granules and prills.

In one embodiment, the utilization of moderate temperature application of compositions onto nitrogen sources particle surfaces allows for non-clumping of the nitrogen sources particles. In an embodiment, the use of moderate temperature applications of coatings comprised of NOSDS and one or more urease inhibitors limits the thermal degradation temperature sensitive urease inhibitors such as the alkyl thiophosphate triamide, NBPT. In one embodiment, the present invention of coating nitrogen sources particles with compositions comprising one or more urease inhibitors allows for the additional benefit of coating utilizing simple equipment such as blenders, tumbler and mixers. In a variation, the present invention does not require the temperature associated with molten urea or the cost of the equipment associated with the production of urea particles, In an embodiment, the compositions comprises one or more urease inhibitors selected from the group consisting of
a) One or more phosphoramides represented by the structure

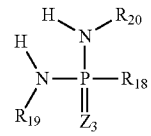

wherein
$R_{18}$ is one or more members selected from the group consisting of $CH_3$, $C_2H_5$, $C_3H_7$, $C_4H_9$, $C_5H_{11}$, $C_6H_{13}$, $C_6H_5$, $C_7H_7$, $OX_4$, $OCH3$, $OC_2H_5$, $OC_3H_7$, $OC_4H_9$, $OC5H11$, $OC_6H_{13}$, and $HNR_{21}$,
wherein
$R_{21}$ is one or more members selected from the group consisting of H, $CH_3$, $C_2H_5$, $C_3H_7$, $C_4H_9$, $C_5H_{11}$ and $C_6H_{13}$,
$X_4$ is one or more members selected from the group consisting of
H, Na, Li, K, $NH_4$ and one or more organoamines selected from the group consisting of mono $C_{1-6}$ amine, di $C_{1-6}$ amine, tri $C_{1-6}$ amine, monoethanolamine, diethanolamine, triethanolamine, monoisopropanol amine, diisopropanolamine, triisopropanolamine, ethylenediamine diethylenetriamine, triethylenetetraamine, and tetraethylenepentamine,
$R_{19}$ is one or more members selected from the group consisting of H, $CH_3$, $C_2H_5$, $C_3H_7$, $C_4H_9$, $C_5H_{11}$ and $C_6H_{13}$,
$R_{20}$ is one or more members selected from the group consisting of H, $CH_3$, $C_2H_5$, $C_3H_7$, $C_4H_9$, $C_5H_{11}$ and $C_6H_{13}$,
$Z_3$ is one or more members selected from the group consisting of oxygen and sulfur.
b) One or more phosphinic acid organo amines and their salts represented by the structures
i)

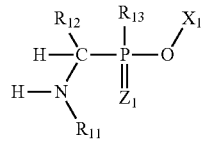

wherein
$R_{11}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$,
$R_{12}$ is one or more members selected from the group consisting of H, $CH_3$, $C_2H_5$, $C_3H_7$, $C_4H_9$, $C_5H_{11}$ and $C_6H_{13}$,
$R_{13}$ is one or more members selected from the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, $OC5H11$, $OC_6H_{13}$, $OC_7H_{15}$ and $OC_8H_{17}$, wherein X₃ is one or more members selected from the group consisting of selected from the group consisting of H, Na, Li, Mg, Ca, Fe, Zn, Mn, Cu, Co, Mo, Ni, K, NH₄, and one or more organoamines selected from the group consisting of mono $C_{1-6}$ amine, di $C_{1-6}$ amine, tri $C_{1-6}$ amine, monoethanol amine, diethanolamine, triethanolamine, monoisopropanolamine, diisopropanol amine, triisopropanolamine, ethylenediamine diethylenetriamine, triethylenetetraamine, and tetraethylenepentamine.

X₁ is one or more members selected from the group consisting of H, Na, Mg, Ca, Fe, Zn, Mn, Cu, Co, Mo, Ni, Li, K, NH₄ and one or more organoamines selected from the group consisting of mono $C_{1-6}$ amine, di $C_{1-6}$ amine, tri $C_{1-6}$ amine, monoethanolamine, diethanolamine, triethanolamine, monoisopropanolamine, diisopropanolamine, triisopropanolamine, ethylenediamine diethylenetriamine, triethylenetetraamine, and tetraethylenepentamine, Z₁ is one or more members selected from the group consisting of oxygen and sulfur, and ii)

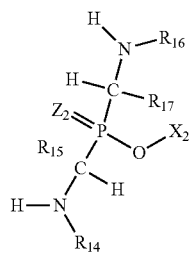

wherein

R₁₄ is one or more members selected from the group consisting of H, CH₃, C₂H₅, C₃H₇, C₄H₉, C₅H₁₁, C₆H₁₃, C₇H₁₅ and C₈H₁₇

R₁₅ is one or more members selected from the group consisting of H, CH₃, C₂H₅, C₃H₇, C₄H₉, C₅H₁₁ and C₆H₁₃

R₁₆ is one or more members selected from the group consisting of H, CH₃, C₂H₅, C₃H₇, C₄H₉, C₅H₁₁, C₆H₁₃, C₇H₁₅ and C₈H₁₇

R₁₇ is one or more members selected from the group consisting of H, CH₃, C₂H₅, C₃H₇, C₄H₉, C₅H₁₁ and C₆H₁₃

X₂ is one or more members selected from the group consisting of H, Na, Li, Mg, Ca, Fe, Zn, Mn, Cu, Co, Mo, Ni, K, NH₄ and one or more organoamines selected from the group consisting of mono $C_{1-6}$ amine, di $C_{1-6}$ amine, tri $C_{1-6}$ amine, monoethanolamine, diethanolamine, triethanolamine, monoisopropanolamine, diisopropanolamine, triisopropanolamine, ethylenediamine diethylenetriamine, triethylenetetraamine, and tetraethylenepentamine.

Z₂ is one or more members selected from the group consisting of oxygen and sulfur.

In a variation, the compositions comprise the urease inhibitor N-(n-butyl) thiophosphoric triamide.

In one embodiment, the present invention relates to using a moderate temperature dispersion procedure of between about 20° C.-70° C. with one or more phosphoramides solubilized into a NOSDS. In one variation, this moderate temperature procedure and the application of the composition to the surface of nitrogen sources particles prevents thermal degradation of the phosphoramide, NBPT.

In an embodiment, nitrogen sources particles can be charge to a ribbon blender and warmed to a temperature range of about 30-70° C. A composition comprised of a) one or more urease inhibitors, b) colorants, c) fragrances, and d) a NOSDS can be sprayed on the surface of the nitrogen sources while under agitation and mixed until a homogeneous coating can be observed. Flow aids comprised of one or more members selected from the group consisting of silicas, nonionic surfactants, soaps, inorganic powders, or nonionic surfactants may be added to improve the flow of the resulting coated nitrogen sources. In a variation, the temperature of compositions comprising of the NOSDS and one or more urease inhibitors can be heated to 70° C. with minimal degradation of temperature sensitive urease inhibitors such as NBPT.

In an embodiment, the dry, flowable coated nitrogen sources can be applied to plant growth mediums as aqueous liquids and/or as nitrogen sources particle forms to provide improved nitrogen retention in the plant growth mediums for uptake by plant life.

In an embodiment, the dry, flowable coated nitrogen sources further comprises water, wherein an aqueous nitrogen sources solution can be added directly to the plant growth mediums or blended one or more fertilizer components selected from the group consisting of mono and diammonium phosphate, ammonium nitrate, ammonium sulfate, micronutrient salts such as Calcium sulfate and zinc sulfate, chelated micronutrients such as FeEDDHA, ZnEDTA and Polyorgano acids and their salts.

In an embodiment, the dry, flowable coated nitrogen sources comprise coating on the surface of a) one or more nitrogen sources selected from the group consisting of i) urea, ii) urea, formaldehyde reaction products, iii) urea, formaldehyde, and ammonia reaction products, iv) manure, v) dicyandiamide and vi) compost, wherein the coating is compositions comprised of a) a NOSDS and b) one or more urease inhibitors selected from the group consisting of i) one or more phosphoramides selected from the group consisting of (a) phosphoric triamides, (b) thiophosphoric triamides, (c) alkyl thiophosphoric triamides, wherein the alkyl thiophosphoric triamides has one or more alkyl groups that independently contain between 1 and 6 carbon atoms, and ii) one or more phosphinic acid organo amines selected from the group consisting of (a) bis(aminomethyl)phosphinic acids, (b) aminomethyl(alkylaminomethyl)phosphinic acids, and (c) di(alkylaminomethy)phosphinic acids, wherein the compositions of phosphinic acids comprise phosphinic acids salts.

In an embodiment, the composition may further comprise one or more members selected from the group consisting of surfactants, buffers, fragrance/odor masking agents, colorants, micro-nutrients, and flow modifiers, wherein the one or more member do not comprise water or alcohol.

In another variation, the compositions may further comprise a colorant, wherein the colorant composition does not comprise water or alcohol. In a variation, colorants are dissolved into the liquid composition or into a NOSDS which is then added to the liquid composition to enhance visual conformation of the evenness of the coating of nitrogen sources surfaces.

In an embodiment, the composition is substantially free of water.

In one embodiment, the compositions are comprised of NBPT and a NOSDS and are formulated to coat nitrogen sources particles with an effective level of NBPT utilizing simple application equipment such as mixers, blenders and tumblers.

In an embodiment, the NOSDS is comprised of one or more non-aqueous organo solvents selected from the group consisting of a) aprotic solvents and b) protic solvents, wherein said protic solvents are selected from the group consisting of i) an alcohol from the family of $C_{1-10}$ alkanols, ii) one or more polyols selected from the group consisting of trimethylol propane, trimethylol ethane, pentaerythritol, sorbitol, sorbitan, glucose, fructose, galactose, and glycerin, iii) poly(C1-10 alkylene) glycols, iv) one or more alkylene glycols selected from the group consisting of ethylene glycol, 1,3 propylene glycol, 1,2 propylene glycol, and butylene glycol, v) isopropylidene glycerol vi) one or more alkylene glycol alkyl ethers represented by the structure

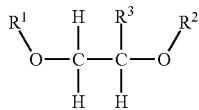

wherein
$R^1$ is $CH_3$, $C_2H_5$, $C_3H_7$ or $C_4H_9$
$R^2$ is H or

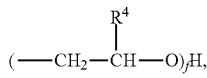

$R^3$ is H or $CH_3$,
wherein
$R^4$ is H or $CH_3$,
and f is an integer between 1 and 15,
vii) one or more alkyl lactates selected from the group consisting of ethyl lactate, propyl lactate and butyl lactate, viii) one or more alkanolamines represented by the structure

wherein
$R^5$ is $C_2H_4OR^8$ or $C_3H_6OH$,
$R^6$ is H, $C_2H_4OR^8$ or $C_3H_6OH$,
$R^7$ is H, $C_2H_4OR^8$ or $C_3H_6OH$,
$R^8$ is $(C_2H_4O)_gH$ or H,
and g is an integer between 1 and 10,
ix) and glycerol carbonate,
and wherein said aprotic solvents are selected from the group consisting of i) dimethyl sulfoxide, ii) dialkyl, diaryl, and alkylaryl sulfoxide(s) having the formula

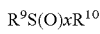

wherein
$R^9$ and $R^{10}$ are each independently a $C_{1-6}$ alkylene group, an aryl group, or $C_{1-3}$ alkylenearyl group or $R^9$ and $R^{10}$ with the sulfur to which they are attached form a 4 to 8 membered ring, wherein $R^9$ and $R^{10}$ together are a $C_{1-6}$ alkylene group which optionally contains one or more atoms selected from the group consisting of O, S, Se, Te, N, and P in the ring and x is 1 or 2, iii) one or more alkylene carbonates selected from the group consisting of ethylene carbonate, propylene carbonate and butylene carbonate, iv) one or more polyols capped with acetate or formate, wherein the polyol portion selected from the group consisting of ethylene glycol, 1,3 propylene glycol, 1,2 propylene glycol, butylene glycol, trimethylol propane, trimethylol ethane, pentaerythritol, sorbitol, sorbitan, glucose, fructose, galactose and glycerin, v) one or more alkylene glycol alkyl ethers acetates selected from the group consisting of dipropylene glycol methyl ether acetate, tripropylene glycol methyl ether acetate, and tripropylene glycol butyl ether acetate, vi) isophorone, vii) one or more diesters selected from the group consisting of dimethylsuccinate, dimethyl adipate, diethyl glutarate, and dimethyl glutarate, viii) dimethylacetamide, ix) dimethylformamide, x) dimethyl-2-imidazolidinone, xi) one or more alkyl pyrrolidones selected from the group consisting of 1-Methyl-2-pyrrolidone and butyl pyrrolidone, xii) one or more organo phosphorous liquids selected from the group consisting of hexamethylphosphoramide and one or more trialkylphosphates represented by the structure

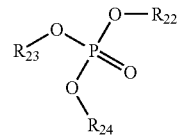

wherein
$R_{22}$ is alkyl radical $—C_1H_3$ to $—C_6H_{13}$,
$R_{23}$ is alkyl radical $—C_1H_3$ to $—C_6H_{13}$,
$R_{24}$ is alkyl radical $—C_1H_3$ to $—C_6H_{13}$,
xiii) 1,2-dimethyloxyethane, xiv) 2-methoxyethyl ether, xv)cyclohexylpyrrolidone and xvi) limonene.

In a variation, the composition imparts to one or more nitrogen sources selected from the group consisting of i) urea, ii) urea, formaldehyde reaction products, iii) urea, formaldehyde, and ammonia reaction products, iv) manure, v) dicyandiamide and vi) compost an increased longevity of plant available nitrogen, wherein the coated nitrogen sources are dry, flowable particles comprising i) one or more nitrogen sources and ii) compositions comprised of (a) one or more urease inhibitors and (b) a NOSDS, wherein the NOSDS is comprised of one or more aprotic solvents selected from the group consisting of 1) dimethyl sulfoxide, 2) dialkyl, diaryl, and alkylaryl sulfoxide(s) having the formula

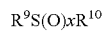

wherein
$R^9$ and $R^{10}$ are each independently a $C_{1-6}$ alkylene group, an aryl group, or $C^{1-3}$ alkylenearyl group or $R^9$ and $R^{10}$ with the sulfur to which they are attached form a 4 to 8 membered ring, wherein $R^9$ and $R^{10}$ together are a C alkylene group which optionally contains one or more atoms selected from the group consisting of O, S, Se, Te, N, and P in the ring and x is 1 or 2 wherein such that the compositions' weight percents are 83.33-99.99% nitrogen sources, 10-0.011% urease inhibitors and 6.67-0.0011% NOSDS.

In a variation, the NOSDS comprises DMSO

In one embodiment, the compositions of the present invention relates to compositions of NBPT and a NOSDS and that is designed to coat nitrogen sources particles with an effective level of NBPT utilizing simple application equipment such as mixers, blenders and tumblers. In an embodiment, the NOSDS is comprised of one or more solvents selected from the group consisting of dimethyl sulfoxide, sulfolane, tetramethyl sulfoxide, dimethylacetamide, dimethylformamide, hexamethylphosphoramide, triethylphosphate, tributylphophate, propylene carbonate, ethylene carbonate, butylene carbonate, N-alkyl-2-pyrrolidone, 1,2-dimethyloxyethane, 2-methoxyethyl ether, cyclohexylpyrrolidone, ethyl lactate, 1,3 dimethyl-2-imidazolidinone, limonene, ethylene glycol, propylene glycol, butylene glycol, trimethylol propane, pentaerythritol, glycerin, trimethylol ethane, triethanolamine, 2-(2-aminoethoxy) ethanol, diisopropylamine, triisopropylamine, polyethylene glycol, polypropylene glycol, polyethylene/polypropylene glycol co-polymer, tripropylene glycol methyl ether, tripropylene glycol butyl ether, acetate/fumarate capping of glycols which include but are not limited to the following glycols ethylene glycol, propylene glycol, butylene glycol, trimethylol propane, pentaerythritol, glycerin, trimethylol ethane, polyethylene glycol, polypropylene glycol, polyethylene/polypropylene glycol co-polymer, tripropylene glycol methyl ether, and tripropylene glycol butyl ether.

In an embodiment, the present invention comprises nitrogen sources coated with concentrated liquid additives. In one embodiment, the concentrated liquid additives comprise one or more urease inhibitors dispersed in a NOSDS.

In an embodiment, the concentrated liquid additives comprise one or more urease inhibitors selected from the group consisting of a) one or more phosphoramides selected from the group consisting of i) phosphoric triamides, ii) thiophosphoric triamides, iii) alkyl thiophosphoric triamides, wherein the alkyl thiophosphoric triamides has one or more alkyl groups that independently contain between 1 and 6 carbon atoms, and b) one or more phosphinic acid organo amines selected from the group consisting of i) bis(aminomethyl)phosphinic acids, ii) aminomethyl(alkylaminomethyl) phosphinic acids, and iii) di(alkylaminomethy)phosphinic acids, wherein converting the phosphinic acids to their salts is optional.

In an embodiment, the methods of making the urease inhibitor compositions for coating nitrogen sources comprises one or more steps selected from the group consisting of 1) heating a composition comprising a NOSDS and one or more urease inhibitors that are selected from the group consisting of a) one or more phosphoramides selected from the group consisting of i) phosphoric triamides, ii) thiophosphoric triamides, ii) alkyl thiophosphoric triamides, wherein the alkyl thiophosphoric triamides has one or more alkyl groups that independently contain between 1 and 6 carbon atoms, b) one or more phosphinic acid organo amines selected from the group consisting of i) bis(aminomethyl)phosphinic acids, ii) aminomethyl(alkylaminomethyl)phosphinic acids, and iii) di(alkylaminomethy)phosphinic acids, wherein the phosphinic acids salts are optional, to temperature ranges of between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., and 30-40° C., and wherein the urease inhibitors are in the % weight ranges of between about 60-95%, 65-95%, 70-95%, 75-95%, 80-95%, 85-95%, 60-80%, 65-80%, 70-80%, 75-80%, 60-70%, and 65-70% of said composition, 2) effectuate mixing of the composition, 3) holding the mixture to a temperature that the composition is fluid and that, optionally, allows addition of one or more members selected from the group consisting of surfactants, buffers, fragrance/odor masking agents, non-water and non-alcohol containing colorants, micro-nutrients, and flow modifiers.

In an embodiment, a method of preparing the urease inhibitor coated nitrogen sources comprise one or more steps selected from the group consisting of a) maintain said composition liquid at temperatures ranges of between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., b) charge nitrogen sources particles to a separate vessel, c) effectuate mixing of the nitrogen sources, d) ensure the nitrogen sources in either at or are heated to temperature ranges of between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., and 30-40° C., e) charge slowly said compositions from step "a" to nitrogen sources particles in step "d" while continuing to effectuate agitation, f) continue to effectuate mixing of nitrogen sources until the composition has uniformly coated the nitrogen sources, g) cool the urease inhibitor coated nitrogen sources to temperatures ranges of between about 0-60° C., 20-50° C., 30-50° C., 40-50° C., 20-40° C., 30-40° C., 10-50° C., 10-40° C., 10-30° C., 10-20° C., 0-50° C., 0-40° C., 10-30° C., 10-20° C.

h) add a flow modifier to improve handling and flow properties, and wherein the coated nitrogen sources are dry, flowable particles.

In a variation, the flow modifier is a hydrophobized silica.

In another variation, the compositions can further comprise a colorant, wherein the colorant composition does not comprise water or alcohol. In a variation, colorants are dissolved into the composition or into a NOSDS which is then added to the composition to enhance visual conformation of the evenness of the coating of nitrogen sources' surfaces. In an embodiment, the method comprises further adding the compositions to coat nitrogen sources utilizing simple blending equipment.

In one variation, the dry, flowable urease inhibitor coated nitrogen sources comprises one or more nitrogen sources selected from the group consisting of i) urea, ii) urea, formaldehyde reaction products, iii) urea, formaldehyde, and ammonia reaction products, iv) manure, v) dicyandiamide and vi) compost.

In one embodiment, the concentrated liquid concentrates comprise compositions that are substantially free of water.

In an embodiment, composition comprising of nitrogen sources coated with urease inhibitors that have been solubilized with a NOSDS such that the compositions' weight percents are 83.33-99.99% nitrogen sources, 10-0.011% urease inhibitors and 6.67-0.0011% NOSDS. In one variation, the NOSDS is dimethyl sulfoxide. In another variation, the nitrogen sources comprise urea. In another variation, the urease inhibitor comprises NBPT.

In an embodiment, a composition is charged during the cooling step of the nitrogen sources particles formation processes, wherein the nitrogen sources particle forming processes comprise one or more processes selected from the group consisting of a) rotating drum granulation, b) fluidized bed granulation, and c) prilling tower.

In an embodiment, a method of making urease inhibitor coated nitrogen sources in the rotating drum process comprises one or more steps selected from the group consisting of
- a) achieving the desired nitrogen sources particle size at the end of the particle forming process,
- b) terminating the spraying of molten nitrogen sources onto a bed of small nitrogen sources particles (nitrogen sources particle seed),
- c) spraying the composition onto the nitrogen sources particles during the process, wherein the continued application of layers of molten nitrogen sources are being sprayed upon the nitrogen sources in the rotating drum bed, wherein the air flow and temperature are optimized to ensure limited exposure of composition to temperature ranges of between about 80-100° C.
- d) achieving the temperature range of the nitrogen sources is between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., and 30-40° C.,
- e) spraying the composition that are at temperature ranges of between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., and 30-40° C. onto the nitrogen sources particles while the nitrogen sources are mixed within the rotating drum,
- f) achieving an even coating of the composition on the surfaces of the nitrogen sources,
- g) cooling the coated nitrogen sources to desired packaging temperatures,
- h) adding one or more flow modifiers to improve the handling and flow properties of the urease inhibitor coated nitrogen sources,
- i) storing or packaging the resulting urease inhibitor coated nitrogen sources.

In an embodiment, a method of making urease inhibitor coated nitrogen sources in the fluidized bed granulation process comprises one or more steps selected from the group consisting of
- a) achieving the desired nitrogen sources particle size at the end of the particle forming process,
- b) terminating the spraying of molten nitrogen sources onto a bed of small nitrogen sources particles (nitrogen sources particle seed),
- c) spraying the composition onto the nitrogen sources particles during the process, wherein the continued application of layers of molten nitrogen sources are being sprayed upon the nitrogen sources on the fluidized bed, wherein the air flow and temperature are optimized to ensure limited exposure of compositions to temperatures of between about 80-100° C.,
- d) achieving the temperature range of the nitrogen sources is between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., and 30-40° C.,
- e) spraying the compositions that are at temperature ranges of between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., and 30-40° C. onto the nitrogen sources particles while the nitrogen sources are mixed by forced air passing over the nitrogen sources particles on the fluidized bed,
- f) achieving an even coating of the compositions on the surfaces of the nitrogen sources,
- g) cooling the coated nitrogen sources to desired packaging temperatures,
- h) adding one or more flow modifiers to improve the handling and flow properties of the urease inhibitor coated nitrogen sources,
- i) storing or packaging the resulting urease coated nitrogen sources.

In an embodiment, a method of making urease inhibitor coated nitrogen sources in the prilling tower processes comprises one or more steps selected from the group consisting of
- a) forming droplets of the molten nitrogen sources as they pass through the shower head into the tower,
- b) flowing counter current air up the tower cooling the droplets below the nitrogen sources freezing point forming small, round, solid pellets called prills,
- c) spraying the composition onto the nitrogen sources droplets before crystallizing, wherein the counter current air flow and temperature are optimized to ensure limited exposure of composition to temperatures of between about 80-100° C.,
- d) achieving the temperature range of the nitrogen sources prills is between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., and 30-40° C.,
- e) spraying the compositions that are at temperature ranges of between about 20-70° C., 30-70° C., 40-70° C., 50-70° C., 60-70° C., 20-60° C., 30-60° C., 40-60° C., 50-60° C., 20-50° C., 30-50° C., 40-50° C., 20-40° C., and 30-40° C. onto the nitrogen sources particles while the nitrogen sources are mixed by the counter current air flowing up the tower,
- f) achieving an even coating of the composition on the surfaces of the nitrogen sources,
- g) cooling the coated nitrogen sources to desired packaging temperatures,
- h) adding one or more flow modifiers to improve the handling and flow properties of the urease inhibitor coated nitrogen sources at the bottom of the tower,
- i) storing or packaging the resulting urease inhibitor coated nitrogen sources.

In an embodiment, the levels of urease inhibitors in plant growth mediums necessary to provide effective urease inhibition to extend the longevity of plant available nitrogen in the plant growth mediums is at least 0.02 ppm. In a variation, the necessary level of urease inhibitors in plant growth medium is 0.02-5000, 0.02-4000 ppm, ppm, 0.02-3000 ppm, 0.02-2000 ppm, 0.02-1000 ppm, 0.1-5000 ppm, 0.1-4000 ppm, 0.1-3000 ppm, 0.1-2000 ppm, 0.1-1000 ppm, 1.0-5000 ppm, 1.0-4000 ppm, 1.0-3000 ppm, 1.0-2000 ppm, 1.0-1000 ppm, 5.0-5000 ppm, 5.0-4000 ppm, 5.0-3000 ppm, 5.0-2000 ppm, 5.0-1000 ppm, 5.0-500 ppm, 5.0-400 ppm, 5.0-300 ppm, 5.0-200 ppm, and 5-100 ppm to provide effective urease inhibition. In a variation, the effective level of urease inhibitors is delivered by the dry, flowable urease inhibitor coated nitrogen sources particles. In another variation, the effective levels of urease inhibition are delivered by application of said coated nitrogen sources particles directly to plant growth mediums or through a dissolution into water and applied to plant growth mediums as part of a liquid fertilizer.

In an embodiment, compositions that impart to one or more nitrogen sources selected from the group consisting of i) urea, ii) urea, formaldehyde reaction products, iii) urea, formaldehyde, and ammonia reaction products, iv) manure, v) dicyandiamide and vi) compost an increased longevity of plant available nitrogen in the plant growth mediums, wherein the urease coated urea is dry, flowable particles coated with a composition comprising of one or more urease inhibitors that have been solubilized within a NOSDS. In an embodiment, the NOSDS is comprised of one or more aprotic organo solvents are selected from the group consisting of
  a) dimethyl sulfoxide and
  b) one or more sulfoxide(s) selected from the group consisting of dialkyl, diaryl, and alkylaryl sulfoxide(s) selected from the formula $R^9S(O)xR^{10}$ wherein
    $R^9$ and $R^{10}$ are each independently a $C_1$-$C_6$ alkylene group, an aryl group or $C_1$-$C_3$ alkylenearyl group or $R^9$ and $R^{10}$ with the sulfur to which they are attached form a 4 to 8 membered ring, wherein $R^9$ and $R^{10}$ together are a $C_1$-$C_6$ alkylene group which optionally contains one or more atoms selected from the group consisting of O, S, Se, Te, N, and P in the ring
    and x is 1 or 2
wherein the NOSDS optional further comprised of aprotic and protic solvents, wherein the aprotic solvents are one or more members selected from the group consisting of
a) one or more alkylene carbonates selected from the group consisting of ethylene carbonate, propylene carbonate and butylene carbonate
b) one or more polyols capped with acetate or formate, wherein the polyol portion is selected from the group consisting of ethylene glycol, 1,3 propylene glycol, 1,2 propylene glycol, butylene glycol, trimethylol propane, trimethylol ethane, pentaerythritol, sorbitol, sorbitan, glucose, fructose, galactose and glycerin
c) one or more alkylene glycol alkyl ethers acetates selected from the group consisting of dipropylene glycol methyl ether acetate, tripropylene glycol methyl ether acetate, and tripropylene glycol butyl ether acetate,
d) one or more diesters selected from the group consisting of dimethylsuccinate, dimethyl adipate, diethyl glutarate, and dimethyl glutarate,
e) one or more alkyl pyrrolidone selected from the group consisting of 1-Methyl-2-pyrrolidone and cyclohexylpyrrolidone,
f) one or more members selected from the group consisting of dimethylacetamide, dimethylformamide, dimethyl-2-imidazolidinone, isophorone, 1,2-dimethyloxyethane, 2-methoxyethyl ether and limonene g) one or more organo phosphorous liquids selected from the group consisting of hexamethylphosphoramide and one or more trialkylphosphates represented by the structure

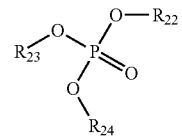

wherein
  $R_{22}$ is alkyl radical —$C_1H_3$ to —$C_6H_{13}$,
  $R_{23}$ is alkyl radical —$C_1H_3$ to —$C_6H_{13}$,
  $R_{24}$ is alkyl radical —$C_1H_3$ to —$C_6H_{13}$,
and wherein one or more protic solvent are selected from the group consisting of
  a) one or more alcohols selected from the group consisting of the family of $C_1$-$C_{10}$ alkanols
  b) one or more polyols selected from the group consisting of trimethylol propane, trimethylol ethane, pentaerythritol, sorbitol, sorbitan, glucose, fructose, galactose, and glycerin
  c) one or more polyalkylene glycols selected from the group consisting of poly($C_1$-$C_{10}$ alkylene) glycols,
  d) isopropylidene glycerol
  e) one or more alkylene glycol alkyl ethers represented by the structure

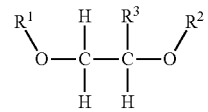

wherein
    $R^1$ is one or more members selected from the group consisting of $CH_3$, $C_2H_5$, $C_3H_7$ and $C_4H_9$,
    $R^2$ is one or more members selected from the group consisting of H and

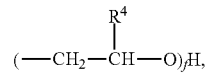

wherein
      where $R^4$ is one or more members selected from the group consisting of H and $CH_3$,
      and f is an integer between 1 and 15,
    wherein $R^3$ is one or more members selected from the group consisting of H and $CH_3$,
  f) one or more alkyl lactates selected from the group consisting of ethyl lactate, propyl lactate and butyl lactate,
  g) one or more alkanolamines represented by the structure

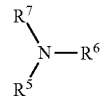

wherein
R⁵ is one or more members selected from the group consisting of $C_2H_4OR^8$ and $C_3H_6OH$,
R⁶ is H, $C_2H_4OR^8$ and $C_3H_6OH$,
R⁷ is one or more members selected from the group consisting of H, $C_2H_4OR^8$ and $C_3H_6OH$,
wherein
R⁸ is $(C_2H_4O)_gH$ or H,
wherein
g is an integer between 1-10
h) and glycerol carbonate,
and wherein the resulting dry, flowable urease inhibitor coated nitrogen sources compositions' weight percents are 83.33-99.99% nitrogen sources, 10-0.011% urease inhibitors and 6.67-0.0011% NOSDS.

In a variation, the nitrogen sources comprise urea.

In a variation, the NOSDS comprises DMSO and one or more solvents selected from the group consisting of protic and aprotic solvents, wherein the weight ratio of urease inhibitors to NOSDS comprise between about 60-40%, 65-35%, 70-30%, 75-25%, 80-20%, 85-15%, and 95-5% of the compositions.

In an embodiment, compositions comprise one or more urease inhibitors selected from the group consisting of
a) one or more phosphoramide represented by the structure

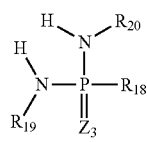

wherein
$R_{18}$ is one or more members selected from the group consisting of $CH_3$, $C_2H_5$, $C_3H_7$, $C_4H_9$, $C_5H_{11}$, $C_6H_{13}$, $C_6H_5$, $C_7H_7$, $OX_4$, $OCH_3$, $OC_2H_5$, $OC_3H_7$, $OC_4H_9$, $OC_5H_{11}$, $OC_6H_{13}$, and $HNR_{21}$,
wherein
$R_{21}$ is one or more members selected from the group consisting of H, $CH_3$, $C_2H_5$, $C_3H_7$, $C_4H_9$, $C_5H_{11}$ and $C_6H_{13}$,
$X_4$ is one or more members selected from the group consisting of H, Na, Li, K, $NH_4$ and one or more organoamines selected from the group consisting of mono $C_{1-6}$ amine, di $C_{1-6}$ amine, tri $C_{1-6}$ amine, monoethanolamine, diethanolamine, triethanolamine, monoisopropanolamine, diisopropanolamine, triisopropanolamine, ethylenediamine diethylenetriamine, triethylenetetraamine, and tetraethylenepentamine,
$R_{19}$ is one or more members selected from the group consisting of H, $CH_3$, $C_2H_5$, $C_3H_7$, $C_4H_9$, $C_5H_{11}$ and $C_6H_{13}$,
$R_{20}$ is one or more members selected from the group consisting of H, $CH_3$, $C_2H_5$, $C_3H_7$, $C_4H_9$, $C_5H_{11}$ and $C_6H_{13}$,
$Z_3$ is one or more members selected from the group consisting of oxygen and sulfur, b) one or more phosphinic acids organo amines and their salts represented by the structures
i)

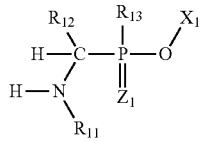

wherein
$R_{11}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$,
$R_{12}$ is one or more members selected from the group consisting of H, $CH_3$, $C_2H_5$, $C_3H_7$, $C_4H_9$, $C_5H_{11}$ and $C_6H_{13}$,
$R_{13}$ is one or more members selected from the group consisting of H, O—$X_3$, $CH_3$, $C_2H_5$, $C_3H_7$, $C_4H_9$, $C_5H_{11}$, $C_6H_{13}$, $C_7H_{15}$, $C_8H_{17}$, $OCH_3$, $OC_2H_5$, $OC_3H_7$, $OC_4H_9$, $OC5H11$, $OC_6H_{13}$, $OC_7H_{15}$ and $OC_8H_{17}$,
wherein
$X_3$ is one or more members selected from the group consisting of selected from the group consisting of H, Na, Li, Mg, Ca, Fe, Zn, Mn, Cu, Co, Mo, Ni, K, $NH_4$ and one or more organoamines selected from the group consisting of mono $C_{1-6}$ amine, di $C_{1-6}$ amine, tri $C_{1-6}$ amine, monoethanol amine, diethanolamine, triethanolamine, monoisopropanolamine, diisopropanolamine, triisopropanolamine, ethylenediamine diethylenetriamine, triethylenetetraamine, and tetraethylenepentamine,
$X_1$ is one or more members selected from the group consisting of H, Na, Li, Mg, Ca, Fe, Zn, Mn, Cu, Co, Mo, Ni, K, $NH_4$ and one or more organoamines selected from the group consisting of mono $C_{1-6}$ amine, di $C_{1-6}$ amine, tri $C_{1-6}$ amine, monoethanolamine, diethanolamine, triethanolamine, monoisopropanolamine, diisopropanolamine, triisopropanolamine, ethylenediamine diethylenetriamine, triethylenetetraamine, and tetraethylenepentamine,
$Z_1$ is one or more members selected from the group consisting of oxygen and sulfur, and
ii)

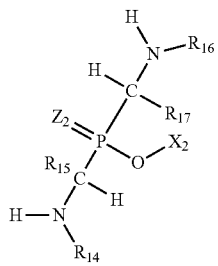

wherein
$R_{14}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$, $R_{15}$ is one or more members selected from the group consisting of H, $CH_3$, $C_2H_5$, $C_3H_7$, $C_4H_9$, $C_5H_{11}$, and $C_6H_{13}$, $R_{16}$ is one or more members selected from the group consisting of H, $CH_3$, $C_2H_5$, $C_3H_7$, $C_4H_9$, $C_5H_{11}$, $C_6H_{13}$, $C_7H_{15}$ and $C_8H_{17}$, $R_{17}$ is one or more members selected from the group consisting of H, $CH_3$, $C_2H_5$, $C_3H_7$, $C_4H_9$, $C_5H_{11}$ and $C_6H_{13}$, $X_2$ is one or more members selected from the group consisting of H, Na, Li, Mg, Ca, Fe, Zn, Mn, Cu, Co, Mo, Ni, K, $NH_4$ and one or more organoamines selected from the group consisting of mono $C_{1-6}$ amine, di $C_{1-6}$ amine, tri $C_{1-6}$ amine, monoethanolamine, diethanolamine, triethanolamine, monoisopropanolamine, diisopropanolamine, triisopropanolamine, ethylenediamine diethylenetriamine, triethylenetetraamine, and tetraethylenepentamine, $Z_2$ is one or more members selected from the group consisting of oxygen and sulfur.

In a variation, the compositions comprise one or more urease inhibitors selected from the group consisting of N-(n-butyl) thiophosphoric triamide and, aminomethyl (hexylaminomethyl)phosphinic acid ($C_8H_{21}N_2O_2P$) and its salts, wherein said salt is derived from the reaction of a neutralizing agents with the phosphinic acid, and wherein said neutralizing agents are comprised of a) one or more metal cations, wherein metal cations are derived from one or more members selected from the group consisting of i) elemental metals ii) metal oxides iii) metal hydroxides, iv) metal alkylates and v) metal carbonates, wherein the one or more metal cations' portion of the neutralizing agent is selected from the group consisting of Na, K, Mg, Ca, Fe, Zn, Mn, Cu, Co, Mo and Ni.

In a variation, the compositions comprise the urease inhibitor N-(n-butyl) thiophosphoric triamide.

In another variation, the urease inhibitors comprise phosphinic acids organo amines and their salts, wherein the one or more of the phosphinic acid organo amines are selected from the group consisting of aminomethyl(N-n-hexylaminomethyl)phosphinic acid, aminomethyl(methylaminomethyl)phosphinic acid, aminomethyl-(N-n-ethylaminomethyl)phosphinic acid, aminomethyl(N-n-propylaminomethyl)phosphinic acid, aminomethyl(N-n-butylaminomethyl)phosphinic acid, aminomethyl (isobutylaminomethyl)phosphinic acid, aminomethyl (N-n-pentylaminomethyl)phosphinic acid, aminomethyl(N-n-heptylaminomethyl)phosphinic acid, aminomethyl(N-n-octylaminomethyl)phosphinic acid, aminomethyl (benzylaminomethyl)phosphinic acid, Bis(aminomethyl) phosphinic acid, Bis(methylaminomethyl)phosphinic acid, Bis(N-n-ethylaminomethyl)phosphinic acid, Bis(N-n-propylaminomethyl)phosphinic acid, Bis(N-n-hexylaminomethyl)phosphinic acid, methylaminomethyl(N-n-hexylaminomethyl)phosphinic acid, ethylaminomethyl(N-n-hexylaminomethyl)phosphinic acid, propylaminomethyl(N-n-hexylaminomethyl)phosphinic acid, and butylaminomethyl(N-n-hexylaminomethyl)phosphinic acid.

In an embodiment, the compositions are comprised of urease inhibitors that are in a solution within the NOSDS at a weight ratio of between about 60-95% urease inhibitors to between about 40-5% of a NOSDS.

In an embodiment, the compositions further comprise one or more biologics selected from the group consisting of a) one or more biologics selected from the group consisting of i) *Bacillus* biologics, ii) *Azospirillum* biologics, iii) *Azobacter* biologics iv) *Gluconacetobacter* biologics, v) *Phosphobacteria*, vi) *Cyanobacteria*, vii) *Herbaspirillum*, viii) *Burkholderia*, ix) *Pseudomonas*, x) *Gluconacetobacter*, xi) *Enterobacter*, xii) *Klebsiella*, xiii) *Burkholderia*, xiv) *Bradyrhiwbium* species, xv) *Bradyrhiwbium japonicum*, xvi) *Rhizobium meliloti*, xvii) *Laccaria bicolor*, xviii) *Glomus imraradices timanita*, xix) *Actinomyces*, xx) *Penicillium*, xxi) *Mesorhizobiwn cicero*, xxii) one or more insecticidal or insect repellent microbial species and strains are selected from the group consisting of *Telenomus podisi, Baculovirus anticarsia, Trichogramma pretiosum, Trichogramma gallai, Chromobacterium subtsugae, Trichoderma fertile, Beauveria bassiana, Beauveria bassiana, Beauveria bassiana, Paecilomyces jknwsoroseu, Trichoderma harzianum, Verticillium lecanii, Lsarfofumosarosea lecanicillium muscarium, Streptomyces microflavus,* and *Muscodor albus,* xxiii) one or more nematodal microbial species and strains are selected from the group consisting of *Myrothecium verrucaria, Pasteuria* species, *Pasteuria metarhizium* species, and *Flavobacteriwn* species xxiv) *Reynoutria sachalinensis* and xxv) one or more antifungal, antimicrobial and plant growth promoting microbial species and strains are selected from the group consisting of *Gliocladium* species, *Pseudomonas* species selected from the group consisting of

*Pseudomonas fluorescens, Pseudomonas fluorescens. putida* and *P. chlororaphis, Pseudomonas fluorescens* VP5, *Pseudomonas diazotrophicus, Enterobacter cloacae, Trichodema* species, *Trichoderma virens, Trichoderma atroviride* strains, *Coniothyrium minitans, Gliocladium* species, *Gliacladium virens, Gliacladium roseum,* and *Trichodemw harzianum* species, In an embodiment, the composition further comprises surfactants, buffers, fragrance/odor masking agents, colorants, micro-nutrients, dispersed nitrification inhibitors and flow modifiers, wherein the composition does not comprise water and alcohol.

In variation, the composition can further comprise a colorant, wherein the colorant composition does not comprise water or alcohol. In a variation, colorants are dissolved into the liquid composition or into a NOSDS which is then added to the liquid composition to enhance visual conformation of the evenness of the coating of nitrogen sources' surfaces.

In an embodiment, the NOSDS further comprises the following criteria a) is environmentally safe, b) have flashpoints above 145° F., c) is inherently rated safe for contact with humans and animals, d) forms a liquid solution at between about −20-70° C. of urease inhibitors comprising a compositional % weight ratio of NOSDS at between about 40-5% to urease inhibitors at between about 60-95% for coating the surfaces of nitrogen sources, e) provides an even and effective coating of urease inhibitors to the surfaces of nitrogen sources particles while not causing clumping of the particles.

In an embodiment, the composition comprises <5.0% water.

In an embodiment, a method of making dry, flowable urease inhibitor coated nitrogen sources comprises one or more steps selected from the group consisting of
a) preparing a composition by making a solution of one or more urease inhibitors in a NOSDS at temperatures between about 20 to 70° C., wherein the urease inhibitors compositional weight percent range is between about 60 to 95%,
b) charging to a separated vessel nitrogen sources particles,
c) effectuating agitation of nitrogen sources particles,
d) ensuring the temperature range of the nitrogen sources particles is at between about 20-70° C.,
e) charging slowly the composition from "a" nitrogen sources particles in step "d" while agitating the nitrogen sources particles,
f) continuing agitation of nitrogen sources particles until the composition has uniformly coated nitrogen sources particle surfaces,
g) cooling the coated nitrogen source particles to packaging temperature,
h) charging flow modifiers to improve the coated nitrogen sources particles handling and flow properties,
i) storing or packaging the urease inhibitor coated nitrogen sources particles,
wherein the compositional' weight percent is comprised of 83.33-99.99% nitrogen sources, 10-0.011% urease inhibitors and 6.67-0.0011% NOSDS. In a variation, the urease inhibitor coated nitrogen sources with high levels of the NOSDS, the urease inhibitor coated nitrogen sources particles can further comprise a flow modifier to improve handling and particle flow properties. In a variation, the flow modifier is a hydrophobic silica, wherein the hydrophobic silica further comprises 0.25-3.5% of the urease inhibitor coated nitrogen sources.

In an embodiment, a composition further comprising a fertilizer, wherein the fertilizer is comprised of a) one or more nitrogen sources selected from the group consisting of a) urea, b) urea, formaldehyde reaction products, c) urea, formaldehyde, and ammonia reaction products, d) manure, e) dicyandiamide, and f) compost, and wherein the fertilizer composition weight percent comprises about 83.33-99.99% nitrogen sources, 10-0.011% urease inhibitors, and 6.67-0.0011% NOSDS.

In an embodiment, a composition comprises a) one or more urease inhibitors and b) a non-aqueous organic solvent delivery system (NOSDS), wherein the NOSDS is comprised of i) dimethyl sulfoxide and optionally ii) one or more solvents selected from the group consisting of aprotic solvents and protic solvents, wherein the one or more urease inhibitors are selected from the group consisting of i) one or more phosphoramides and ii) one or more (phosphinic acids organo amines and their salts, wherein the one or more urease inhibitors comprise about 60-95% by weight of said composition, and wherein said composition is liquid at a temperature range between about −20-70° C.

In a variation, the NOSDS comprises dimethyl sulfoxide and one or more non-aqueous organo solvents selected from the group consisting of a) aprotic solvents and b) protic solvents.

In an embodiment, the composition, wherein the urease inhibitors comprise one or more phosphoramides selected from the group consisting of a)phosphoric triamides, b) thiophosphoric triamides, and c) alkyl thiophosphoric triamides, wherein the alkyl thiophosphoric triamides has one or more alkyl groups that independently contain between 1 and 6 carbon atoms.

In a variation, the one or more urease inhibitors comprise N-(n-butyl) thiophosphoric triamides (NBPT).

In an embodiment, the composition further comprising one or more members selected from the group consisting of surfactants, buffers, fragrance/odor masking agents, colorants, micro-nutrients, and flow modifiers, wherein the one or more members do not comprise water and alcohol.

In an embodiment, a method of making a composition for coating nitrogen sources comprises one or more steps selected from the group consisting of
1) heating a composition comprising a NOSDS and one or more urease inhibitors that are selected from the group consisting of a) one or more phosphoramides selected from the group consisting of i) phosphoric triamides, ii) thiophosphoric triamides, ii) alkyl thiophosphoric triamides, wherein the alkyl thiophosphoric triamides has one or more alkyl groups that independently contain between 1 and 6 carbon atoms, b) one or more phosphinic acid organo amines selected from the group consisting of i) bis(aminomethyl)phosphinic acids, ii) aminomethyl(alkylaminomethyl)phosphinic acids, and iii) di(alkylaminomethy)phosphinic acids, wherein the phosphinic acids salts are optional, to temperature ranges of between about 20-70° C., and wherein the urease inhibitors are in the % weight ranges of between about 60-95% of said composition,
2) effectuating mixing of the composition,
3) holding the mixture to a temperature that the composition is fluid and optionally the addition of one or more members selected from the group consisting of surfactants, buffers, fragrance/odor masking agents, non-water and non-alcohol containing colorants, micro-nutrients, and flow modifiers.

In an embodiment, the urease inhibitor coated nitrogen sources composition comprises a) one or more nitrogen sources selected from the group consisting of i) urea, ii) urea, formaldehyde reaction products, iii) urea, formaldehyde, and ammonia reaction products, iv) manure, v) dicyandiamide, and vi) compost, b) one or more urease inhibitors selected from the group consisting of i) phosphoramides and ii) phosphinic acids organo amines, and c) a NOSDS, wherein the composition's weight percent comprises about 83.33-99.99% nitrogen sources, 10-0.011% urease inhibitors, and 6.67-0.0011% NOSDS.

In a variation, the urease inhibitor coated nitrogen sources further comprises one or more flow modifiers selected from the group consisting of silicas, hydrophobized silicas, nonionic surfactants, soaps, inorganic powders, and nonionic surfactants, wherein the flow modifiers comprise between about 0.25-3.5 percent weight of said urease inhibitor coated nitrogen sources.

In an embodiment, a method of making said urease inhibitor coated nitrogen sources comprises one or more steps selected from the group consisting of
a) preparing a composition by making a solution of one or more urease inhibitors in a NOSDS at temperatures between about 20 to 70° C., wherein the urease inhibitors compositional weight percent range is between about 60 to 95%, and wherein the composition is liquid at a temperature range between about −20-70° C.,
b) charging to a separate vessel nitrogen sources particles
c) effectuating agitation of nitrogen sources particles, d) ensuring the temperature range of the nitrogen sources particles is at between about 20-70° C.,
e) charging slowly the composition from "a" onto nitrogen sources particles from step "d" while agitating the nitrogen sources particles,
f) continuing agitation of nitrogen sources particles until the composition has uniformly coated nitrogen sources particle surfaces,
g) cooling the coated nitrogen source particles to temperatures ranges of between about 0-60° C.,
h) charging flow modifiers to improve the coated nitrogen sources particles handling and flow properties,
i) storing or packaging the urease inhibitor coated nitrogen sources particles.

In a variation, a method of making urease inhibitor coated nitrogen sources comprises one or more nitrogen sources particle formation processes selected from the group consisting of
a) rotating drum granulation,
b) fluidized bed granulation, and
c) prilling tower,
wherein a composition consist of a) one or more urease inhibitors and b) a NOSDS and the method of making comprises one or more steps selected from the group consisting of i) spraying said composition onto the surfaces of the nitrogen sources particles during the cooling step of the nitrogen sources particles formation processes, ii) ensuring the nitrogen sources particles are at a temperature range of between about 20-70° C., iii) effectuating the mixing of the particles by air flow or drum rotation to ensure an even coating of urease inhibitors on the surfaces of nitrogen source particles.

In a variation, a method of making said urease inhibitor coated nitrogen sources comprises one or more nitrogen sources particle forming processes selected from the group consisting of
a) rotating drum granulation,
b) fluidized bed granulation,
wherein a composition consist of a) one or more urease inhibitors and b) a NOSDS and the method of making comprises one or more steps selected from the group consisting of i) spraying the composition onto the surfaces of the nitrogen sources particles while at the end of the spraying of the molten nitrogen sources step, ii) cooling the temperature of nitrogen sources particles through air temperature and volume of air flow that are optimized to ensure limited exposure of composition to temperature ranges of between about 80-100° C. to minimize degradation of temperature sensitive urease inhibitors, iii) effectuating mixing of the particles by air flow or drum rotation to ensure an even coating of urease inhibitors on the surfaces of nitrogen source particles.

In another variation, a method of making said urease inhibitor coated nitrogen sources particles that comprises a prilling tower particle formation process, wherein a composition consist of a) one or more urease inhibitors and b) a NOSDS and the method of making comprises one or more steps selected from the group consisting of i) spraying said composition onto the surfaces of the nitrogen sources particles towards upper end the prilling tower where the droplets of the molten nitrogen sources are beginning to cool to crystallinity ii) cooling the nitrogen sources particles by the counter current air, wherein the air's temperature and volume of air flow are optimized to ensure limited exposure of composition to temperature ranges of between about 80-100° C. to minimize degradation of temperature sensitive urease inhibitors, iii) effectuate mixing of the particles using counter current air flowing up the tower to ensure an even coating of urease inhibitors on the surfaces of nitrogen source particles In an embodiment, the urease inhibitor coated nitrogen sources can further comprise one or more nitrification inhibitors selected from the group consisting of 2-chloro-6-trichloromethyl)pyridine, 4-amino-1,2,4-6-triazole-HCl, 2,4-diamino-6-trichloromethyltriazine CL-1580, dicyandiamide (DCD), thiourea, 1-mercapto-1,2,4-triazole, ammonium thiosulfate, dimethylpyrazole organic and inorganic salts and 2-amino-4-chloro-6-methylpyrimidine In a variation, the NOSDS provides solvating properties to one of more biologically active agents selected from the group consisting of urease inhibitors, nitrification inhibitor(s), pesticide(s), herbicide(s), fungicides(s), and insecticide(s).

In an embodiment, the urease inhibitor coated nitrogen sources can further comprise one of more biologically active agents selected from the group consisting of nitrification inhibitor(s), pesticide(s), herbicide(s), fungicides(s), and insecticide(s).

In an embodiment, the physical properties of granular and/or prilled urea are positively impacted, wherein the granular and/or prilled is coated with a concentrated liquid composition comprised of between about 60-95% NBPT, between about 4-35% DMSO and between about 1-5% of one or more members selected from the group consisting of NOSDS other than DMSO, surfactants, buffers, fragrance/odor masking agents, non-water and non-alcohol containing colorants, wherein the coated urea composition by weight comprises between about 0.005-0.2%, 0.005-0.1%, 0.005-0.075%, 0.005-0.05%, 0.005-0.025%, 0.005-0.01%, 0.005-0.0075%, 0.0075-0.1%, 0.01-0.1%, 0.05-0.1%, 0.005-0.15%, and 0.075-0.1% of DMSO.

In an embodiment, urease inhibitors coated nitrogen sources comprising less than 0.2% DMSO, show an improvement in the relative crush strength of a nitrogen sources prill and/or granule relative to the same nitrogen sources prill and/or granule with no DMSO. In a variation, this composition which comprises between about 0.005-0.2% DMSO shows an improvement in the relative crush strength of a nitrogen sources prill and/or granule relative to the same nitrogen sources prill and/or granule with no DMSO.

In an embodiment, not to be bound by theory, when urea is contacted by an additive or coating, and wherein the treated urea comprises a compositional weight percent range of between about 0.005-0.2% DMSO, the DMSO penetrates the urea particle causing the crystalline matrix to relax. The DMSO continues to solubilize and move while penetrating deeper into the urea particle, the structure of the particle re-orients to a tighter crystalline matrix resulting in improved particle crush strength.

In an embodiment, urea comprises a compositional weight percent range of between about 0.005-0.2% DMSO has improved crush strength. In a variation, the improved crush strength allows for increases in distribution distances for fertilizer spreaders.

In an embodiment, urease inhibitor coated urea comprises a compositional weight percent range of between about 0.005-0.2% DMSO has improved crush strength. In a variation, the improved crush strength allows for increases in distribution distances for fertilizer spreaders.

In an embodiment, a bio-active agent coated urea comprises a compositional weight percent range of between about 0.005-0.2% DMSO has improved crush strength. In a variation, the improved crush strength allows for increases in distribution distances for fertilizer spreaders In an embodiment, urea comprises a compositional weight percent range of between about 0.005-0.2% DMSO has improved crush strength. In a variation, the improved crush strength allows for increases in distribution distances for fertilizer spreaders. In another variation, improvements in the distances that the said treated urea can be broadcasted by hydraulic fertilizer spreaders results in reduced cost of fertilization.

In an embodiment, improvements in the distances that the said treated urea can be broadcasted by hydraulic fertilizer spreaders results in reduced cost of fertilization. In a variation, application of bio-actives coated urea comprises a compositional weight percent range of between about 0.005-0.2% DMSO, which offers end users a cost saving from the extended availability of nitrogen through depressing the urease enzyme's activities of degrading urea to ammonia and through increased urea particle hardness. In a variation, the improved urea particle hardness allows for increases in distribution distances for fertilizer spreaders cutting down on the application time for broadcasting the bio-actives coated urea and less cleaning of equipment during the application of bio-actives coated urea to plant growth mediums.

Example 1

6.84 grams of dimethyl sulfoxide, 0.06 grams of triethanolamine and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 2

5.44 grams of dimethyl sulfoxide, 0.06 grams of triethanolamine, 1.4 grams of propylene glycol and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 3

7.0 grams of propylene glycol were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 4

5.44 grams of dimethyl sulfoxide, 0.06 grams of triethanolamine, 1.4 grams of ethylene glycol and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 5

4.48 grams of dimethyl sulfoxide, 0.05 grams of triethanolamine, 1.4 grams of glycerin and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 6

5.44 grams of dimethyl sulfoxide, 0.06 grams of triethanolamine, 1.4 grams of tripropylene glycol methyl ether (TPM) and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 7

5.44 grams of dimethyl sulfoxide, 0.06 grams of triethanolamine, 1.4 grams of ethyl lactate and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 8

5.44 grams of dimethyl sulfoxide, 0.06 grams of triethanolamine, 1.4 grams of triethylphosphate and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 9

5.44 grams of dimethyl sulfoxide, 0.06 grams of triethanolamine, 1.4 grams of polyethylene glycol 400 and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 10

4.48 grams of dimethyl sulfoxide, 0.05 grams of triethanolamine, 1.4 grams of dipropylene glycol methyl ether acetate and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 11

4.48 grams of dimethyl sulfoxide, 1.5 grams of triethanolamine and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 12

4.48 grams of dimethyl sulfoxide, 0.05 grams of triethanolamine, 1.4 grams of propylene carbonate and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 13

4.48 grams of dimethyl sulfoxide, 0.05 grams of triethanolamine, 1.4 grams of dimethyl glutarate and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 14

4.48 grams of dimethyl sulfoxide, 0.05 grams of triethanolamine, 1.4 grams of sorbitol and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 15

4.48 grams of dimethyl sulfoxide, 0.05 grams of triethanolamine, 1.4 grams of isopropylidene glycerol and 0.11 grams of FD&C Blue #1 were charged to a vessel, placed under agitation and then heated to 60° C. 34.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 16

7.0 grams of propylene carbonate were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 17

5.44 grams of tetramethylene sulfoxide, 0.06 grams of triethanolamine, 1.4 grams of propylene glycol and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 18

6.84 grams of dimethyl formamide, 0.06 grams of triethanolamine and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 19

5.44 grams of tetramethylene sulfone (sulfolane), 0.06 grams of triethanolamine, 1.4 grams of propylene glycol and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

Example 51

6.9 grams of dimethyl sulfoxide, and 0.11 grams of FD&C Blue #1 were charged to a vessel, placed under agitation and then heated to 60° C. 33.0 grams of N-(n-butyl)thiophosphoric triamide was then slowly charged to the vessel, and mixed at 45-55 C until completely dissolved. Once dissolved, the mixture was prepared for application to the surface of a powder or granular nitrification inhibitor.

(Note: Table 1 has been split into Table 1a and 1b to accommodate the amount of data)

TABLE 1a

Chart of NBPT Examples 1-10

| | Examples | | | | | | | | | |
|---|---|---|---|---|---|---|---|---|---|---|
| | 1 | 2 | 3 | 4 | 5 | 6 | 7 | 8 | 9 | 10 |
| NBPT | 33.0 | 33.0 | 33.0 | 33.0 | 34.0 | 33.0 | 33.0 | 33.0 | 33.0 | 34.0 |
| DMSO | 6.84 | 5.44 | | 5.44 | 4.48 | 5.44 | 5.44 | 5.44 | 5.44 | 4.48 |
| Blue dye | 0.11 | 0.11 | | 0.11 | 0.11 | 0.11 | 0.11 | 0.11 | 0.11 | 0.11 |
| Propylene Glycol | | 1.4 | 7 | | | | | | | |
| Ethylene Glycol | | | | 1.4 | | | | | | |
| Glycerin | | | | | 1.4 | | | | | |
| TPM | | | | | | 1.4 | | | | |
| Ethyl Lactate | | | | | | | 1.4 | | | |
| PEG 400 | | | | | | | | | 1.4 | |
| DPMAc | | | | | | | | | | 1.4 |
| Triethanolamine | 0.06 | 0.06 | | 0.06 | 0.05 | 0.06 | 0.06 | 0.06 | 0.06 | 0.05 |
| Propylene Carbonate | | | | | | | | | | |
| Dimethyl Glutarate | | | | | | | | | | |
| Sorbitol | | | | | | | | | | |
| triethyl phosphate | | | | | | | | 1.4 | | |
| Isopropylidene Glycerol | | | | | | | | | | |
| Tetramethylene sulfoxide | | | | | | | | | | |
| Dimethyl formamide | | | | | | | | | | |
| Tetramethylene sulfone | | | | | | | | | | |
| Total | 40.0 | 40.0 | 40.0 | 40.0 | 40.0 | 40.0 | 40.0 | 40.0 | 40.0 | 40.0 |
| % NBPT | 80.0 | 80.0 | 80.0 | 80.0 | 82.4 | 80.0 | 80.0 | 80.0 | 80.0 | 82.4 |
| Dispersion Stability @ 50 C. | 1 | 1 | 4 | 1 | 2 | 1 | 1 | 1 | 1 | 2 |

Stability rating: 1 = stable, 5 = split @ 6 hrs/50 C.
NBPT = N-(n-butyl)thiophosphoric triamide;
DMSO = dimethyl sulfoxide;
Blue Dye = FD&C Blue #1;
TPM = Tripropylene glycol monomethyl ether;
PEG 400 = polyethylene glycol/molecular weight of 400 units;
DPMAc = Dipropylene glycol monomethyl ether acetate capped

TABLE 1b

Chart of NBPT Examples 11-20

| | Examples | | | | | | | | | |
|---|---|---|---|---|---|---|---|---|---|---|
| | 11 | 12 | 13 | 14 | 15 | 16 | 17 | 18 | 19 | 51 |
| NBPT | 34.0 | 34.0 | 34.0 | 34.0 | 34.0 | 33.0 | 33.0 | 33.0 | 33.0 | 33.0 |
| DMSO | 4.48 | 4.48 | 4.48 | 4.48 | 4.48 | | | | | 6.89 |
| Blue dye | 0.11 | 0.11 | 0.11 | 0.11 | 0.11 | .11 | .11 | .11 | .11 | 0.11 |
| Propylene Glycol | | | | | | | 1.4 | | 1.4 | |
| Ethylene Glycol | | | | | | | | | | |
| Glycerin | | | | | | | | | | |
| TPM | | | | | | | | | | |
| Ethyl Lactate | | | | | | | | | | |
| PEG 400 | | | | | | | | | | |
| DPMAc | | | | | | | | | | |
| Triethanolamine | 1.5 | 0.05 | 0.05 | 0.05 | 0.05 | | | | | |
| Propylene Carbonate | | 1.4 | | | | 7 | | | | |
| Dimethyl Glutarate | | | 1.4 | | | | | | | |
| Sorbitol | | | | 1.4 | | | | | | |
| triethyl phosphate | | | | | | | | | | |

TABLE 1b-continued

Chart of NBPT Examples 11-20

| | Examples | | | | | | | | | |
|---|---|---|---|---|---|---|---|---|---|---|
| | 11 | 12 | 13 | 14 | 15 | 16 | 17 | 18 | 19 | 51 |
| Isopropylidene Glycerol | | | | | 1.4 | | | | | |
| Tetramethylene sulfoxide | | | | | | | 5.44 | | | |
| Dimethyl formamide | | | | | | | | 6.84 | | |
| Tetramethylene sulfone | | | | | | | | | 5.44 | |
| Total | 40.0 | 40.0 | 40.0 | 40.0 | 40.0 | 40.0 | 40.0 | 40.0 | 40.0 | 40 |
| % NBPT | 82.4 | 82.4 | 82.4 | 82.4 | 82.4 | 80.0 | 80 | 80 | 80 | 80 |
| Dispersion Stability @ 50 C. | 3 | 1 | 1 | 1 | 1 | 5 | 1 | 1 | 1 | 1 |

Stability rating: 1 = stable, 5 = split @ 6 hrs/50 C.
NBPT = N-(n-butyl)thiophosphoric triamide;
DMSO = dimethyl sulfoxide;
Blue Dye = FD&C Blue #1;
TPM = Tripropylene glycol monomethyl ether;
PEG 400 = polyethylene glycol/molecular weight of 400 units;
DPMAc = Dipropylene glycol monomethyl ether acetate capped The examples of the urease inhibitor/NOSDS formulations innovations demonstrate the flexibility technology in producing stable, liquid samples with concentrations of 80-83% of urease inhibitors. The procedure for producing Examples 20-45 is as follows:

1. 186.1 grams of solid powder or granular nitrification inhibitor were heated to 60° C. in a glass vessel and mixed using an overhead stirrer with anchor agitator.
2. 13.90 grams of one of the formulations from the Examples 1-20 @ 45-55 C was slowly dripped onto the agitating solid powder or granular nitrification inhibitor.
3. The combination was mixed at 60 RPMs for 120 seconds and then poured into an 16 oz. jar and tapped on the table top 5 times
4. The coated solid powder or granular nitrification inhibitor was evaluated for flow, quality of urease inhibitor coating, time for dissolution in distilled water and in a 30% UAN solution (urea/ammonium nitrate solution in water).

The "coating quality rating" was based on a visual assessment of coverage of nitrification particles by utilizing the incorporated blue dye. Ratings were from 1-5 where 1=poor coverage showing large patches of non-blue particles versus 5=excellent coverage as determined by the continuity of the blue color and no non-blue patches.

The "packing flowability rating" was based on a visual assessment of:

1. Pouring 200 grams of coated nitrification particles into a quart jar and capping with lid.
2. Sharply tapping the quart jar on a hard surface five times
3. After 24 hours of setting at room temperature, flip jar over. If material remains in the jar's original bottom, a small spatula's wooded handle is used to gently tap the jar's bottom.
4. Ratings were from 1-5 where 1=poor flowability where material did not fall after 5 taps versus 5=excellent flowability where all the material falls without a tap.

Urease Formulation Coating Performance

TABLE 2

Coating Performance on Nitrification Inhibitors

| Example # | Coating Example # | Nitrification inhibitor | Coating rating: 1 = poor; 5 = full coating | Flowability Rating: 1 = lumps and poor flow; 5 = good flow (1 tap max) |
|---|---|---|---|---|
| 20 | 1 | DCD | 5 | 3 |
| 21 | 2 | DCD | 5 | 5 |
| 22 | 4 | DCD | 5 | 4 |
| 23 | 5 | DCD | 5 | 3 |
| 24 | 6 | DCD | 5 | 3 |
| 25 | 7 | DCD | 4 | 4 |
| 26 | 9 | DCD | 5 | 2 |
| 27 | 10 | DCD | 5 | 3 |
| 28 | 11 | DCD | 4 | 3 |
| 29 | 12 | DCD | 4 | 3 |
| 30 | 14 | DCD | 4 | 3 |
| 31 | 15 | DCD | 5 | 3 |
| 32 | 16 | DCD | 5 | 3 |
| 33 | 17 | DCD | 5 | 5 |
| 34 | 18 | DCD | 4 | 4 |
| 35 | 19 | DCD | 5 | 5 |
| 36 | 1 | STS | 5 | 2 |
| 37 | 2 | STS | 5 | 1 |
| 38 | 6 | STS | 5 | 4 |
| 39 | 7 | STS | 5 | 1 |
| 40 | 8 | STS | 5 | 1 |
| 41 | 1 | Np | 5 | 1 |
| 42 | 2 | Np | 5 | 2 |
| 43 | 6 | Np | 5 | 3 |
| 44 | 7 | Np | 5 | 1 |
| 45 | 8 | Np | 5 | 1 |
| 46 | 51 | DCD | 5 | 3 |

^ DCD = Dicyandiamide; STS = Sodium Thiosulfate; Np = Nitrapyrin

The performance of the examples of urease inhibitors/NOSDS formulation innovations in coating nitrification inhibitor powders and granules and the flowability of the coated nitrification inhibitors without utilizing flow aid additives demonstrates the ease of use and the commercial viability of the innovation.

Nitrification Inhibitor Coated with Urease Formulation Time to Dissolution

1. In a 4 oz. glass jar add 97 grams of either Deionized (DI) Water or UAN 30.
2. Add a ¾ inch magnetic stir bar and place on a Corning/Model PC-420 Heater/Stirrer and set stirring speed at #7.
3. Charge 3 grams of a nitrification inhibitor coated or uncoated and start stop watch.
4. Visually determine the point at which all particles of the nitrification inhibitor have dissolved and record this time as time to dissolution.

TABLE 3

DCD Coated with an NBPT Concentrate in NOSDS: Time to Dissolution

| Sample ID | % Coated Nitrification | DI Water Time to Dissolution (seconds) | DI Water Initial Appearance | UAN 30 Time to Dissolution (seconds) | UAN 30 Initial Appearance |
|---|---|---|---|---|---|
| DCD untreated | 3% | X | X | 1740 | clear |
| Example 21 | 3% | 1170 | clear | 1342 | clear |
| *Commercial Product | 3% | Infinitely insoluble | Cloudy with small particles | Infinite insoluble | Cloudy with small particles |
| Example 20 | 3% | 995 | Clear | 1170 | Clear |
| Example 21 | 3% | 915 | Clear | 1125 | Clear |
| Example 22 | 3% | 885 | Clear | 1220 | Clear |
| Example 23 | 3% | 970 | Clear | 1450 | Clear |
| Example 24 | 3% | 905 | Clear | 1295 | Clear |
| Example 25 | 3% | 975 | Clear | 1265 | Clear |
| Example 26 | 3% | 1000 | Clear | 1365 | Clear |
| Example 27 | 3% | 1030 | Clear | 1265 | Clear |
| Example 28 | 3% | 885 | Clear | 1310 | Clear |
| Example 29 | 3% | 870 | Clear | 1334 | Clear |
| Example 30 | 3% | 890 | Clear | 1185 | Clear |
| Example 31 | 3% | 910 | Clear | 1140 | Clear |
| Example 46 | 3 | 985 | Clear | 1740 | Clear |

*Commercial Product = Agrotam Plus EZ Flow

TABLE 4

Ammonium Thiosulfate Coated with an NBPT Concentrate in NOSDS: Time to Dissolution

| Sample ID | % Coated Nitrification | DI Water Time to Dissolution (seconds) | DI Water Initial Appearance | UAN 30 Time to Dissolution (seconds) | UAN 30 Initial Appearance |
|---|---|---|---|---|---|
| Example 36 | 3% | X | X | 240 | Clear |
| Example 37 | 3% | X | X | 230 | Clear |
| Example 38 | 3% | X | X | 275 | Clear |
| Example 39 | 3% | X | X | 260 | Clear |
| Example 40 | 3% | X | X | 300 | Clear |

The performance of the coated DCD examples demonstrates the improved solubility of these innovations over uncoated DCD and over a commercial NBPT/DCD product. The clarity of the coated DCD innovations in a UAN solution will result in improvements in the evenness of application of both urease and nitrification inhibitors. Technologies based on an insoluble urea formaldehyde particle coated with NBPT blended with a dry DCD will result in cloudy UAN solutions that require continuous agitation to maintain homogeneity of the suspended particles. Applying such a UAN solution on a field utilizing standard spraying equipment results in uneven in application of inhibitors To determine what minimum effective levels of DCD are required to meet acceptable levels of nitrification inhibition and to maximize performance versus inhibitor level, studies were performed at Auburn University, South Dakota State University and University of Arkansas. These studies were performed by coating urea with a liquid nitrification inhibitor product, trade name N Bound, which contained approximately 28% DCD. The application rates of N Bound on urea (Units are in quarts of N Bound/ton of urea) was varied to measure application level versus the conversion of urea to nitrate measured as mg $NO_3$ extracted from the applied soil.

Example 47

A trial conducted at University of Arkansas was designed to measure and compare the nitrate concentrations from the microbial activity on untreated urea and ureas coated with N Bound that had been applied to classified as a Calhoun silt loam (pH=7.4) at varying rates. The objective was to determine the minimum inhibitor application rate to achieve optimize nitrification inhibition. The statistical results are listed in Table 5.

TABLE 5

Nitrate-N Concentration (mg $NO_3$—N/kg soil)

|  | Day 1 | Day 3 | Day 7 | Day 14 | Day 21 | Day 28 | Day 35 |
| --- | --- | --- | --- | --- | --- | --- | --- |
| Untreated Soil (check) | 112.2 | 99.4 | 115.4 | 143.7 | 141.4 | 175.8 | 151.2 |
| Urea | 113.4 | 98.6 | 151.6 | 202.8 | 221.2 | 262.3 | 255.3 |
| Urea + Liquid DCD product (4 qt/T) | 111.6 | 97.2 | 141.5 | 199.3 | 223.1 | 271.4 | 259.4 |
| Urea + Liquid DCD product (6 qt/T) | 112.8 | 96.2 | 143.7 | 197.9 | 216.9 | 251.0 | 268.9 |
| Urea + Liquid DCD product (8 qt/T) | 113.1 | 99.4 | 139.9 | 176.8 | 203.1 | 245.8 | 258.3 |

Table 5. Product application rates and nitrification of urea fertilizer during a 35 day incubation The results of the trial show nitrification control through 21 days at a rate of 8 qt N-Bound/ton is used.

Example 48

A trial conducted at the South Dakota State was designed to measure and compare the nitrate concentrations from the microbial activity on untreated urea and ureas coated with N Bound that had been applied to Midwestern soil at varying rates. The graph in FIG. 1 shows the results of the experiment. The results of the experiment conclude that N Bound applied at 7 lbs/ton or more resulted in more plant available nitrogen (ammonium and nitrate nitrogen after 35 days of storage versus lower N Bound application levels.

Example 49

Figure 2:
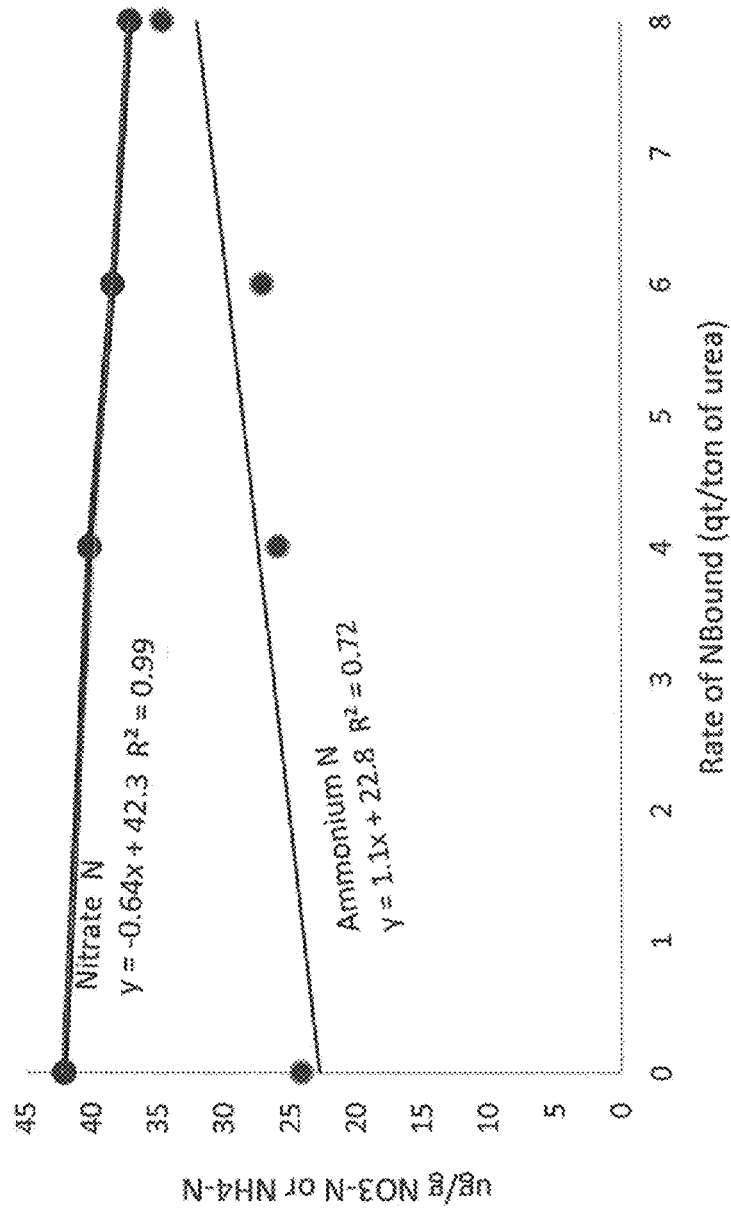
FIG. 2: 2M KCl extraction of soil for presence of $NH_4$—N and $NO_3$—N to determine impact of rate of liquid containing nitrification inhibitor addition. Data collected is the average of 8 weeks of soil extractions.

A trial conducted at the Auburn University was designed to measure and compare the nitrate and ammonical nitrogen concentrations from the microbial activity on untreated urea and ureas coated with N Bound that had been applied a wetted Marvyn loamy sand, (approximately 80% sand) at varying rates. The graph in FIG. 2 shows the results of the experiment. The results of the experiment conclude that in the 8 week incubation study, N Bound applied to urea at 8 qts/Ton of urea exhibited significant nitrification inhibitory properties versus lower N Bound application levels.

Table 6 shows the conversion of the data in Example 46, 47, and 48 of N Bound application levels to percentages of N Bound on urea. Table 2 also converts N Bound application levels to DCD application levels on urea and on the basis of the nitrogen present in urea.

TABLE 6

| Testing Entity | *Quarts of N Bound/ton of urea | **% N Bound on urea | ***% DCD on urea | **** % DCD based on nitrogen content of urea |
| --- | --- | --- | --- | --- |
| South Dakota State University | 7 | 0.84% | 0.24% | 0.51% |

TABLE 6-continued

| Testing Entity | *Quarts of N Bound/ton of urea | **% N Bound on urea | ***% DCD on urea | **** % DCD based on nitrogen content of urea |
| --- | --- | --- | --- | --- |
| Auburn University | 8 | 0.97% | 0.27% | 0.59% |
| University of Arkansas | 8 | 0.97% | 0.27% | 0.59% |

*N Bound (trade name of EcoAgro Resources) is DCD dispersed in a non-aqueous solvent system.
**Specific gravity of N Bound (lbs/gal) = 9.6512
***% DCD = 28%
**** % N in urea = 46%

For dry urea, liquid systems containing DCD have the advantage of even distribution of inhibitors over the surface of urea. Liquid products containing and urease and nitrification inhibitors offer the same benefit. However, the drawback is that coating levels exceeding 0.75% of current liquid systems have processability issues in mixing and application equipment with the formation of clogs and high level of deposition of the fertilizer requiring more frequent cleaning and the formation of clumps of fertilizer impacting evenness of application. Coating levels of <0.75% of such a liquid product can be achieved with application of a maximum of 6 qts liquid product/ton of urea. However, this results in an application level of DCD at 0.20% which is below the minimum effective level as established in the above studies.

Example 50

Figure 3:
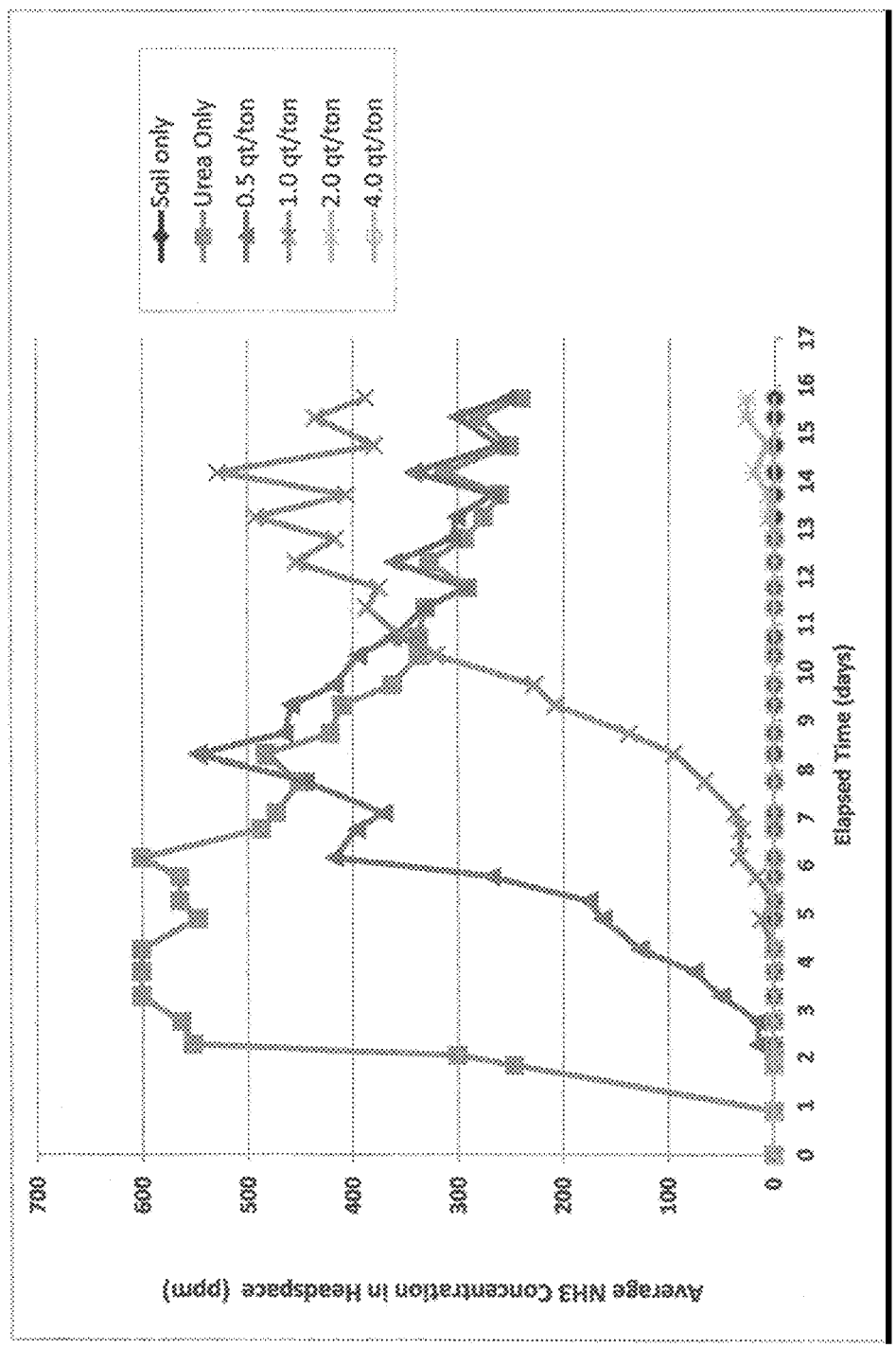
FIG. 3: Average of headspace analysis for $NH_3$ to determine impact of rate of liquid containing urease inhibitor addition. Data was collected over a 16 day period.

A trial conducted at the West Texas State University was designed to measure and compare the headspace analysis of ammonia concentrations formed from urease activity on untreated urea and ureas coated with N Yield that had been applied western US soils at varying rates. The graph in FIG. 3 shows the results of the experiment. The results of the experiment conclude N Yield applied to urea at 2 qts/Ton of urea exhibited significant urease inhibitory properties versus lower N Yield application levels. Table 7 shows the conversion of the data in FIG. 3 of N Yield application levels to percentages of N Yield on urea. Table 7 also converts N Yield application levels to NBPT application levels on urea and on the basis of the nitrogen present in urea.

TABLE 7

| Testing Entity | *Quarts N Yield/ton of urea | **% liquid NBPT on urea | **% NBPT on urea | **** % NBPT required for nitrogen content of urea |
|---|---|---|---|---|
| West | 0.5 | 0.06% | 0.02% | 0.03% |
| Texas | 1 | 0.11% | 0.03% | 0.07% |
| State | 2 | 0.23% | 0.06% | 0.13% |
| University | 4 | 0.45% | 0.12% | 0.26% |

*N Yield (trade name of EcoAgro Resources) is NBPT dispersed in a non-aqueous solvent system.
**Specific gravity of N Yield (lbs/gal) = 9.08
***% NBPT = 26.7%
**** % N in urea = 46%

For dry urea, liquid systems containing NBPT have the advantage of even distribution of inhibitors over the surface of urea. Liquid products containing and urease and nitrification inhibitors offer the same benefit. However, while liquid coating containing NBPT are well under the 0.75% level, coating urea with both DCD and urease inhibitors require application levels that exceed 0.75%. This results in coated urea having processability issues in mixing and application equipment with the formation of clogs and high level of deposition of the fertilizer requiring more frequent cleaning and the formation of clumps of fertilizer impacting evenness of application.

Example 51

A sample of (hexylaminomethylene, aminomethylene) phosphinic acid, ($C_8H_{20}N_2O_2P$), was prepared by charging 132 grams of hypophosphorous acid/50% water to a reaction vessel and then charging 60 grams of paraformaldehyde while agitating. Cooling was applied to assist in maintaining the temperature below 50° C. The composition was then heated to 70° C. and held at 70° C. until the composition cleared. The temperature was cooled to 25-30° C. and then 101.19 grams of hexylamine was slowly charged in order to maintain the temperature <40 C. After completing the hexylamine charge, temperature was raised to 70° C. over a two hour period and then held for one hour or until composition's appearance became clear. Once appearance became clear, a sub-surface charging of ammonia gas began. The $NH_3$ sparge continued at a temperature of 70° C. until the composition's 10% pH reached 7.5-8.5 and then the composition was then heated to 90° C. over a one hour period. During this time, the composition's 10% pH was held at 7.5-8.5 by adjusting the pH through ammonia sparging. The composition was held at 90° C. for one hour while maintain 10% pH at 7.5-8.5 by adjusting the pH through ammonia sparging. After 1 hour at 90° C., vessel pressure was reduced through application of a vacuum until the pressure reading was 80-100 mm Hg to strip out excess ammonia and some water until distillation stopped.

Example 52

A sample of (hexylaminomethylene, aminomethylene) phosphinic acid, ($C_8H_{20}N_2O_2P$), was prepared by charging 132 grams of hypophosphorous acid/50% water and 20 grams propylene carbonate to a reaction vessel. Reaction vessel was heated to 70° C. and water stripped out until % moisture ≤5% under reduced pressure. After composition was cooled to 30-40° C., the reaction proceeded with charging 46 grams of dimethyl sulfoxide and then slowly charging 60 grams of trioxane while agitating. The composition was then heated to 70° C. and held at 70° C. until the composition cleared. The temperature was cooled to 25-30° C. and then 101.19 grams of hexylamine was slowly charged in order to maintain the temperature <40° C. After completing the hexylamine charge, the temperature was raised to 70° C. over a two hour period and then held for one hour or until the composition's appearance became clear. Once the appearance became clear, a sub-surface charging of ammonia gas began. The $NH_3$ sparge continued at a temperature of 70° C. until the composition's 10% pH reached 7.5-8.5 and then the composition was then heated to 90° C. over a one hour period. During this time, the composition's 10% pH was held at 7.5-8.5 by adjusting the pH through ammonia sparging. The composition was held at 90° C. for one hour while maintain 10% pH at 7.5-8.5 by adjusting the pH through ammonia sparging. After 1 hour at 90° C., the vessel pressure was reduced through application of a vacuum until the pressure reading was ≤20 mm Hg to strip out excess ammonia and water. The vacuum was maintained until distillation ceased and % moisture was less than 5%. The 10% pH was rechecked and extra $NH_3$ gas was sparged to adjust the pH to 7.5-8.0. The composition was cooled and packaged.

Example 53

120 grams of Example 51 and 36 grams of ethylene glycol were charged to a reaction vessel and heated to 90° C. The vessel pressure was reduced through application of a vacuum until the pressure reading was ≤20 mm Hg to strip out excess ammonia and water. The vacuum was maintained until distillation ceased and % moisture was less than 5%. The composition was cooled and packaged.

Example 54

Ammonia Volatilization Screening Test for Urease Inhibitors Before testing example Nos 51 and 52 performances as a coating on nitrification inhibitor granules, the examples were validated for performance as urease inhibitors by comparing the ammonia volatilization of treated urea versus untreated urea. The treated urea was prepared as follows:

Sample Preparation for Application to Urea

Example 55

Example 52 actives were adjusted to 30% by dilution with DMSO.

Example 56

Example 53 actives were adjusted to 30% by dilution with DMSO

Example 57

Example 51 actives were adjusted to 30% by dilution with 50/50 DMSO/Water

Example 58

30.92 grams N-(n-butyl) thiophosphoric triamide was dissolved in 69.08 grams of a 50/50 DMSO/propylene glycol Examples Application to Urea Urea was coated with an example by:
1. Charging weight of urea as directed by Table 8 to a container.
2. The urea was slowly agitated with overhead stirrer with U shaped agitator blade.
3. The example was slowly dripped on the urea while mixing in the amount as directed by Table 8 (rate=3 quarts/ton of urea).
4. When the proper weight of the example had been charged the mixing speed was increased to ensure adequate coating of the urea by the example.
5. The coated urea was placed in a jar and sealed.

TABLE 8

Formulation for treating urea

| Compound | Example 59 | Example 60 | Example 61 | Example 62 |
|---|---|---|---|---|
| Urea | 199.28 grams | 199.28 | 199.28 | 199.28 |
| Example 55 | 0.72 grams | | | |
| Example 56 | | 0.72 grams | | |
| Example 57 | | | 0.72 grams | |
| Example 58 | | | | 0.72 grams |

Preparing Test Soil

1. In a 6"×9" rectangular Tupperware sealable container with holes drilled on each end and sealed with tape charge 400 grams of West Texas Sandy Loam Soil and 100 grams of distilled water, mix thoroughly to a consistency of thick "mud" (% moisture should be between 30-40%).
2. Calculate the surface area to be treated.
   a. 6"×9.5"=sq in/1 44 sq in/sq ft=0.395 sq ft
   b. 0.395 sq ft/43,560 sq ft/acre=0.0000091 acres
3. Calculate amount of urea and treated urea to charge to the containers of soil
   a. Application Rate: 400 pounds urea per acre
   b. 400 lbs/acre/43560 sq ft/acre=0.009 lbs/sq ft×0.395 sq ft/container=0.0036 lbs/container×454 g/lb=1.65 grams urea per container.
   c. Add 1.65 grams of urea and various treated ureas to each container
4. Ammonia Volatilization Screening Test
   a. Evenly distribute over the soil in each container 1.65 grams of example to be tested,
   b. Seal container,
   c. Take readings of ammonia volatilization of each container over a selected period of time as directed in Table 9,
      i. Drager tube measurement
         (1) Use Drager pump with 0-600 ppm (or range TBD) ammonia drager tube.
         (2) At specified times, quickly remove the tape on one end of container and insert the drager tube/pump.
         (3) Fully squeeze pump 20 times allowing enough time for pump to fully inflate between each squeeze and then remove the tube from the container and read.
         (4) Open container lid and vent the remaining ammonia gas out of the container and reseal.
         (5) Repeat procedure at next designated time.

TABLE 9

Ammonia Volatilization Test Results

| | Ammonia Reading (ppm) | | |
|---|---|---|---|
| Example ID | 72 hours | 144 hours | 264 hours |
| Urea | 220 | 475 | 460 |
| #59 | 50 | 120 | 200 |
| #61 | 50 | 110 | 220 |
| #62 | 90 | 210 | 600 |

The performance of the examples of the new urease inhibitors/NOSDS formulations in slowing the generation of ammonia from the degradation of urea by urease enzyme show these examples perform better than the standard urease inhibitor N-(n-butyl) thiophosphoric triamide.

The procedure for producing DCD coated examples from examples 51-53 is as follows:
1. 186.1 grams of solid powder or granular nitrification inhibitor were heated to 60° C. in a glass vessel and mixed using an overhead stirrer with anchor agitator.
2. 13.90 grams of one of the formulations from the Examples 51-53 @ 45-55° C. was slowly dripped onto the agitating solid powder or granular nitrification inhibitor.
3. The combination was mixed at 60 RPMs for 120 seconds and then poured into an 16 oz. jar and tapped on the table top 5 times.
4. The coated solid powder or granular nitrification inhibitor was evaluated for flow, quality of urease inhibitor coating.

The "coating quality rating" was based on a visual assessment of coverage of nitrification particles by utilizing the incorporated blue dye. Ratings were from 1-5 where 1=poor coverage showing large patches of non-blue particles versus 5=excellent coverage as determined by the continuity of the blue color and no non-blue patches.

The "packing flowability rating" was based on a visual assessment of:
1. Pouring 200 grams of coated nitrification particles into a quart jar and capping with lid.
2. Sharply tapping the quart jar on a hard surface five times.

3. After 24 hours at room temperature, flip jar over. If material remains in the jar's original bottom, a small spatula's wooded handle is used to gently tap the jar's bottom.
4. Ratings were from 1-5 where 1=poor flowability where material did not fall after 5 taps versus 5=excellent flowability where all the material falls without a tap.

Urease Formulation Coating Performance

TABLE 10

Coating Performance on Nitrification Inhibitors

| Example # | Nitrification inhibitor | Coating rating: 1 = poor; 5 = full coating | Flowability Rating: 1 = lumps and poor flow; 5 = good flow (1 tap max) |
|---|---|---|---|
| 51 | DCD | 3 | 3 |
| 52 | DCD | 5 | 4 |
| 53 | DCD | 5 | 5 |

^ DCD = Dicyandiamide

Example #53 showed the best performance of the 3 examples of urease inhibitors/NOSDS formulation in coating nitrification inhibitor particles. The resulting flowability of the coated nitrification inhibitors without utilizing flow aid additives demonstrates the ease of use. Example 51 shows the negative impact of water on coating and on flowability.

Example 63

240 grams of hypophosphorous acid/50% in water and 60 grams of propylene carbonate were charged to a reaction vessel. The contents were placed under a vacuum of 25-35 mm and heated to 90° C. Approximately 107 grams of water were removed. 93.1 grams of the stripped hypophosphorous acid and propylene carbonate were charged to another reaction vessel and cooled to 30° C. 56.47 grams of 1,3,5-trioxane and 111.74 of Dimethyl Sulfoxide were charged to the reaction vessel and mixed until the trioxane was dissolved. The contents were heated to 75° C. over a 6 hour period and then held a 75° C. for 30 minutes. The contents were cooled to 40-50° C. and then 95.16 grams of n-hexylamine was slowly charged over an hour to the reactor while holding the temperature at 40-45° C. The contents were then heated to 80° C. over a three hour period. A vacuum of 20-30 mm was established and the reaction vessel contents were stripped of water content changing appearance of contents from murky to clear. Contents were cooled to 60° C. and then ammonia gas was charged subsurface to the contents while maintaining temperature at 60-80° C. When approximately ½ of the ammonia gas (8 grams) had been charged, the ammonia charge was halted and a vacuum of 20-30 mm was established and the reaction vessel contents were stripped of water content changing appearance of contents from murky to clear. The subsurface charging of the ammonia gas was re-started and continued until the pH was at 8.2. The contents were heated to 110° C. and held for 30 minutes. The subsurface charging of ammonia gas was started as the contents were cooled to 80° C., the pH was measured at 8.6 and the ammonia gas charge was halted. A vacuum of 20-30 mm was established and the reaction vessel contents were stripped of water content changing appearance of contents from murky to clear. The contents were cooled and packaged.

Example 64

91.13 grams of hypophosphorous acid/50% in water and 44.19 grams of Dimethyl Sulfoxide were charged to a reaction vessel. 41.84 grams of paraformaldehyde and 22.78 grams of Dimethyl Sulfoxide for rinsing were charged to the reaction vessel and mixed until the paraformaldehyde was dispersed and its exotherm completed. The contents were heated to 70° C. over a 2 hour period and then heated a 100° C., held for 30 minutes and then the contents were cooled to 27° C. and then 89.21 grams of aminoethylpiperzine was slowly charged over an hour to the reactor while holding the temperature at 40-45° C. The contents were then heated to 100° C. over a one hour period. Contents were cooled to 44.3° C. and then ammonia gas was charged subsurface to the contents while maintaining temperature at 60-80° C. The subsurface charging of the ammonia gas was started and continued until the pH was at 8.2. The contents were heated to 110° C. and held for 60 minutes. The contents were cooled to 88° C., the pH was measured at 7.9 and a vacuum of 20-30 mm was established and the reaction vessel contents were stripped of water content. Approximately 46.6 grams of distillate were recovered and a yield of 71.27%. The contents were cooled and packaged.

Example 65

97.18 grams of hypophosphorous acid/50% in water and 47.12 grams of Dimethyl Sulfoxide were charged to a reaction vessel. 44.61 grams of paraformaldehyde and 24.29 grams of Dimethyl Sulfoxide for rinsing were charged to the reaction vessel and mixed until the paraformaldehyde was dispersed and its exotherm completed. The contents were heated to 70° C. over a 2 hour period and then heated a 100° C., held for 30 minutes and then the contents were cooled to 44.3° C. and then 75.22 grams of dimethylaminopropylamine was slowly charged over an hour to the reactor while holding the temperature at 40-45° C. The contents were then heated to 100° C. over a one hour period. Contents were cooled to 22.4° C. and then ammonia gas was charged subsurface to the contents while maintaining temperature at 60-80° C. The subsurface charging of the ammonia gas was started and continued until the pH was at 8.6. The contents were heated to 110° C. and held for 60 minutes. The contents were cooled to 88° C., the pH was measured at 8.1 and a vacuum of 20-30 mm was established and the reaction vessel contents were stripped of water content. Approximately 78.7 grams of distillate were recovered and a yield of 58.47%. The contents were cooled and packaged.

Example 66

91.12 grams of hypophosphorous acid/50% in water and 44.18 grams of Dimethyl Sulfoxide were charged to a reaction vessel. 41.83 grams of paraformaldehyde and 22.78 of Dimethyl Sulfoxide for rinsing were charged to the reaction vessel and mixed until the paraformaldehyde was dispersed and its exotherm completed. The contents were heated to 70° C. over a 2 hour period and then heated a 100° C., held for 30 minutes and then the contents were cooled to 37.8° C. and then 100.97 grams of n-butylamine was slowly charged over an hour to the reactor while holding the temperature at 40-45° C. and hold for 1.5 hours. The contents were then heated to 110° C. over a four hour period.

Contents were cooled to 60° C. and then ammonia gas was charged subsurface to the contents while maintaining temperature at 60-80° C. The subsurface charging of the ammonia gas was started and continued until the pH was at 8.1. A vacuum of 20-30 mm was established and the reaction vessel contents were stripped of water content. Approximately 59.87 grams of distillate were recovered and a yield of 60.07%. The contents were cooled and packaged.

Example 67

50 grams of a 50% ammonia neutralized polyaspartic acid in DMSO was mix with 50 grams of Example 63 for 30 minutes. Sample was clear and packaged.

Example 68

50 grams of a 34% solution of DCD in DMSO was mix with 50 grams of Example 63 for 30 minutes. Sample was clear and packaged.

Example 69

50 grams of a 50% N-(n-butyl) thiophosphoric triamide in DMSO was mix with 50 grams of Example 63 for 30 minutes. Sample was clear and packaged.

Example 70

50 grams of a 50% N-(n-butyl) thiophosphoric triamide in DMSO was mix with 50 grams of Example 65 for 30 minutes. Sample was clear and packaged.

Example 71

50 grams of a 34% solution of DCD in DMSO was mix with 50 grams of Example 64 for 30 minutes. Sample was clear and packaged.

Example 72

50 grams of a 34% solution of DCD in DMSO was mix with 50 grams of Example 66 for 30 minutes. Sample was clear and packaged.

Example 73

50 grams of a 44% solution of DCD-formaldehyde reaction product in DMSO was mix with 50 grams of Example 63 for 30 minutes. Sample was clear and packaged.

Example 74

35 grams of a 44% solution of DCD-formaldehyde reaction product in DMSO was mix with 35 grams of a 30% solution of polysuccinimide and 30 grams of Example 63 for 30 minutes. Sample was clear and packaged.

Example 75

1.44 grams of tripropylene glycol mono methyl ether (TPM) and 4.83 grams of dimethyl sulfoxide (DMSO) were heated to 55° C. under agitation. Next 92.85 grams of N(n-butyl) thiophosphoric triamide (NBPT) powder was very slowly charged initially allowing small portions to be solubilized before adding more powder. Once the NBPT has been completely solubilized, 0.24 grams of a scent package and 0.05 grams of triethanolamine (TEA) were charged. 0.6 grams of Example 86 was charged and the resulting product was maintained between 55-60° C. for application to urea.

Example 76

3.5 grams of tripropylene glycol mono methyl ether (TPM) and 12.93 grams of dimethyl sulfoxide (DMSO) were heated to 45° C. under agitation. Next 82.55 grams of N(n-butyl) thiophosphoric triamide (NBPT) powder was very slowly charged initially allowing small portions to be solubilized before adding more powder. Once the NBPT has been completely solubilized, 0.6 grams of a scent package and 0.29 grams of triethanolamine (TEA) were charged. 1.45 grams of Example 86 was charged and the resulting product was maintained between 45-50° C. for application to urea.

Example 77

3.07 grams of tripropylene glycol mono methyl ether (TPM) and 23.82 grams of dimethyl sulfoxide (DMSO) were heated to 40° C. under agitation. Next 72.23 grams of N(n-butyl) thiophosphoric triamide (NBPT) powder was slowly charged initially allowing small portions to be solubilized before adding more powder. Once the NBPT has been completely solubilized, 0.53 grams of a scent package and 0.11 grams of triethanolamine (TEA) were charged. 1.30 grams of Example 86 was charged and the resulting product was maintained between 40-45° C. for application to urea.

Example 78

2.63 grams of tripropylene glycol mono methyl ether (TPM) and 34.70 grams of dimethyl sulfoxide (DMSO) were heated to 40° C. under agitation. Next 61.91 grams of N(n-butyl) thiophosphoric triamide (NBPT) powder was slowly charged initially allowing small portions to be solubilized before adding more powder. Once the NBPT has been completely solubilized, 0.45 grams of a scent package and 0.09 grams of triethanolamine (TEA) were charged. 1.1 grams of Example 86 was charged and the resulting product was maintained between 40-45° C. for application to urea.

Example 79

40 grams of dimethyl sulfoxide (DMSO) were heated to 45° C. under agitation. Next 60 grams of N(n-butyl) thiophosphoric triamide (NBPT) powder was slowly charged initially allowing small portions to be solubilized before adding more powder. Once the NBPT has been completely solubilized, the solution was cooled to 38° C. and packaged.

Example 80

35 grams of dimethyl sulfoxide (DMSO) were heated to 45° C. under agitation. Next 65 grams of N(n-butyl) thiophosphoric triamide (NBPT) powder was slowly charged initially allowing small portions to be solubilized before adding more powder. Once the NBPT has been completely solubilized, the solution was cooled to 38° C. and packaged.

Example 81

31.3 grams of dimethyl sulfoxide (DMSO) were heated to 45° C. under agitation. Next 20.6 grams of N(n-butyl)

thiophosphoric triamide (NBPT) powder was slowly charged. Once the NBPT has been completely solubilized, 45.6 grams of propylene glycol, 1.5 grams of scent, 0.5 grams of triethanolamine, and 2.4 grams of Example 86 were charged, mixed for 15 minutes, cooled to 38° C. and packaged.

The chill points of some of the examples are listed below in Table 11 wherein the various components are listed in grams (except for the chill point, which is in ° C.).

TABLE 11

|  | Example 75 | Example 76 | Example 77 | Example 78 | Example 79 | Example 80 | Example 81 |
|---|---|---|---|---|---|---|---|
| TPM | 1.44 | 3.50 | 3.07 | 2.63 | | | |
| NBPT | 92.85 | 82.55 | 72.23 | 61.91 | 60 | 65 | 20.6 |
| DMSO | 5.31 | 12.93 | 23.82 | 34.70 | 40 | 35 | 31.3 |
| Scent | 0.24 | 0.60 | 0.53 | 0.45 | | | 1.5 |
| PG | | | | | | | 45.6 |
| Blue Dye | 0.12 | 0.29 | 0.26 | 0.22 | | | 0.5 |
| TEA | 0.05 | 0.12 | 0.11 | 0.09 | | | 0.5 |
| CHILL POINT | 56° C. | 45° C. | 21° C. | −2° C. | −13° C.< | 4° C. | −20° C.< |

*CHILL POINT: temperature when example begins to cloud and loses liquidity.

**TPM: tripropylene glycol mono methyl ether

NBPT: N(n-butyl) thiophosphoric triamide

DMSO: dimethyl sulfoxide

PG: propylene glycol

Blue dye: FD&C Blue #1

TEA: triethanolamine

Example 82

90 grams of propylene glycol were charged and placed under agitation. 10.0 grams of Example 86 were charged, mixed for 15 minutes and packaged.

Example 83

80 grams of propylene glycol were charged and placed under agitation. 20.0 grams of Example 86 were charged, mixed for 15 minutes and packaged.

Example 84

63 grams of propylene glycol were charged and placed under agitation. 30 grams of Example 86 and 7 grams of DMSO were charged, mixed for 15 minutes and packaged.

Example 85

56 grams of propylene glycol were charged and placed under agitation. 30 grams of Example 86 and 14 grams of DMSO were charged, mixed for 15 minutes and packaged.

Example 86

80 grams of DMSO were charged, placed under agitation, and heated to 60° C. 20 grams of a FD&C Blue #1 dye were charged, mixed for 2 hours cool to 38° C. and then packaged. Example 86 is utilized as visual aid to confirm the evenness of the coating of the surfaces of urea granules.

Example 87

9.85 grams of Example 52 were charged, placed under agitation and heated to 40° C. 0.15 grams of Example 86 were charged, mixed for 15 minutes, cool to 38° C. and then packaged.

Example 88

Application of Examples to Urea

Procedure for Coating Urea Examples 1. charging weight of urea as directed by Table 12 to a container,
2. agitating slowly the urea was with overhead stirrer with U shaped agitator blade,
3. setting the urea's temperature at 50° C.,
4. dripping slowly an example on the urea as directed by Table 12 while mixing in the amount,
5. increasing the agitation speed high enough, after the proper weight of the example had been charged, to ensure even coating of the urea by the example being tested,
6. pouring the coated urea into ajar and sealing it.

TABLE 12

| Formulation for urease inhibitor coating of urea | | | | | | |
|---|---|---|---|---|---|---|
| Compounds | Weight is in grams | | | | | |
| Urea | 199.66 | 199.7 | 199.61 | 199.54 | 198.63 | 199.61 |
| Example 75 | 0.34 | | | | | |
| Example 76 | | 0.3 | | | | |
| Example 77 | | | 0.39 | | | |
| Example 78 | | | | 0.46 | | |

TABLE 12-continued

Formulation for urease inhibitor coating of urea

| Compounds | Weight is in grams | | | | | |
|---|---|---|---|---|---|---|
| Urea | 199.66 | 199.7 | 199.61 | 199.54 | 198.63 | 199.61 |
| Example 81 | | | | | 1.37 | |
| Example 87 | | | | | | 0.39 |

*Application ranges set to deliver 0.141% urease inhibitor to the surface of urea for all examples The "coating quality rating" was based on a visual assessment of coverage of urea particles by utilizing the incorporated blue dye. Ratings were from 1-5 where 1=poor coverage showing large patches of non-blue particles versus 5=excellent coverage as determined by the continuity of the blue color and no non-blue patches.

The "packing flowability rating" was based on a visual assessment of:
1. Pouring 200 grams of coated urea particles into a quart jar and capping with lid.
2. Sharply tapping the quart jar on a hard surface five times.
3. After 24 hours at room temperature, flip jar over. If material remains in the jar's original bottom, a small spatula's wooded handle is used to gently tap the jar's bottom.
4. Ratings were from 1-5 where 1=poor flowability where material did not fall after 5 taps versus 5=excellent flowability where all the material falls without a tap.

TABLE 13

Urease Formulation Coating Performance
Coating Performance on Urea

| Example # | Coating rating: 1 = poor; 5 = full coating | Flowability Rating: 1 = lumps and poor flow; 5 = good flow (1 tap max) |
|---|---|---|
| 75 | 5 | 5 |
| 76 | 5 | 5 |
| 77 | 5 | 4 |
| 78 | 5 | 4 |
| 81 | 5 | 3 |
| 87 | 5 | 4 |

Results show that the concentrated NBPT and a phosphinic acid organo amine/ammonium salt dissolved in a DMSO and another NOSDS can effectively coat urea at moderate temperatures. Results of Example 81 show while good coverage was achieved, the higher levels of NOSDS negatively impacted the urea particles flowability, but it is still acceptable.

Example 89

25.03 grams of Example 76 were charged to 174.98 grams of urea @50° C. using the setup of Example 88 resulting in about 10% NBPT applied to the surfaces of urea. The example was extremely wet and possessed poor flow properties.

Example 90

14.1 grams of Example 89 were charged to 85.9 grams of urea @50° C. using the setup of Example 88 resulting in about 0.141% NBPT applied to the surfaces of all the urea. This example showed good coverage and possessed good flow properties.

Example 91

14.1 grams of Example 89 were charged to 85.9 grams of urea @24° C. using the setup of Example 88 resulting in about 0.141% NBPT applied to the surfaces of all the urea. This example required more mixing time to demonstrate fair coverage and to possess good flow properties.

Examples 89, 90, and 91 demonstrate that a high level of urease inhibitor can be applied to urea and then the coated urea can be utilized as a urease inhibitor carrier to be blended with untreated urea. Example 90 demonstrates that a warmer urea requires less blending time.

Example 92

Crush Strength of Urease Inhibitor Coated Urea

Crush strength is the minimum pressure required to crush a granule of urea. Crush strength is of concern during the application of urea and is a measure of the urea's expected broadcast distance. Crush strength is related to the maximum rotations per minute (rpm) for the spinner portion of the urea spreader. The higher the rpms of the spinner, the more distance the urea can be broadcasted. High rpms require high crush strength urea granules in order for the granules not to be pulverized to dust by the broadcast process.

In order for the coated granules of urea to be tested, they were first sifted through a series of screens to ensure that the urea granules to be tested were of similar particle size as the urea particle size has an impact on crush resistance. A mesh size of 320-400 was chosen as the urea particle size. A New Leader crushing strength tester was used utilizing a scale from 1-10 wherein a reading of 1 is rated very poor crush strength. The results in Table 14 are for coated urea stored at 25° C. and at 50° C. Also included in Table 14 is the weight percentage of DMSO of the composition of the coated urea.

TABLE 14

Crush Strength Performance on Urea

| Example # | % DMSO in coated urea | Crush Strength stored 24 hrs. @ 25 C. | Crush Strength stored 24 hrs. @ 50 C. |
|---|---|---|---|
| 75 | 0.008% | 7.0 | 7.55 |
| 76 | 0.0221% | 7.7 | 7.30 |
| 77 | 0.0464% | 7.35 | 7.70 |
| 78 | 0.0789% | 7.85 | 7.40 |
| 81 | 0.2140% | 4.9 | 5.70 |
| Urea, std | 0.0% | 5.4 | 6.75 |

* Crush Strength numbers in Table 14 are the average of 10 individual runs

The results of the crush strength test were unexpected. The original goal of the invention was to be able to coat urea granules with higher levels of NBPT without negatively impacting the urea granule's crush strength. Unexpectedly, the low levels of DMSO (Examples 75-78) resulted in a urea granule with at least a 10% improvement in crush resistance. As expected, the higher level of DMSO in Example 81 and the high sample loading on the surfaces of urea particles to achieve a 0.141% NBPT coated urea lowered the crush resistance of the coated urea. Based on the Table 14 data, the impact of the storage temperature on crush resistance did not demonstrate a strong trend for the coated urea (note Examples 75, 76, 77, and 78). The uncoated urea and Example 81 showed a significant loss of crush resistance stored at a lower temperature.

Example 94

Crush Strength of DMSO Coated Urea

The unexpected crush strength results of Example 93 led to an experiment wherein the urease inhibitor was removed and propylene glycol was chosen as the delivery solvent for DMSO to the surfaces of urea. Propylene glycol was also chosen to examine whether it also had a role in the poor crush resistance result of Example 81. Table 15 shows the formulations to be utilized to coat urea

TABLE 15

Non-urease Formulations (in grams)

| Raw material | Example 82 | Example 83 | Example 84 | Example 85 | Example 86 |
|---|---|---|---|---|---|
| DMSO | 8.0 | 16.00 | 31.00 | 38.00 | 80 |
| PG | 90.0 | 80.00 | 63.00 | 56.00 | |
| Blue Dye | 2.0 | 4.00 | 6.00 | 6.00 | 20 |

DMSO: dimethyl sulfoxide
PG: propylene glycol
Blue dye: FD & C Blue #1

The same procedure was utilized as in Example 88. Table 16 shows the formulations for the coated urea and the resulting performance of the evenness of the coated of the urea and the coated urea's flowability.

TABLE 16

Coated Urea Formulations

| Compounds | Weight is in grams | | | | |
|---|---|---|---|---|---|
| Urea | 199.66 | 199.66 | 199.66 | 199.66 | 199.91 |
| Example 82 | 0.34 | | | | |
| Example 83 | | 0.34 | | | |
| Example 84 | | | 0.34 | | |
| Example 85 | | | | 0.34 | |
| Example 86 | | | | | 0.09 |
| Coverage rating: 1-5 1 = poor | 5 | 5 | 5 | 5 | 2 |
| Flow Properties rating: 1-5 1 = poor | 5 | 5 | 4 | 4 | Did not run |

Example 86 demonstrated poor coverage because it does not have a carrier solvent to assist in distributing the dye in DMSO onto the surfaces of the urea granules. However, it should be understood that a different method of applying example 86 to the surfaces of the urea granules might result in better coverage (e.g., atomization onto the granules). The procedure for evaluating a coated urea particle's crush resistance was the same as utilized in Example 92. Table 17 has the crush strength results.

TABLE 17

Crush Strength Performance on Urea

| Example # | % DMSO in coated urea | Crush Strength stored 24 hrs. @ 25° C. | Crush Strength stored 24 hrs. @ 50° C. |
|---|---|---|---|
| 82 | 0.0137% | 7.00 | 7.55 |
| 83 | 0.0273% | 7.65 | 8.00 |
| 84 | 0.0529% | 7.95 | 6.95 |
| 85 | 0.0648% | 7.75 | 7.55 |
| Urea, std | 0.0% | 5.4 | 6.75 |

* Crush Strength numbers in Table 17 are the average of 10 individual runs

The results of the crush strength test in Table 17 were similar to the results in Table 14. Unexpectedly, the low levels of DMSO resulted in a urea granule with at least a 10% improvement in crush resistance. The presence of propylene glycol did not have an impact on the urea granules crush strength. Based on the Table 17 data, the impact of the storage temperature on crush resistance did not demonstrate a strong trend for the coated urea Examples 82, 83, 84, and 85. This data verifies that the presence of DMSO on and/or in urea granules at levels of <0.1% has a positive impact on the urea granules' crush strength. Table 14 and Table 17 data also shows no decrease in crush strength of coated urea granules until levels of DMSO are at 0.214% of the coated urea composition suggesting that levels of >0.2% DMSO would have minimal negative impact on coated urea granules' crush strength.

Example 95

Thermal Stability of NBPT

One of the advantages of this invention is the application, at moderate temperatures, of thermally sensitive urease inhibitor onto the surfaces of urea. Moderate temperatures are defined as a range of about 20-70° C. Testing procedures were established to exactly weigh samples of approximately 1 gram of NBPT in an aluminum pan and expose them to different temperatures in an oven over varying amounts of time. The initial weight of NBPT in the pan was compared to the final weight of sample in the pan. The % NBPT was then determined by HPLC of the residual from the final weight pan by the following procedure:
1. Crush a portion of sample (~5 g) using mortar and pestle.
2. Weigh about a 100 mg sample, in duplicate, and add to separate 10 mL volumetric flasks.
3. Bring to volume of 10 ml volumetric flask with 50:50 ACN(Acetonitrile):$H_2O$.
4. Mix well by shaking.
5. Transfer a portion through a Nylon 0.45 μm syringe filter into an HPLC vial.
6. Inject on LC/UV (15-μg/mL calibration standard).

The results are listed for both tests in Table 18.

TABLE 18

NBPT Temperature Stability

| Sample-°C./ Time in sec | % NBPT present by LC/UV | | % Weight Loss |
|---|---|---|---|
| | % w/w | Average | Average |
| NBPT-140° C./ 90 sec | 3.68% | 3.84% | 13.42% |
| NBPT-140° C./ 90 sec | 3.99% | | |

TABLE 18-continued

NBPT Temperature Stability

| Sample-°C./ Time in sec | % NBPT present by LC/UV | | % Weight Loss |
|---|---|---|---|
| | % w/w | Average | Average |
| NBPT-120° C./ 180 sec | 4.79% | 4.67% | 13.55% |
| NBPT-120° C./ 180 sec | 4.54% | | |
| NBPT-100° C./ 300 sec | 23.59% | 22.92 | 10.36% |
| NBPT-100° C./ 300 sec | 22.25% | | |
| NBPT-70° C./ 900 sec | 99.53% | 99.38 | 0.26% |
| NBPT-70° C./ 900 sec | 99.23% | | |
| NBPT-50° C./ 3600 sec | 99.17% | 99.38 | 0.0% |
| NBPT-50° C./ 3600 sec | 99.58% | | |
| NBPT std | 99.35% | 99.25 | Not Applicable |
| NBPT std | 99.16% | | |

HPLC results show that NBPT has poor thermal stability at temperatures >100° C. However, an examination of the weight loss versus temperature data shows that NBPT degrades but its degradation product does not disappear. Not to be bound by theory, it is thought that NBPT undergoes atmospheric thermal oxidation resulting in a degraded product that contains sulfur and phosphorus (which are functionalities on un-degraded NBPT). HPLC data shows that exposure of NBPT to temperatures ≥100° C. results in loss of the NBPT thereby resulting in a product that contains very little NBPT. Accordingly, any composition that is made using these higher temperatures result in a fertilizer product that is vastly inferior to the instant invention (which uses lower temperatures).

For example, the HPLC data reveals that NBPT shows no degradation when exposed for 15 minutes at a temperature of 70° C. The invention also shows that most application processes for coating urea with high NBPT active compositions can be accomplished at temperatures of 50-60° C.

In an embodiment, the application of high NBPT active compositions to the surfaces of urea is accomplished at processing temperatures that have minimal impact on the purity of the NBPT. In a variation, the application of high NBPT active compositions to the surfaces of urea is accomplished at processing temperatures that result in the formation of a minimal amount of NBPT degradation products. In an embodiment, a composition comprising a) urea and b) <0.2% DMSO results in a urea granule with higher crush strength compared to the same urea with no DMSO.

In an embodiment, the composition of a liquid formulation comprises a) NOSDS and b) (hexylamino methylene, amino methylene) phosphinic acid, ($C_8H_{20}N_2O_2P$), and/or its salts wherein the NOSDS is comprised of one or more solvents selected from the group consisting of aprotic organo solvents and protic organo solvents wherein one or more aprotic organo solvents are selected from the group consisting of:
   a) dimethyl sulfoxide,
   b) and one or more sulfoxide(s) selected from the group consisting of dialkyl, diaryl, or alkylaryl sulfoxide(s) selected from the formula structure:

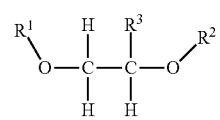

wherein
   i) $R^9$ and $R^{10}$ are each independently a $C_1$-$C_6$ alkylene group, an aryl group or $C_1$-$C_3$ alkylenearyl group,
   ii) or $R^9$ and $R^{10}$ with the sulfur to which they are attached form a 4 to 8 membered ring wherein $R^9$ and $R^{10}$ together are a $C_1$-$C_6$ alkylene group which optionally contains one or more atoms selected from the group consisting of O, S, Se, Te, N, and P in the ring,
   iii) and x is 1 or 2,
c) one or more alkylene carbonates selected from the group consisting of ethylene carbonate, propylene carbonate and butylene carbonate,
d) one or more polyols capped with acetate or formate wherein the polyol portion is selected from the group consisting of ethylene glycol, 1,3 propylene glycol, 1,2 propylene glycol, butylene glycol, trimethylol propane, trimethylol ethane, pentaerythritol, sorbitol and sorbitan, glucose, fructose, galactose and glycerin,
e) one or more alkylene glycol alkyl ethers acetates selected from the group consisting of dipropylene glycol methyl ether acetate, tripropylene glycol methyl ether acetate, and tripropylene glycol butyl ether acetate,
f) one or more diesters selected from the group consisting of dimethylsuccinate, dimethyl adipate, diethyl glutarate, and dimethyl glutarate,
g) one or more alkyl pryrrolidone selected from the group consisting of 1-Methyl-2-pyrrolidone and cyclohexylpyrrolidone,
h) one or more members selected from the group consisting of dimethylacetamide, dimethylformamide, dimethyl-2-imidazolidinone, isophorone, hexamethylphosphoramide, 1,2-dimethyloxyethane, 2-methoxyethyl ether and limonene,
i) one or more trialkyl phosphates selected from the group consisting of triethyl phosphate and tributyl phosphate,
wherein said protic solvents are one or more members selected from the group consisting of:
a. one or more alcohols selected from the group consisting of the family of $C_1$-$C_{10}$ alkanols,
b. one or more polyols selected from the group consisting of trimethylol propane, trimethylol ethane, pentaerythritol, sorbitol and sorbitan, glucose, fructose, galactose, and glycerin,
c. one or more polyalkylene glycols one or more members selected from the group consisting of poly($C_1$-$C_{10}$ alkylene) glycols,
d. isopropylidene glycerol,
e. one or more alkylene glycol alkyl of the formula:

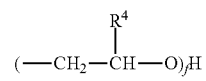

wherein
   i) $R^1$ is one or more members selected from the group consisting of $CH_3$, $C_2H_5$, $C_3H_7$ and $C_4H_9$,
   ii) $R^2$ is one or more members selected from the group consisting of H and the formula structure:

$$(-CH_2-\underset{\underset{R^4}{|}}{CH}-O)_jH$$

wherein
(1) $R^4$ is one or more members selected from the group consisting of H and $CH_3$,
(2) and f is an integer between 1 and 15,
iii) wherein $R^3$ is one or more members selected from the group consisting of H and $CH_3$,
f. one or more alkyl lactates selected from the group consisting of ethyl, propyl and butyl lactate,
g. one or more alkanolamines selected from the group consisting of alkanolamines of the structure:

wherein
iv) $R^5$ is one or more members selected from the group consisting of $C_2H_4OR^8$ and $C_3H_6OH$,
v) $R^6$ is: H, $C_2H_4OR^8$ and $C_3H_6OH$,
vi) $R^7$ is one or more members selected from the group consisting of H, $C_2H_4OR^8$ and $C_3H_6OH$,
wherein
(1) $R^8$ is $(C_2H_4O)_gH$,
wherein g is an integer between 1-10,
j) and glycerol carbonate,
and wherein said liquid formulation(s) have shown that they are
extremely effective urease inhibitors,
coat urea effectively,
and coat DCD effectively.

In an embodiment, a method to make amino methylene phosphinic acids and or their salts comprises one or more steps comprising:

1) charging hypophosphorous acid/50% water. In a variation, the water is displaced with an aprotic NOSDS. In a variation the water is removed. In another variation, the water is removed through the use of temperatures of 70-90° C. In another variation, the water is removed through the use of temperatures of 70-90° C. and by reducing the pressure of the reaction vessel,
2) agitating the contents of the reaction vessel and charging dimethyl sulfoxide and then paraformaldehyde while removing the heat thereby generated by the reaction. In a variation, trioxane is substituted for paraformaldehyde. In another variation, a formaldehyde solution is substituted for paraformaldehyde. In another variation, a mixture of one or more formaldehyde variants is charged to the reactor vessel,
3) heating the composition to 50-80° C. and holding at 50-80° C. until the composition clears,
4) cooling the temperature to 25-30° C. and then charging hexylamine slowly while cooling on the reactor vessel in order to maintain the temperature <40° C. In a variation, the reactor vessel is not cooled. In another variation, the hexylamine is charged slowly to the reaction vessel with no cooling,
5) after completing the hexylamine charge, the temperature is raised to 50-70° C. and then held until composition's appearance becomes clear,
6) charging sub-surface of ammonia gas,
7) continuing the $NH_3$ sparge at a temperature of 50-70° C. until the composition's 10% pH reaches 6-10. In a variation, the 10% pH reaches 7-9. In another variation, the pH reaches 7.5-8.5,
8) heating the composition to 80-100° C. while maintaining the composition's 10% pH of 6-10. In a variation, the 10% pH is 7-9. In another variation, the pH reaches 7.5-8.5 by adjusting the pH through ammonia sparging,
9) holding at 80-100° C. for one hour while maintaining 10% pH of 6-10. In a variation, maintaining 10% pH of 7-9. In another variation, maintaining 10% pH of 7.5-8.5 pH through ammonia sparging,
10) reducing the reaction vessel's pressure. In a variation, the reaction vessel pressure is reduced through application of a vacuum. In a variation, the reaction vessel pressure is reduced to a pressure reading of ≤200 mm Hg. In a variation, the reaction vessel pressure is reduced to a pressure reading of ≤100 mm Hg. In a variation, the reaction vessel pressure is reduced to a pressure reading of 60-100 mm Hg. In a variation, the reaction vessel pressure is reduced to a pressure reading of 40-60 mm Hg. In a variation, the reaction vessel pressure is reduced to a pressure reading of 20-40 mm Hg. In another variation, the reaction vessel pressure is reduced to a pressure reading of <20 mm Hg,
11) Vacuum is maintained until distillation ceases and % moisture is less than 30%. In a variation, the % moisture is less than 20%. In a variation, the % moisture is less than 10%. In a variation, the % moisture is less than 5%. In another variation, the moisture is less than 1%.

In an embodiment (aminomethylene)phosphinic acids and bis-(aminomethylene)phosphinic acids have improved urease inhibition performance. In a variation and not to be bound by theory, (aminomethylene)phosphinic acids and bis-(aminomethylene)phosphinic acids are more hydrolytically and thermally stable versus the traditional phosphoric triamides.

In an embodiment, fertilizer compositions are comprised of a) one or more members selected from the group consisting of (aminomethylene)phosphinic acids and bis-(aminomethylene)phosphinic acids, b) NOSDS, c) nitrogen sources wherein one or more nitrogen sources are selected from the group consisting of: urea (molten/solid), manure, compost, urea formaldehyde reaction products (molten/solid), urea/ammonia/formaldehyde reaction products (molten/solid), ammonium sulfate, anhydrous ammonia, urea/ammonium nitrate aqueous solutions (UAN) and other urea aqueous solutions.

In an embodiment, a method to make a fertilizer composition comprises making a composition with a) one or more member selected from the group consisting of (aminomethylene)phosphinic acids and bis-(aminomethylene)phosphinic acids and b) molten urea.

In an embodiment, fertilizer compositions are comprised of a) one or more member selected from the group consisting of (aminomethylene)phosphinic acids and bis-(aminomethylene)phosphinic acids, b) NOSDS, c) nitrogen sources and d) water wherein one or more nitrogen sources are selected from the group consisting of: urea (molten/solid), manure, compost, urea formaldehyde reaction products (molten/solid), urea/ammonia/formaldehyde reaction products (molten/solid), ammonium sulfate, anhydrous ammonia, urea/ammonium nitrate aqueous solutions (UAN) and other urea aqueous solutions.

In an embodiment, the improved urease inhibition properties of (aminomethylene)phosphinic acids and bis-(aminomethylene)phosphinic acids applied as a coating on a nitrification inhibitor results in a flowable, dry powder for application to manure.

The following references are incorporated by reference in their entireties for all purposes.
U.S. Pat. No. 4,234,332 to Michaud
U.S. Pat. No. 5,024,689 to Sutton et al.
U.S. Pat. No. 5,352,265 to Weston, et al.
U.S. Pat. No. 5,698,003 to Omilinsky et al.
U.S. Pat Application Publication No 20140090432, No 20150143860, No 20150299062 and No 20150315092/to McKnight et al.
U.S. Pat. No. 9,266,789 to Ortiz-Suarez
U.S. Pat. No. 8,562,711, U.S. Pat Application Publication Nos. 2007157689 and No 20130283873 to Sutton
US Patent Application Publication No. 2006/0185411 to Hojjatie et al.
U.S. Pat. No. 4,530,714 to Kolc et al.
U.S. patent application Ser. No. 15/552,675—U.S. Patent Application Publication No. 20180044254 to Gabrielson et al.

It is contemplated and therefore within the scope of the present invention that any feature that is described above can be combined with any other feature that is described above. When mixtures, formulations and/or compositions are discussed, it should be understood that those mixtures, formulations and/or compositions are contemplated as being parts of bigger mixtures, formulations and/or compositions including having solvating agents. Moreover, it should be understood that the present invention contemplates minor modifications that can be made to the compositions and methods of the present invention. In any event, the present invention is defined by the below claims.

We claim:

1. A dry, flowable fertilizer composition, wherein the dry, flowable fertilizer composition comprises:
   a) one or more particulate nitrogen sources, the one or more particulate nitrogen sources heated between 60° C. to 80° C.; and
   b) a solid coating composition that is heated to a temperature ranging from 50° C. to 70° C. to obtain a heated liquid, wherein the heated liquid is applied onto the one or more particulate nitrogen sources, wherein: the heated liquid comprises:
      i) N-(n-butyl) thiophosphoric triamide (NBPT) ranging from 75% to 95% by weight of said solid coating composition and
      ii) dimethyl sulfoxide (DMSO) ranging from 4% to 24% by weight of the coating;
   wherein the dry, flowable fertilizer composition comprises the solid coating composition homogeneously applied on a surface of the one or more particulate nitrogen sources, and wherein the dry, flowable fertilizer composition comprises a non-clumped one or more particulate nitrogen sources; and wherein the dry, flowable fertilizer composition has a crush strength ranging from 7.0 to 7.85 when stored at 25° C. or 50° C. for 24 hours.

2. The dry, flowable fertilizer composition of claim 1, wherein the solid coating composition further comprises a second solvent, wherein the second solvent comprises one or more solvents selected from the group consisting of (a) one or more aprotic solvents and (b) one or more protic solvents.

3. The dry, flowable fertilizer composition of claim 1, wherein the solid fertilizer composition further comprises one or more members selected from the group consisting of surfactants, buffers, fragrance/odor masking agents, colorants, micro-nutrients, and flow modifiers, wherein the composition does not comprise water and alcohol.

4. The dry, flowable fertilizer composition of claim 1, wherein the solid coating composition further comprises colorants to enhance visual conformation of evenness of coating of the one or more particulate nitrogen sources surfaces and depth of penetration into the one or more particulate nitrogen sources.

5. The dry, flowable fertilizer fertilizer composition of claim 1, wherein the one or more particulate nitrogen sources are selected from the group consisting of a) urea, b) urea, formaldehyde reaction products, c) urea, formaldehyde, ammonia reaction products, d) manure, e) dicyandiamide, and f) compost, and wherein the composition weight percent comprises about 93.05-99.91% of said one or more particulate nitrogen sources.

6. The dry, flowable fertilizer composition of claim 5, wherein the one or more particulate nitrogen sources comprise urea.

7. The dry, flowable fertilizer composition of claim 1, wherein the solid fertilizer composition further comprises one or more flow modifiers selected from the group consisting of silicas, hydrophobized silicas, soaps, inorganic powders, and nonionic surfactants, wherein the flow modifiers comprise between about 0.25-3.5 percent weight of the dry, flowable fertilizer composition.

8. The dry, flowable fertilizer composition of claim 1, wherein the dry, flowable fertilizer composition comprises urea as the one or more particulate nitrogen sources and DMSO at weight percent range of between about 0.005 to about 0.2%.

9. A dry, flowable fertilizer composition comprising a) urea, b) a solid coating composition applied to the urea as a heated liquid at a temperature ranging from 40° C. to 70° C., wherein the solid coating comprises DMSO, and c) N-(n-butyl) thiophosphoric triamide (NBPT), wherein the DMSO is at a weight percent range of between about 0.005 to about 0.2% of the dry, flowable fertilizer composition, and the dry, flowable fertilizer composition has a crush strength ranging from 7.0 to 7.85 when stored between 25° C. to 50° C. for 24 hours.

10. The dry, flowable fertilizer composition of claim 1, wherein the dry, flowable fertilizer composition comprises less than 0.0789 wt % DMSO in the coating and one or more particulate nitrogen sources.

11. The dry, flowable fertilizer composition of claim 10, wherein the dry, flowable fertilizer composition comprises a percent increase in crush strength ranging from about 8% to about 45% over untreated urea when stored between 25° C. to 50° C. for 24 hours.

12. The dry, flowable fertilizer composition of claim 1, wherein the dry, flowable fertilizer composition comprises a percent increase in crush strength ranging from about 8% to about 45% over untreated urea when stored between 25° C. to 50° C. for 24 hours.

13. The dry, flowable fertilizer composition of claim 1, wherein N-(n-butyl) thiophosphoric triamide (NBPT) comprises at least 80% by weight of said coating composition.

14. The dry, flowable fertilizer composition of claim 1, wherein N-(n-butyl) thiophosphoric triamide (NBPT) comprises at least 85% by weight of said coating composition.

15. The dry, flowable fertilizer composition of claim 1, wherein the solid coating composition is exposed to a temperature range of 50-70° C., wherein the degradation of NBPT is 0.0% over a 900-3600 seconds of exposure.

16. A fertilizer composition comprising:
   a) one or more particulate nitrogen sources; and
   b) a heated coating composition having a chill point ranging from 45° C. to 56° C. applied on the one or more particulate nitrogen sources that forms a solid coating on the one or more particulate nitrogen sources post-application and cooling, wherein
the heated coating composition comprises:
  i) N-(n-butyl) thiophosphoric triamide (NBPT) ranging from 75% to 95% by weight of said coating composition and
  ii) dimethyl sulfoxide (DMSO) ranging from 4% to 24% by weight of the coating; and
the composition has a crush strength ranging from 7.0 to 7.85 when stored between 25° C. to 50° C. for 24 hours.

* * * * *